US011254408B2

(12) United States Patent
Amezquita Zatarain et al.

(10) Patent No.: US 11,254,408 B2
(45) Date of Patent: Feb. 22, 2022

(54) METHODS AND APPARATUS FOR CONSTRUCTING AIRSHIPS

(71) Applicant: LTA Research and Exploration, LLC, Palo Alto, CA (US)

(72) Inventors: Jesus Ricardo Amezquita Zatarain, Fremont, CA (US); August Lang, San Francisco, CA (US); Daniel Ziperovich, San Francisco, CA (US); Benjamin Loveless, San Francisco, CA (US); Viet Le, San Francisco, CA (US); Tsu Han, San Jose, CA (US); Marlon Perez, San Jose, CA (US); Franklin Kyle Kepley, Milpitas, CA (US)

(73) Assignee: LTA Research and Exploration, LLC, Palo Alto, CA (US)

( * ) Notice: Subject to any disclaimer, the term of this patent is extended or adjusted under 35 U.S.C. 154(b) by 178 days.

(21) Appl. No.: 16/663,871

(22) Filed: Oct. 25, 2019

(65) Prior Publication Data

US 2021/0122453 A1 Apr. 29, 2021

(51) Int. Cl.
*B64B 1/08* (2006.01)
*B64F 5/10* (2017.01)

(52) U.S. Cl.
CPC . *B64B 1/08* (2013.01); *B64F 5/10* (2017.01)

(58) Field of Classification Search
CPC ..................................... B64B 1/08; B64F 5/10
See application file for complete search history.

(56) References Cited

U.S. PATENT DOCUMENTS

| 5,896,637 A * | 4/1999 | Sarh ........................ B23P 19/04 29/34 B |
| 6,056,240 A | 5/2000 | Hagenlocher |
| 2007/0011983 A1* | 1/2007 | Reynolds ................ F24S 25/00 52/633 |
| 2011/0052845 A1* | 3/2011 | Dermond ................ B29C 53/66 428/34.1 |

(Continued)

FOREIGN PATENT DOCUMENTS

| GB | 544693 A * | 4/1942 | ................ B64F 5/10 |
| JP | 2003118662 A | 4/2003 | |
| KR | 20140047858 A | 4/2014 | |

(Continued)

OTHER PUBLICATIONS

International Search Report and Written Opinion for International Application No. PCT/US2020/066469, dated Apr. 8, 2021.

(Continued)

*Primary Examiner* — Christopher D Hutchens
(74) *Attorney, Agent, or Firm* — Baker Botts L.L.P.

(57) ABSTRACT

A jig for constructing a mainframe of an airship structure, including multiple tracks configured in a radial pattern, each track including rails that are configured to be parallel to each other, multiple front carts for securing inner portions of the mainframe corresponding to an inner circumference of the mainframe, each front cart configured to be positionally adjustable along one of the tracks, and multiple back carts for securing outer portions of the mainframe corresponding to an outer circumference of the mainframe, each back cart configured to be positionally adjustable along one of the tracks.

16 Claims, 57 Drawing Sheets

(56) References Cited

U.S. PATENT DOCUMENTS

2019/0112023 A1    4/2019  Brin

FOREIGN PATENT DOCUMENTS

WO      WO 9630658   A1    10/1996
WO      WO 2007053156 A2   5/2007

OTHER PUBLICATIONS

Slate (all-metal) Airship—the "City of Glendale", retrieved on Oct. 5, 2020, Retrieved from the Internet: https://welweb.org/ThenandNow/City%20of%20Glendale.html, 13 pages.

\* cited by examiner

METHODS AND APPARATUS FOR CONSTRUCTING AIRSHIPS

TECHNICAL FIELD

This disclosure generally relates to airships or lighter-than-air aircrafts, and more particularly to apparatuses, methods, and systems for constructing the same.

BACKGROUND

Airships are light-than-air aircrafts that obtain the necessary lift for flight based on buoyancy generated by gas that is less dense than the surrounding air. Typically, an airship comprises a structure attached to an envelope that holds lifting gas, such as helium or hydrogen. Certain airships, such as rigid or semi-rigid airships, may have structural framework to help maintain the shape of the envelop.

SUMMARY OF PARTICULAR EMBODIMENTS

Embodiments disclosed herein pertain to systems, apparatuses, and methods for providing fast and cost-effective ways to construct airships. In particular embodiments, the frame structure of an airship may be built using preconfigured joints designed to facilitate and simplify construction.

Further embodiments described herein enable an airship to be built on the ground, thereby enhancing construction safety, speed, and cost. In particular embodiments, detachable wheels may be attached to the outer surface of a mainframe, which may be circular, as it is being built. The partially assembled mainframe may then be placed on a semi-circular jig, with the attached wheels abutting the jig. Such configuration thus allows the mainframe to be rotated as it is being assembled by workers on the ground without subjecting the workers to unnecessary risks.

Additional embodiments described herein enable the use of a universal jig to aid in the assembly of mainframes. In particular embodiments, a universal jig may be configured to allow for the assembly of mainframes of various sizes and configurations. For example, those mainframes toward the center of an airship may comprise large circular mainframes which are substantially un-tapered, while those mainframes toward the aft or rear of an airship may comprise smaller circular mainframes, which may be tapered. A universal jig of this type may allow for the quick and efficient construction of mainframes of all shapes and sizes.

Additional embodiments described herein describe joining plates for joining extruded aluminum framing. In some embodiments, these plates may be used in the assembly of airships or jigs for the construction of airships, including hull jigs, mainframe jigs, or other jigs for the construction of airships. In particular embodiments, the joining plates may comprise metallic plates that may be used to join two or more pieces of extruded aluminum framing, including 80/20 aluminum framing. In some embodiments, the joining plates may be configured to include a slot or rail to fit in a press fit within the grooves or valleys of extruded aluminum framing. By being configured to fit in a press fit within the grooves of extruded aluminum framing, these joining plates may allow for a tighter fit between pieces and reduced rattle, slippage, or movement between pieces.

Particular embodiments described herein describe a jig for constructing a mainframe of an airship structure. The jig may include multiple tracks configured in a radial pattern, each track including rails that are configured to be parallel to each other, multiple front carts for securing inner portions of the mainframe corresponding to an inner circumference of the mainframe, each front cart configured to be positionally adjustable along one of the tracks, and multiple back carts for securing outer portions of the mainframe corresponding to an outer circumference of the mainframe, each back cart configured to be positionally adjustable along one of the tracks. In some embodiments, the mainframe may include interconnected pyramid structures. In some embodiments, the inner portions of the mainframe corresponding to the inner circumference of the mainframe may include apex joints of the interconnected pyramid structures and apex-to-apex connectors. In some embodiments, the outer portions of the mainframe corresponding to the outer circumference of the mainframe may include bases of the interconnected pyramid structures. In some embodiments, the multiple front carts and the multiple back carts may be configured with wheels for sliding on the tracks. In some embodiments, each of the tracks may comprise markers at predetermined locations along the track, wherein the respective markers of the plurality of tracks that are equal distance from a center of the radial pattern are configured to be used (1) to position the multiple front carts to secure the inner portions of the mainframe or (2) to position the multiple back carts to secure the outer portions of the mainframe. In some embodiments, each of the markers of each of the tracks may be configured to be used to construct a mainframe of a particular size. In some embodiments, each of the front carts may include a plate for securing the inner portions of the mainframe corresponding to the inner circumference. In some embodiments, the plate of each of the front carts is configured to secure an apex-to-apex connector that connects two pyramid structures of the mainframe. In some embodiments, each of the front carts may include a connector that couples the front cart to an adjacent front cart, and wherein the connector secures an apex joint of a pyramid structure of the mainframe. In some embodiments, each of the back carts may include one or more plates for securing outer portions of the mainframe corresponding to the outer circumference. In some embodiments, the one or more plates of each of the back carts may be configured to secure two adjacent base joints of a pyramid structure of the mainframe. In some embodiments, a slope of the one or more plates of each of the back carts may be adjustable. In some embodiments, each of the back carts may include a sloped rail and an adjustment strap used for adjusting the slope of the one or more plates of the back cart, wherein a first end of the sloped rail is coupled to the one or more plates and a second end of the sloped rail is coupled to the adjustment strap at one of a plurality of predetermined locations on the adjustment strap. In some embodiments, the predetermined locations on the adjustment strap may correspond to multiple predetermined tapering configurations of the mainframe, respectively. In some embodiments, each of the tracks may be configured to be used by one of the front carts and one of the back carts.

Particular embodiments described herein describe a joining plate for securing to a T-slot extrusion framing. The T-slot extrusion framing may include a first flat surface and a second flat surface within a common plane, the first flat surface and the second flat surface being configured to abut exterior surfaces of the T-slot extrusion framing, a protruded rail between the first flat surface and the second flat surface, the protruded rail being configured to be inserted into a T-slot of the T-slot extrusion framing, and at least one hole through the protruded rail configured to be used to fasten the joining plate to the T-slot extrusion framing. In some embodiments, the joining plate may be configured to be fastened to the T-slot extrusion framing by a bolt inserted through the hole and a nut for securing the bolt.

The embodiments disclosed herein are only examples, and the scope of this disclosure is not limited to them. Particular embodiments may include all, some, or none of the components, elements, features, functions, operations, or steps of the embodiments disclosed above. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 27A-27B illustrate an embodiment of a hull section assembled on a pair of rollercoaster jigs, with a support structure between.

FIG. 30G illustrates an 80/20 framing fastened to a joining plate with a bolt and nut.

DESCRIPTION OF EXAMPLE EMBODIMENTS

Figure 1:
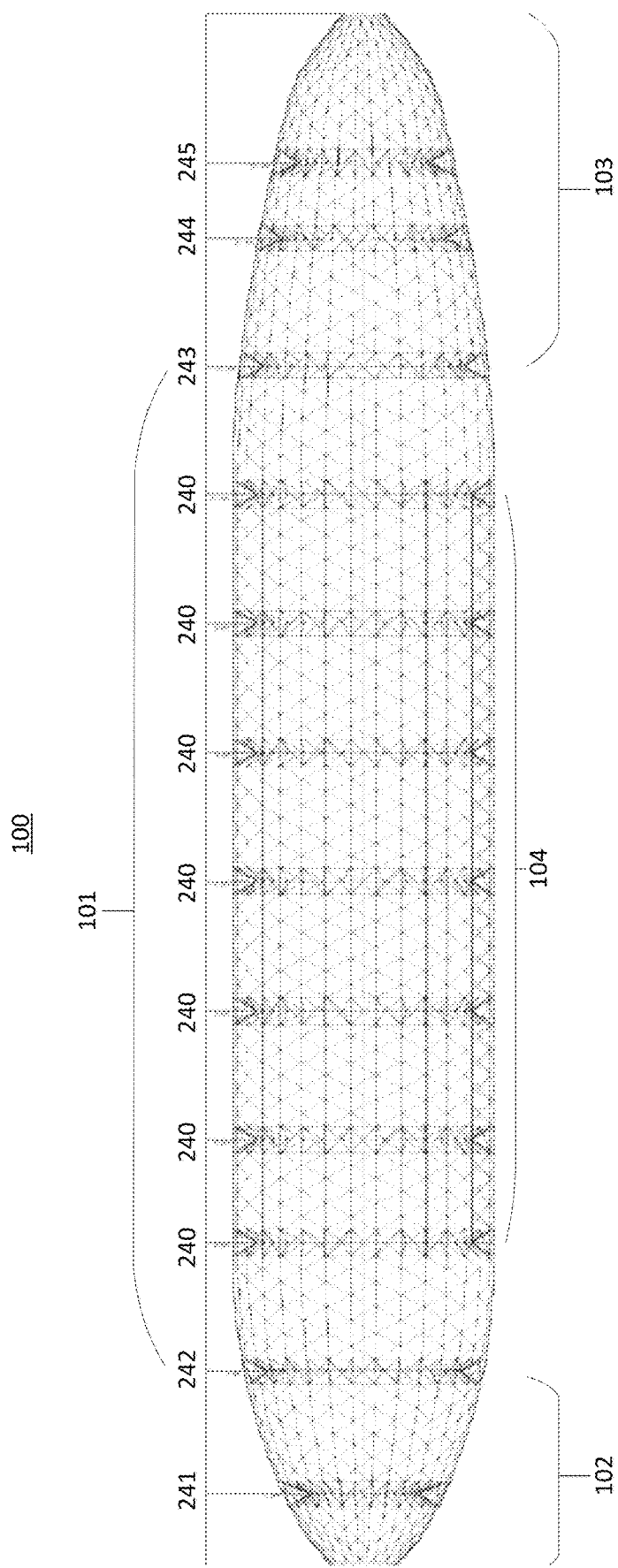
FIG. 1 illustrates an example structure of a rigid airship.

FIG. 1 illustrates an example structure 100 of a rigid airship, in accordance with particular embodiments. The structure 100 may comprise a hull section 101, bow section 102, and stern section 103 to which the airship's rudder may be attached. The hull section 101 may comprise multiple main transverse frames or mainframes 240, which may be constructed with varying sizes (e.g., radius, diameter, and circumference). The bow section 102 may comprise multiple tapered mainframes 241-242. Tapered mainframes 241 and 242 may be constructed with varying sizes (e.g., radius, diameter, circumference, and degree of tapering) to allow the entire bow section to be tapered as shown in FIG. 1. The stern section 103 may comprise multiple tapered mainframes 243-245. Tapered mainframes 243-245 may be constructed with varying sizes (e.g., radius, diameter, circumference, and degree of tapering) to allow the entire stern section to be tapered as shown in FIG. 1. Although FIG. 1 illustrates the structure 100 comprised of seven mainframes 240 and five tapered mainframes 241-245, this disclosure contemplates any number of mainframes and tapered mainframes used for the manufacturing of an airship. In particular embodiments, mainframes 240 may be interconnected using longitudinal gangways 104. In particular embodiments, wires (e.g., which may be constructed using Vectran fiber or any other suitable material with suitable strength and flexibility characteristics) connecting points on the inner circumference of mainframes 240 may physically section a hull section 101 into multiple segments. The segments may be used to hold individual airbags containing lifting gas (e.g., helium).

Figure 2A:
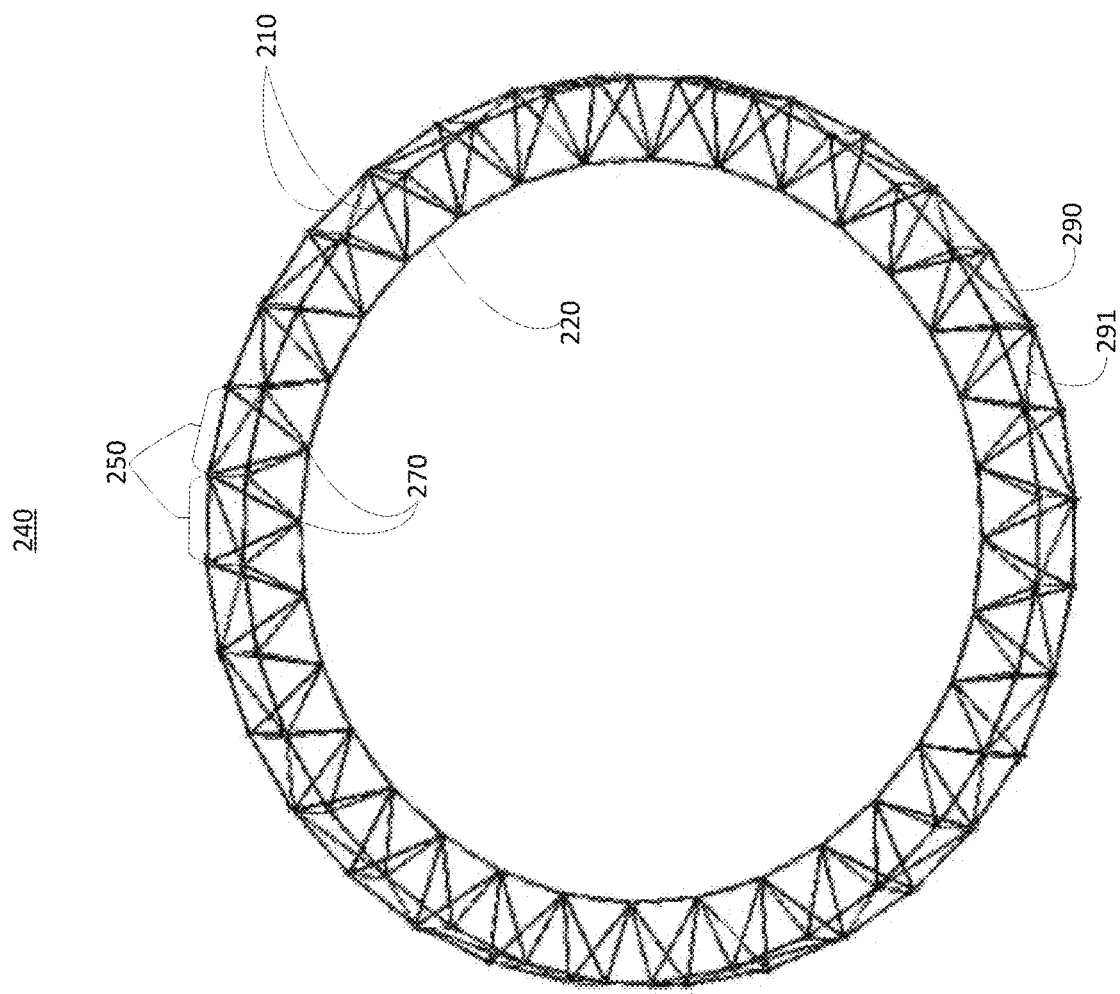
FIG. 2A illustrates an embodiment of a mainframe.

FIG. 2A illustrates an example mainframe 240. Mainframes 240 may comprise an outer portion 210 and an inner portion 220. In particular embodiments, mainframe 240 may be constructed using pyramid structures 250. Each pyramid structure 250 may have a base and an apex. In particular embodiments, pyramid structures 250 may be configured so that their apexes 270 point toward the center of a mainframe and their bases face outwards. In such a configuration, the outer portion 210 of the mainframe is formed by the connectors that form the bases of pyramid structures 250, and the inner portion 220 of the mainframe is formed by the connectors that connect apexes 270 of those pyramid structures 250. In particular embodiments, bases of pyramid structures 250 may include diagonal connectors 290 and 291, which may cross the bases diagonally in an alternating, zig-zag pattern.

Figure 2B:
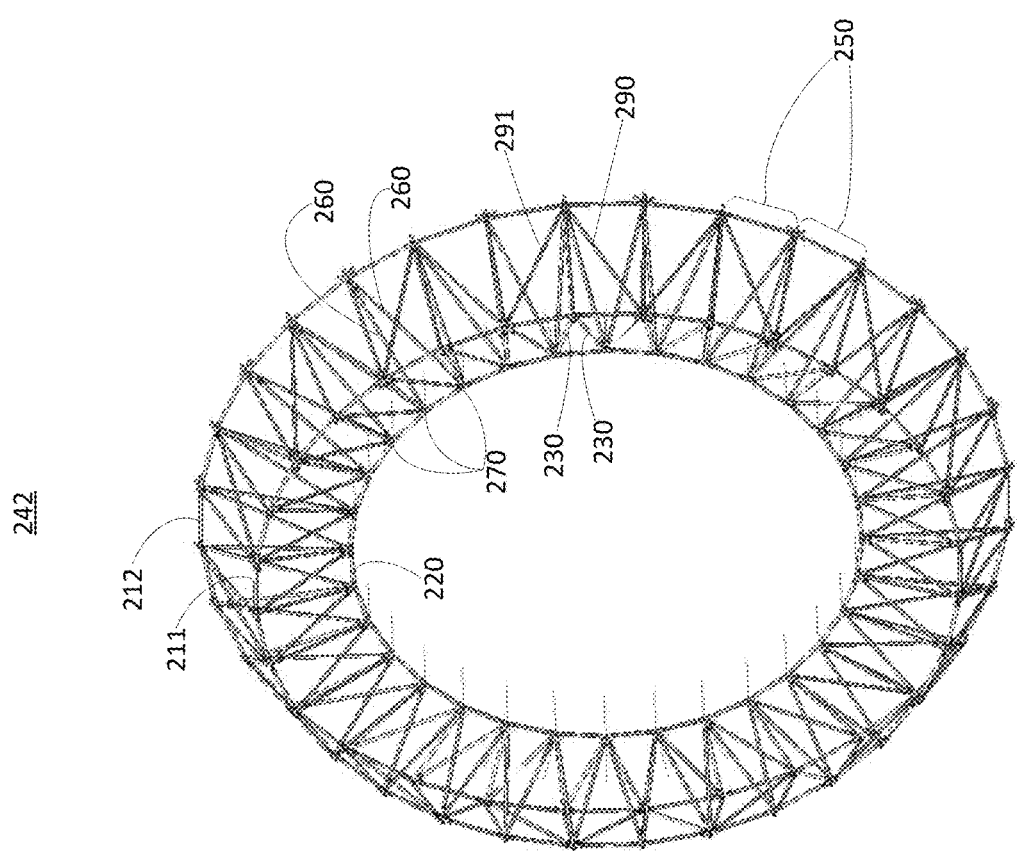
FIG. 2B illustrates an embodiment of a mainframe that is tapered for use in the assembly of a tapered portion of an airship body.

FIG. 2B illustrates an example tapered mainframe 242 for use in the assembly of a tapered portion of an airship body. In particular embodiments, tapered mainframes 241-245 have similar structure and are comprised of similar components as non-tapered mainframes (e.g., 240 shown in FIG. 2A) except that they are tapered. In particular embodiments, tapered mainframes 241-245 may comprise a front outer portion 211, back outer portion 212, and inner portion 220. Tapered mainframes 241-245 may include shorter base to apex connectors 230 or longer base to apex connectors 260 than those of non-tapered mainframes. Each of tapered mainframes 241-245 may include a front outer circumference comprised of front outer portions 211 and a back outer circumference comprised of back outer portions 212. The front outer circumference may have a smaller radius than the radius of the back outer circumference. For example, as illustrated in FIG. 2B, the front outer circumference of a tapered mainframe 242 has a smaller radius than the back outer circumference comprised of back outer portions 212. FIG. 2B also illustrates, for example, a tapered mainframe 242 with pyramid structures 250 with slanted bases. The front side of the slanted bases are comprised of front outer portions 211, which are connected to apexes 270 via shorter base to apex connectors 230. The back side of the slanted bases are comprised of back outer portions 212 connected to apexes 270 via longer base to apex connectors 260.

Figure 2C:
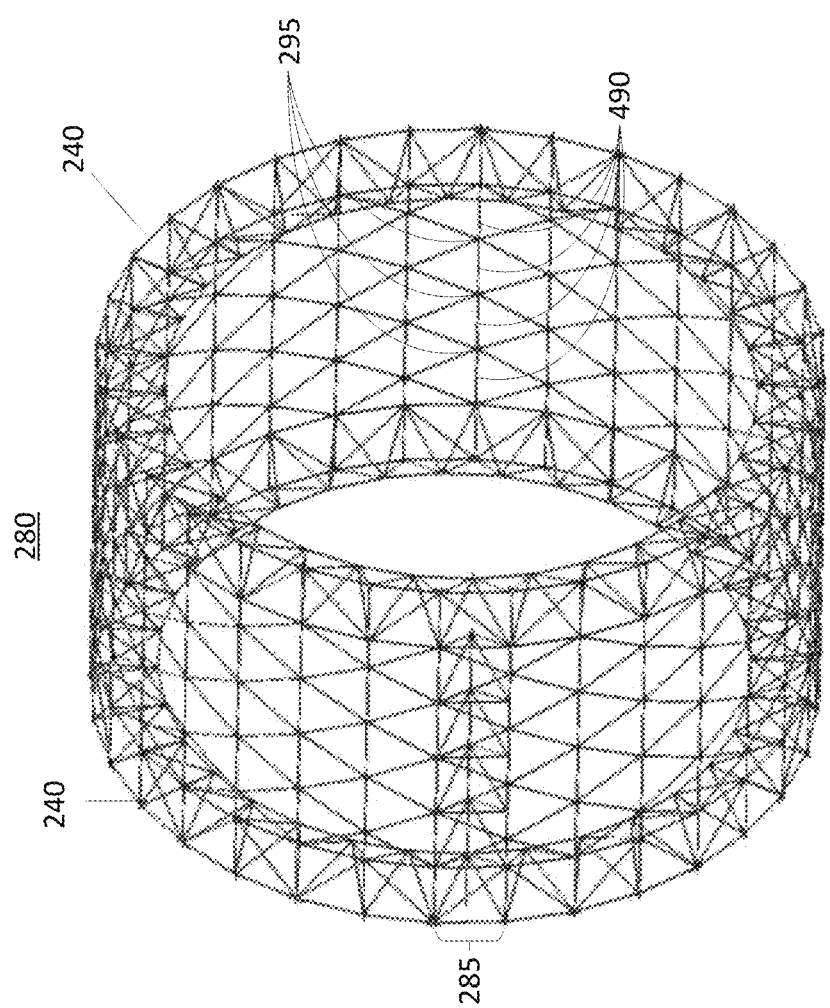
FIG. 2C illustrates an example of a hull segment of a rigid airship.

FIG. 2C illustrates an example hull segment 280. In particular embodiments, hull segments 280 may be substantially cylindrical. In particular embodiments, a hull segment 280 may be comprised of mainframes, gangways, and geodesic structures. Each end of hull segments 280 may include mainframes, which two mainframes are connected to each other with gangways and geodesic structures. Any number of gangways 285 may be used (e.g., one, two, four, five, eight, etc.). For example, if four gangways 285 are used, then they may be evenly spaced along the circumference of a mainframe. A gangway 285 may be comprised of a plurality of pyramid structures. The pyramid structures of a gangway 285 may be similar to pyramid structures comprised in mainframes 240, but different in that the bases of the gangway pyramid structures may form a substantially straight structure (without a curvature), whereas the bases the mainframe pyramid structures may form a circular structure to allow the construction of a circular mainframe. In particular embodiments, two mainframes of a hull segment 280 may be positioned in parallel and aligned according to their respective pyramid structures. In this arrangement, each of the pyramid structures in one mainframe may be connected with a corresponding pyramid structure in the other mainframe such that the two mainframes are connected to each other via pairs of pyramid structures. For example, FIG. 2B illustrates a series of longitudinal connectors 490 connecting the inner base joints of each pyramid structure in one mainframe to the inner base joints of the corresponding pyramid structures in the other mainframe. In particular embodiments, longitudinal connectors 490 and 6-way geodesic joints 900 may form geodesic structures to create walls for a hull segment 280.

Figure 3A:
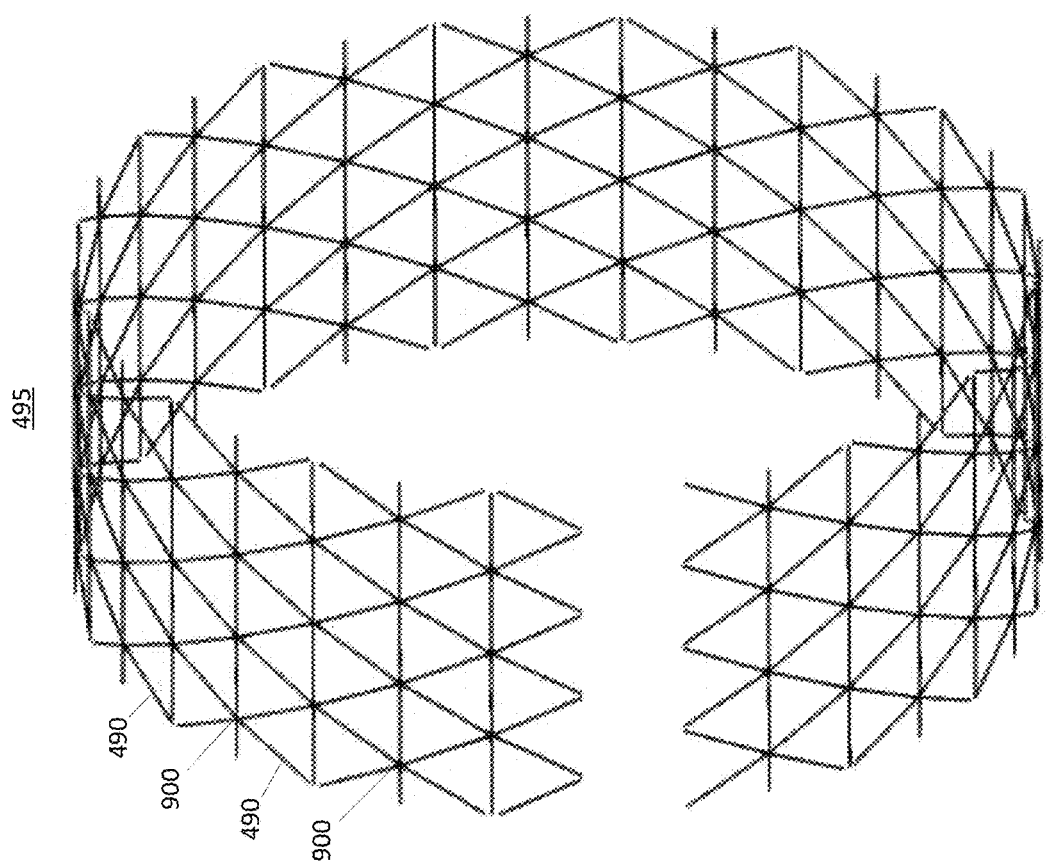
FIGS. 3A-3C illustrate examples of a geodesic structure that may be used in portions of an airship body.
Figure 3B:
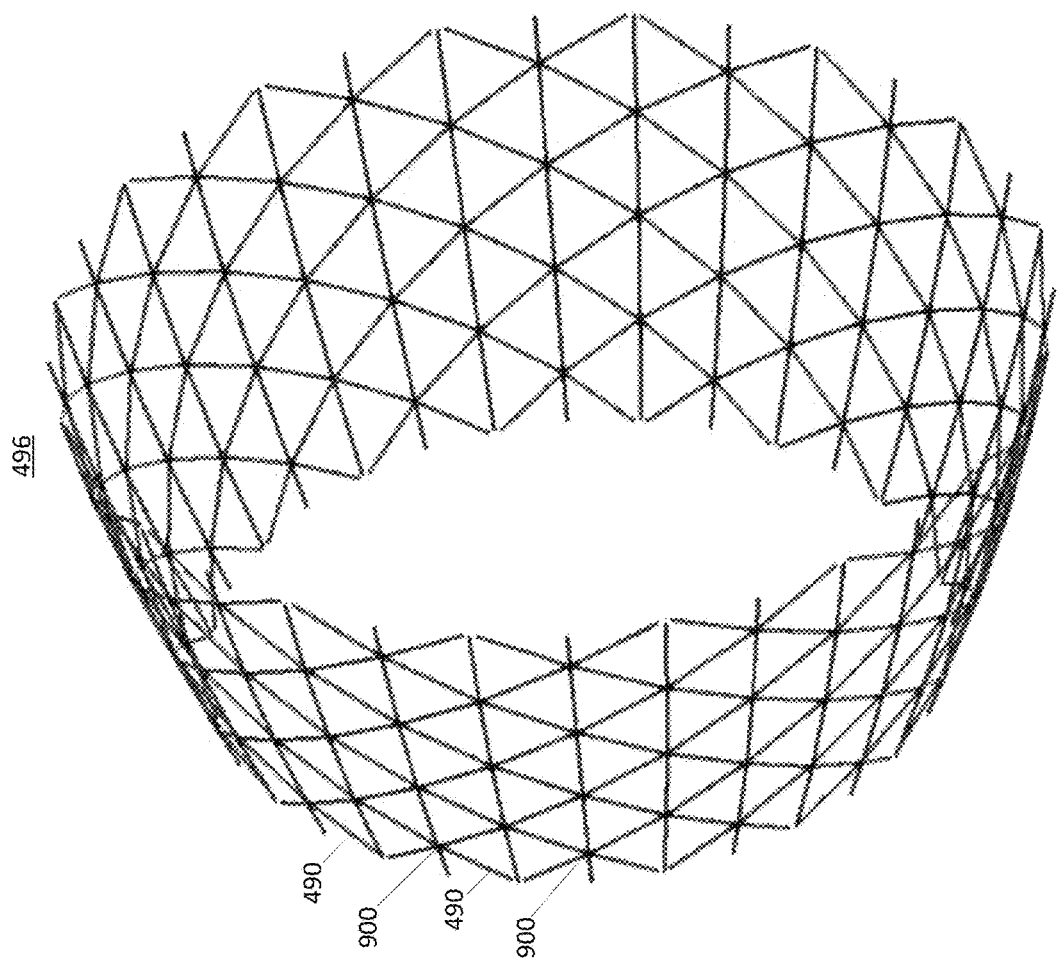
Figure 3C:
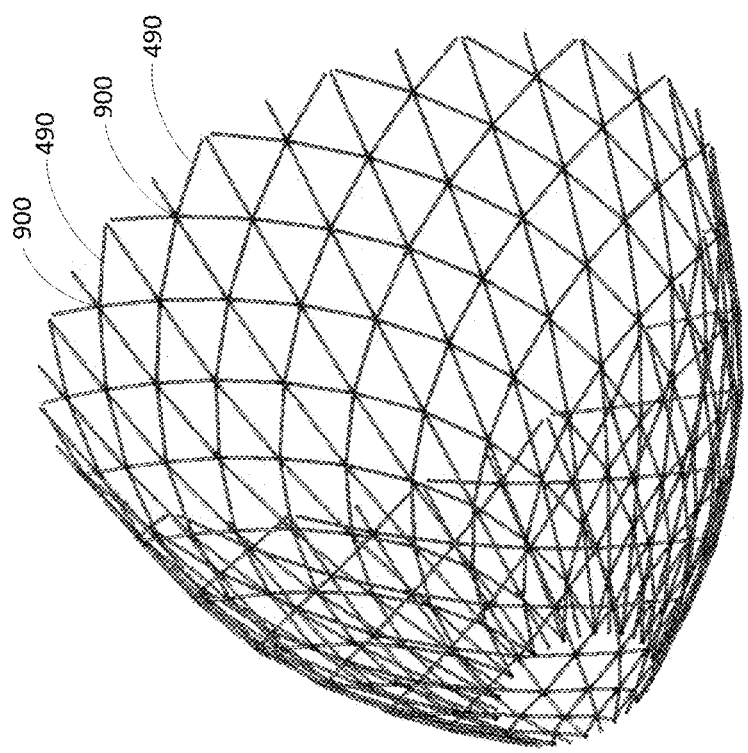

FIG. 3A-3C illustrate examples of geodesic structures 495-497 that may be used in portions of an airship body. In particular embodiments, geodesic structures 495-497 may be used to create a frame for the walls of an airship (e.g., as part of a hull segment 280) and may be placed between the mainframes. For example, FIG. 3A illustrates a geodesic structure 495 that may be included in a hull section of an airship body. FIG. 2C further illustrates a geodesic structure 495 that is connecting two mainframes 240 as part of a hull segment. FIG. 3B illustrates a slightly tapered geodesic structure 496 that may be used in a tapered portion of an airship body. FIG. 3C illustrates a heavily tapered geodesic structure 497 that may be used in a heavily tapered portion of an airship body. A geodesic structure 495 illustrated in FIG. 3A may be included in a hull section 101 and connected between two non-tapered mainframes. A geodesic structure 496 illustrated in FIG. 3B may be included in a bow section 102 and connected between a tapered mainframe and a non-tapered mainframe, or between two tapered mainframes. A geodesic structure 497 illustrated in FIG. 3C may be included in a stern section 103 and connected between two tapered mainframes.

Figure 4:
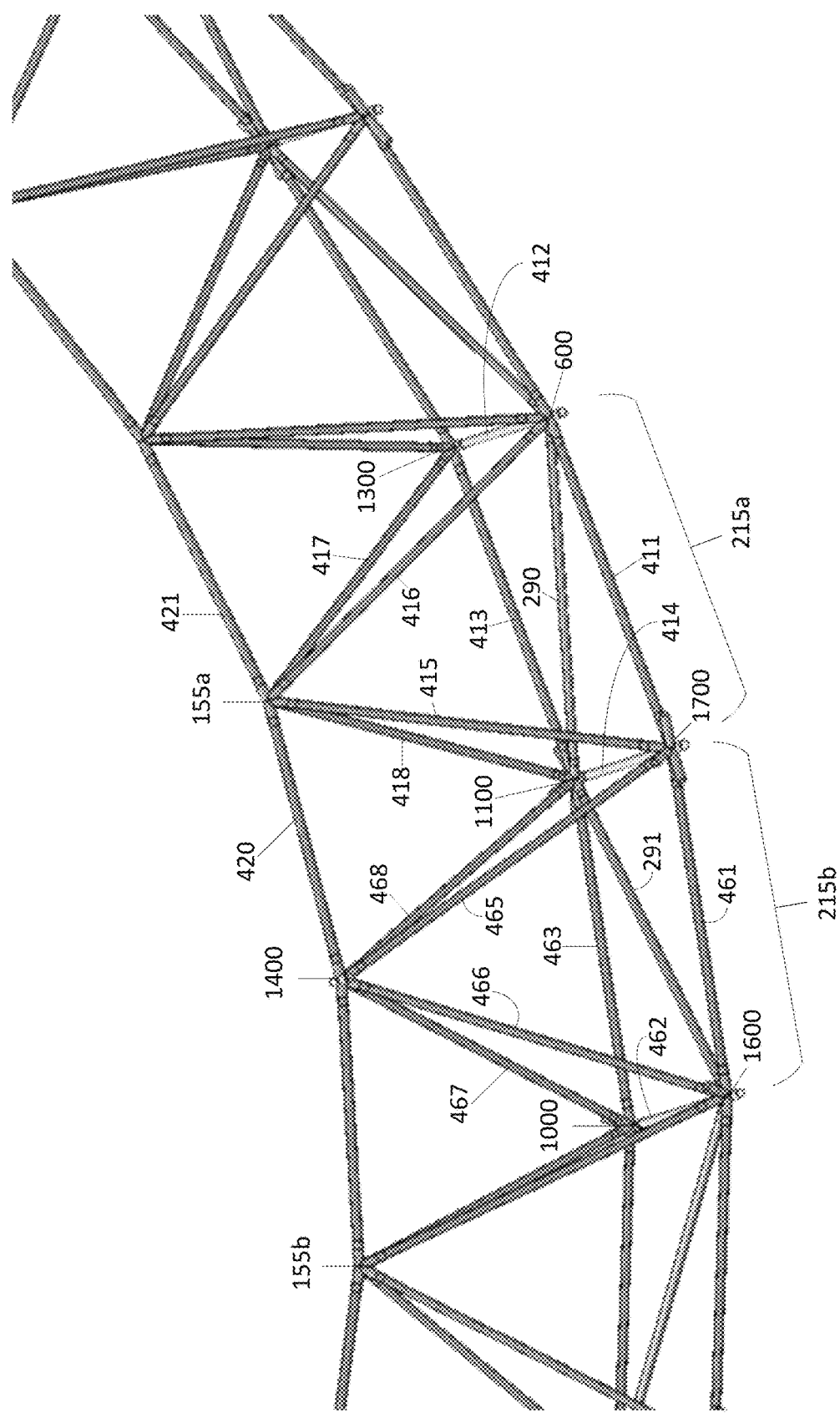
FIG. 4 illustrates an example perspective view of a portion of a mainframe.

FIG. 4 illustrates an example portion of mainframes 240. In particular embodiments, pyramid structures may have four base joints forming the base of the pyramid structure and an apex joint forming the apex of the pyramid structure. For example, FIG. 4 illustrates a portion of a mainframe comprising a pyramid structure 215a with four base joints 1700, 600, 1300, and 1100 forming the base of the pyramid structure 215a and apex joint 155a forming the apex of the pyramid structure 215a. In particular embodiments, connectors or rods may be used to construct pyramid structures. For example, FIG. 4 illustrates a pyramid structure 215a with a base comprising a connector 411 connecting base joints 1700 and 600, a connector 412 connecting base joints 600 and 1300, a connector 413 connecting base joints 1300 and 1100, a connector 414 connecting base joints 1100 and 1700, and a diagonal connector 290 connecting base joints 600 and 1100. The sides of the pyramid structure 215a are illustrated with connectors 415, 416, 417, and 418 connecting an apex joint 155a to base joints 1700, 600, 1300, and 1100, respectively. As another example, FIG. 4 illustrates a pyramid structure 215b with a connector 461 connecting base joints 1600 and 1700, a connector 414 connecting base joints 1700 and 1100, a connector 463 connecting base joints 1100 and 1000, a connector 462 connecting base joints 1000 and 1600, and a diagonal connector 291 connecting base joints 1600 and 1100. The sides of the pyramid structure 215b are illustrated with connectors 465, 466, 467, and 468 connecting an apex joint 1400 to base joints 1700, 1600, 1000, and 1100, respectively. In particular embodiments, mainframes may be constructed using adjacent pyramid structures. For example, between two adjacent pyramids 215a and 215b, a connector 414 may be shared between the bases of the pyramid structures. In such configuration, two adjacent pyramids may share one base connector and two corresponding base joints. For example, FIG. 4 illustrates base joints 1700 and 1100 and their connector 414 being shared by pyramid structures 215a and 215b. In particular embodiments, apex joints of adjoining pyramids may be connected by an apex connector. For example, FIG. 4 shows apex joints 155a and 1400 of adjoining pyramid structures 215a and 215b connected by an apex connector 420. In particular embodiments, the structural pattern of interconnected pyramid structures (e.g., 215a and 215b) may repeat through the entire mainframe. In particular embodiments, joints may be configured to create a circular mainframe comprising a plurality of pyramid structures. For example, an apex joint 155a may be configured so that its slots for receiving apex-to-apex connectors 420 and 421 may be angled with respect to each other to form a corner of a polygon that approximates the interior of a circular mainframe. Similarly, each of the base joints (e.g., 1700) may be configured so that its two slots for receiving base connectors (e.g., 411 and 461), forming respective sides of adjacent pyramid structures (e.g., 215a and 215b), may be angled with respect to each other to form a corner of a polygon that approximates an exterior of a circular mainframe. In particular embodiments, a base joint 1700 may be configured so that connectors 411 and 461 form a corner of a 36-sided polygon. Further details of the joints' configurations are provided below.

Figure 5:
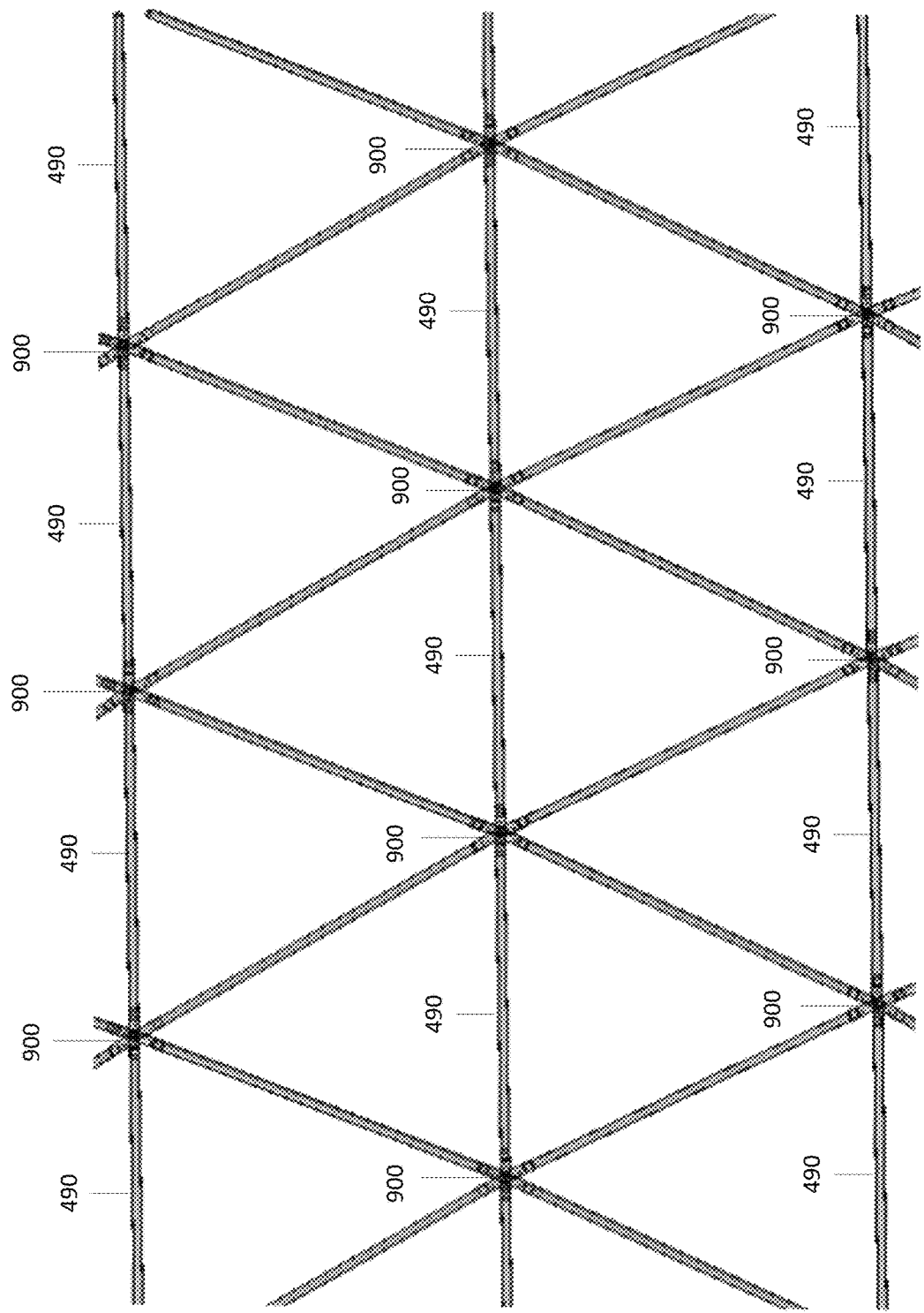
FIG. 5 illustrates an example top view of a portion of an alternative geodesic structure.

FIG. 5 illustrates an example top view of a portion of geodesic structures. In particular embodiments, two mainframes (as shown in FIG. 2C) may be connected by longitudinal connectors 490 of a geodesic structure 495. In particular embodiments, respective base joints of pyramid structures of a pair of mainframes may be connected by a single longitudinal connector 490 that extends through a series of geodesic joints, such as 6-way geodesic joints 900. In other embodiments, respective base joints of pyramid structures of a pair of mainframes may be connected by a series of multiple longitudinal connectors 490 connected by 6-way geodesic joints 900. Additional details of longitudinal connectors 490 and 6-way geodesic joints 900 are described below.

Figure 6:
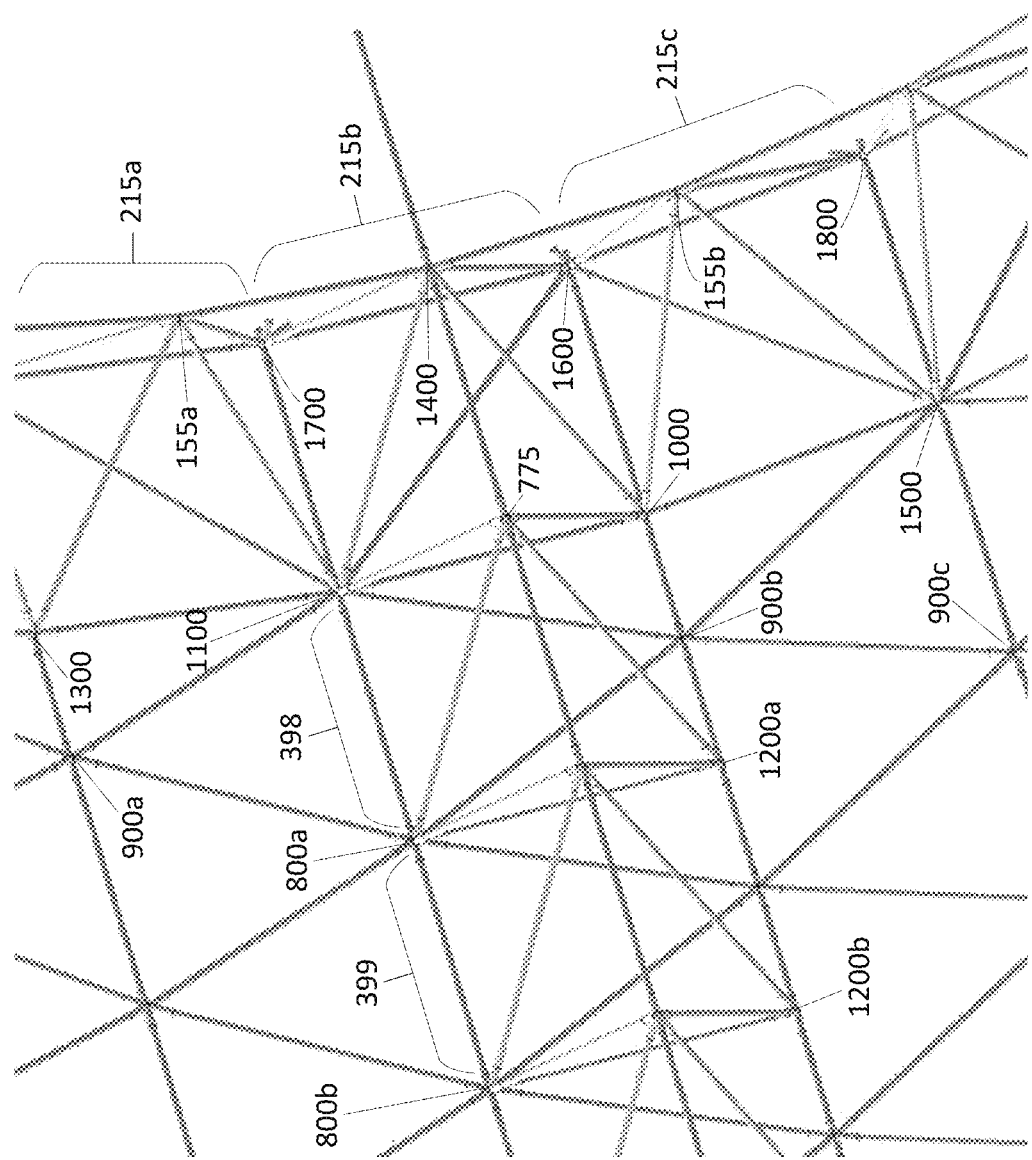
FIG. 6 illustrates an alternative embodiment of a portion of the hull structure where a mainframe intersects a gangway.

FIG. 6 illustrates an example portion of the hull structure with a mainframe and gangway. In particular embodiment, as shown in FIG. 2C, two mainframes (e.g., 240) may be connected to each other by one or more gangways (e.g., 285). FIG. 6 illustrates a closer view of the intersection between a mainframe and gangway. Both a mainframe and gangway may be constructed with a plurality of pyramid structures. For example, FIG. 6 illustrates a mainframe formed in part by pyramid structures 215a, 215b, and 215c. FIG. 6 further illustrates a gangway formed in part by pyramid structures 398 and 399. In particular embodiments, at the intersection between a mainframe and a gangway, the mainframe's pyramid structure (hereinafter referred to as "intersecting mainframe pyramid structure") may require additional slots to connect to or support the gangway pyramid structure (hereinafter referred to as "intersecting gangway pyramid structure"). For example, FIG. 6 illustrates an intersecting mainframe pyramid structure 215b adjacent to three pyramid structures: the mainframe pyramid structures 215a and 215c and the intersecting gangway pyramid structure 398. In particular embodiments, an intersecting mainframe pyramid structure may be connected to an intersecting gangway pyramid structure by connectors. For example, FIG. 6 illustrates the apex joint 1400 of the intersecting mainframe pyramid structure 215b with additional connector slots for connecting to the apex of the intersecting gangway pyramid structure 398. In particular embodiments, intersecting mainframe pyramid structure and its adjacent pyramid structures may be connected to an intersecting gangway pyramid structure by connectors. For example, FIG. 6 illustrates a base joint 1100 of the intersecting mainframe pyramid structure 215b connected to (1) an apex joint 775 of the intersecting gangway pyramid structure 398, (2) a base joint 800 of the intersecting gangway pyramid structure 398, (3) a 6-way geodesic joint 900a, and (4) a 6-way geodesic joint 900b that forms part of the base of the intersecting gangway pyramid structure 398. Similarly, FIG. 6 further illustrates, a base joint 1000 of the intersecting mainframe pyramid structure 215b connected to (1) an apex joint 775 of the intersecting gangway pyramid structure 398, and (2) a 6-way geodesic joint 900b that forms a part of the base of the intersecting gangway pyramid structure 398. In the embodiment shown in FIG. 6, the gangway pyramid structure 398 has a base comprising four base joints 800a, 1100, 1000, and 1200a and one 6-way geodesic joint 900b.

In particular embodiments, joints and connectors described herein or otherwise represented for use in the construction of an airship may be made of metal, including steel or titanium, carbon-fiber, or any other suitable material for the construction of an airship. In particular embodiments, slots of connectors may be substantially cylindrical. In particular embodiments, a joint may be connected to multiple lengths of connectors (e.g., tubes or rods) with an adhesive, by welding, or any other methods suitable for connecting joints and connectors for the construction of an airship. Connectors may be fishmouth cut so that the connectors may be joined together without any gaps and without bending the connectors. In particular embodiments, a metal joint may be joined with several carbon-fiber connectors. In particular embodiments, a joint may be joined with connectors by fitting a tubular section of the joint outside of a tubular connector and injecting an adhesive into the space between the joint and the connector. In other embodiments, a joint may be joined with connectors by fitting a tubular section of the joint inside of a tubular connector and injecting an adhesive into the space between the joint and the connector. In particular embodiments, a collar may be used to assist with injecting an adhesive into the space between a joint and a connector. In particular embodiments, the collar may be 3D printed from resin or any other suitable material and may consist of an internal stepped structure such that the collar may fit snugly around both connectors and joints, regardless of which is larger. In particular embodiments, the collar may hold both a joint and connectors in place as an adhesive is injected. In particular embodiments, slots of connectors may have one or more holes into which liquid adhesive may be injected. With connectors inserted, liquid adhesive may be injected into one or more of the holes, and air bubbles and/or excess adhesive may be allowed to exit from one or more of the other holes. This mechanism for bonding pieces of joints and connectors may be applied to any of the joints described herein.

Figure 7A:
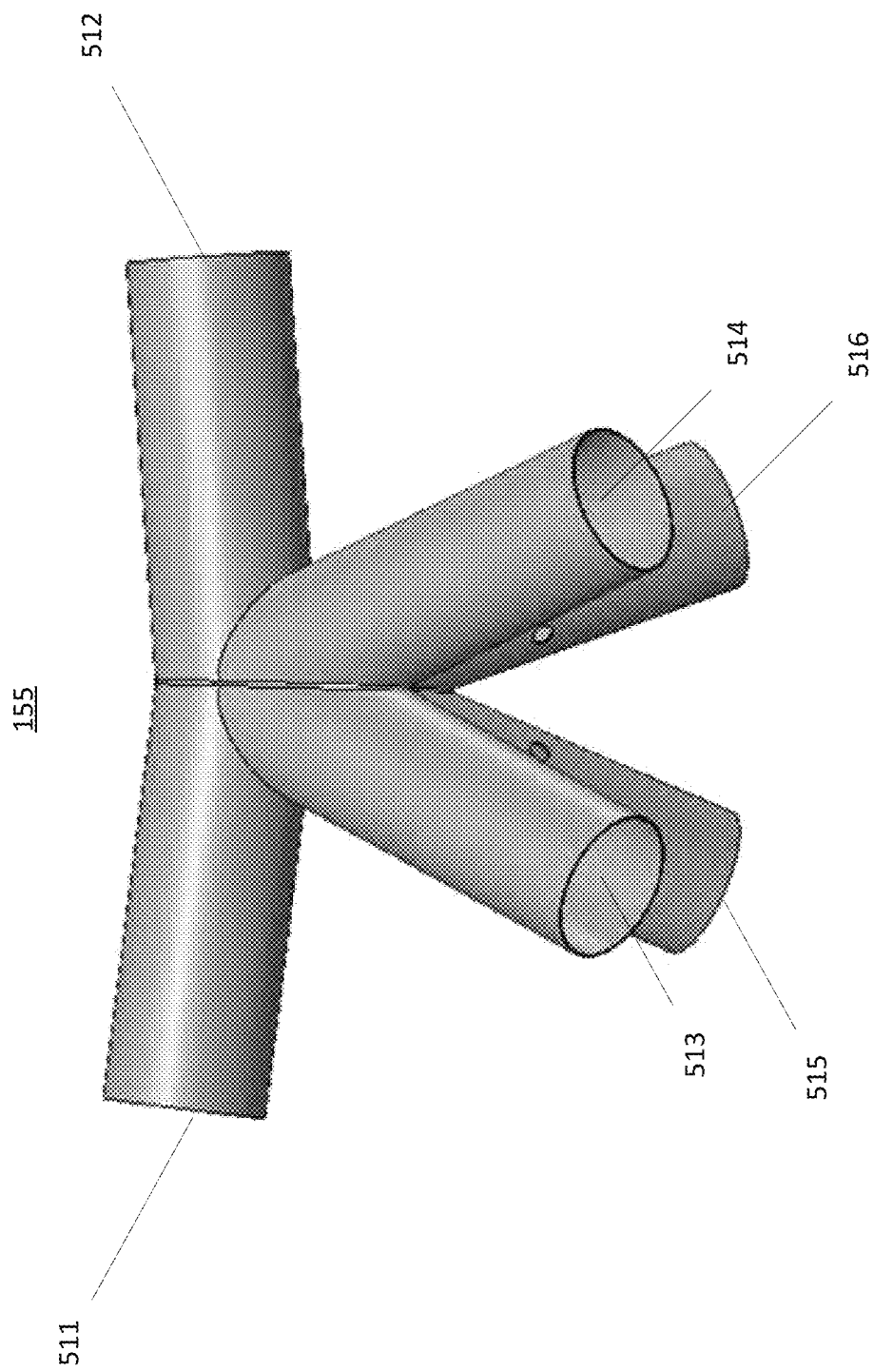
FIGS. 7A-7B illustrate different perspectives of an embodiment of an apex joint used for constructing a mainframe's pyramid structure.
Figure 7B:
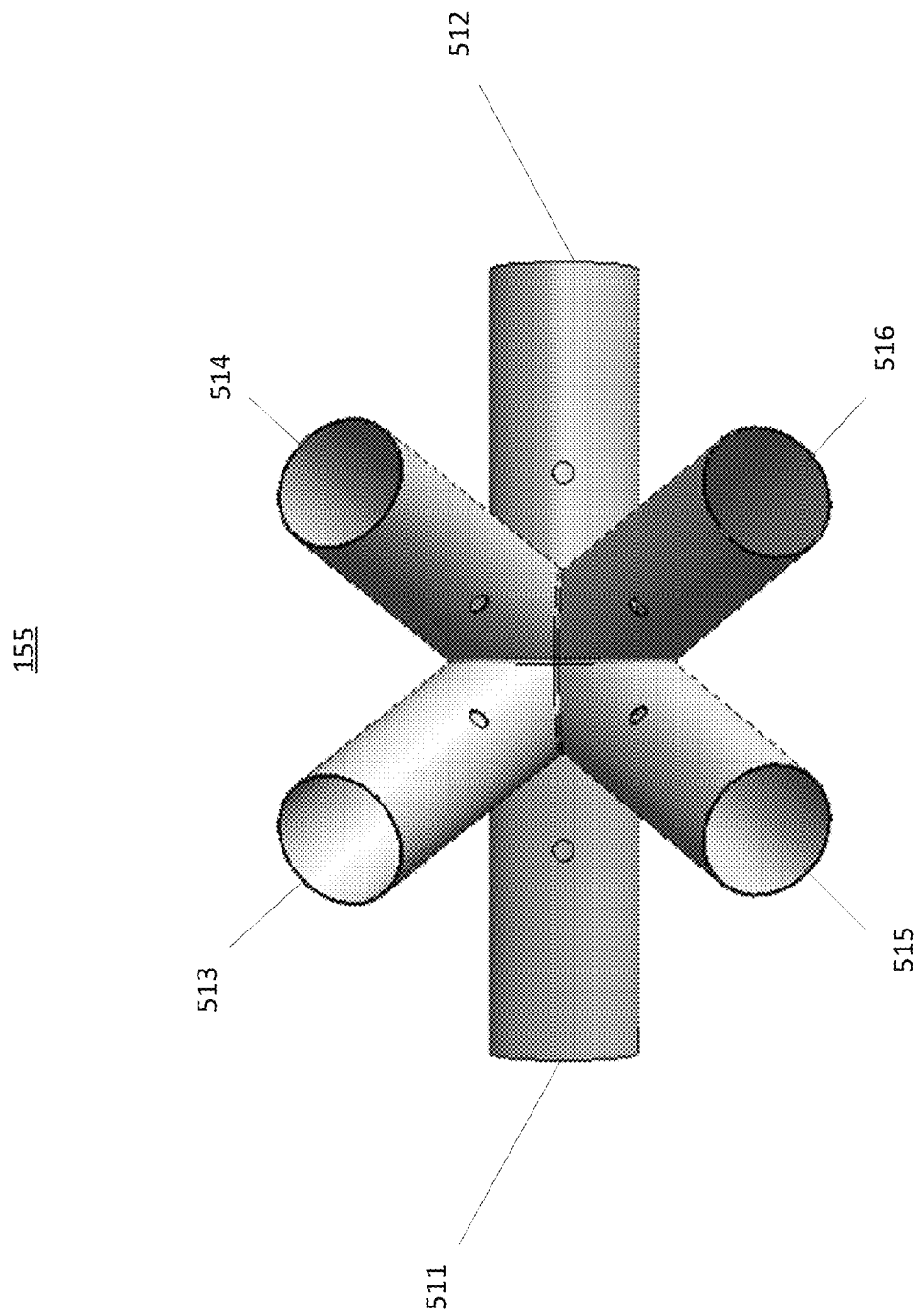

FIGS. 7A and 7B illustrate an example apex joint 155. FIG. 4 also illustrates apex joints 155a and 155b as the apex joints of the pyramid structures 215a and 215c. In particular embodiments, an apex joint 155 may be used to form an apex of pyramid structures. For example, FIG. 4 illustrates slots of an apex joint 155a being used as part of the apex of the pyramid structure 215a: slot 511 is connected to an apex connector 420; slot 512 is connected to an apex connector 421; slot 513 is connected to a connector 415; slot 515 is connected to a connector 418; slot 514 is connected to a connector 416; and slot 516 is connected to a connector 417.

In particular embodiments, apex joints 155 with slightly different configuration than that of the apex joint 155 illustrated in FIGS. 7A and 7B may be used for constructing pyramid structures with slightly different configuration. In particular embodiments where pyramid structures are used for constructing a circular mainframe, such as the mainframe shown in FIG. 2A, slots 511 and 512 of an apex joint 155 may be angled such that the apex connectors connected to slots 511 and 512 form the interior circumference of the circular mainframe. In other embodiments where pyramid structures are used to construct a straight structure (e.g., the gangway 104 in FIG. 1 or the gangway 285 in FIG. 2C), slots 511 and 512 of an apex joint 155 may be straightly aligned such that the apex connectors connected to slots 511 and 512 form a straight line. The particular angle depends on the geometry of mainframes. In particular embodiments, the angle formed by slots 511 and 512 of an apex joint 155 may be approximated with mathematical formulas associated with a circular polygon (e.g., 32-sided polygon). In such embodiments where a mainframe is a circular polygon with n sides, the interior angle of the mainframe may be calculated with the formula $((n-2)/n \times 180°)$, where n is the number of pyramid structures in the mainframe (or equivalently, the number of apex joints 155 in the mainframe). For example, the interior angle of a mainframe with 32 apex joints 155 may be about 168.75°.

In particular embodiments, pyramids structures formed with an apex joint 155 may be constructed with different geometric properties. For example, if pyramid structures with lateral faces that are equilateral triangles are desired, an apex joint 155 will need to be constructed with slots 513 and 515 forming an angle of about 60 degrees, slots 515 and 516 forming an angle of about 60 degrees, slots 516 and 514 forming an angle of about 60 degrees, and slots 514 and 51513 forming an angle of about 60 degrees. The angle between other slots of the apex joint 155 may also need to be adjusted. In other embodiments, an apex joint 155 with different configuration may be constructed.

Figure 8A:
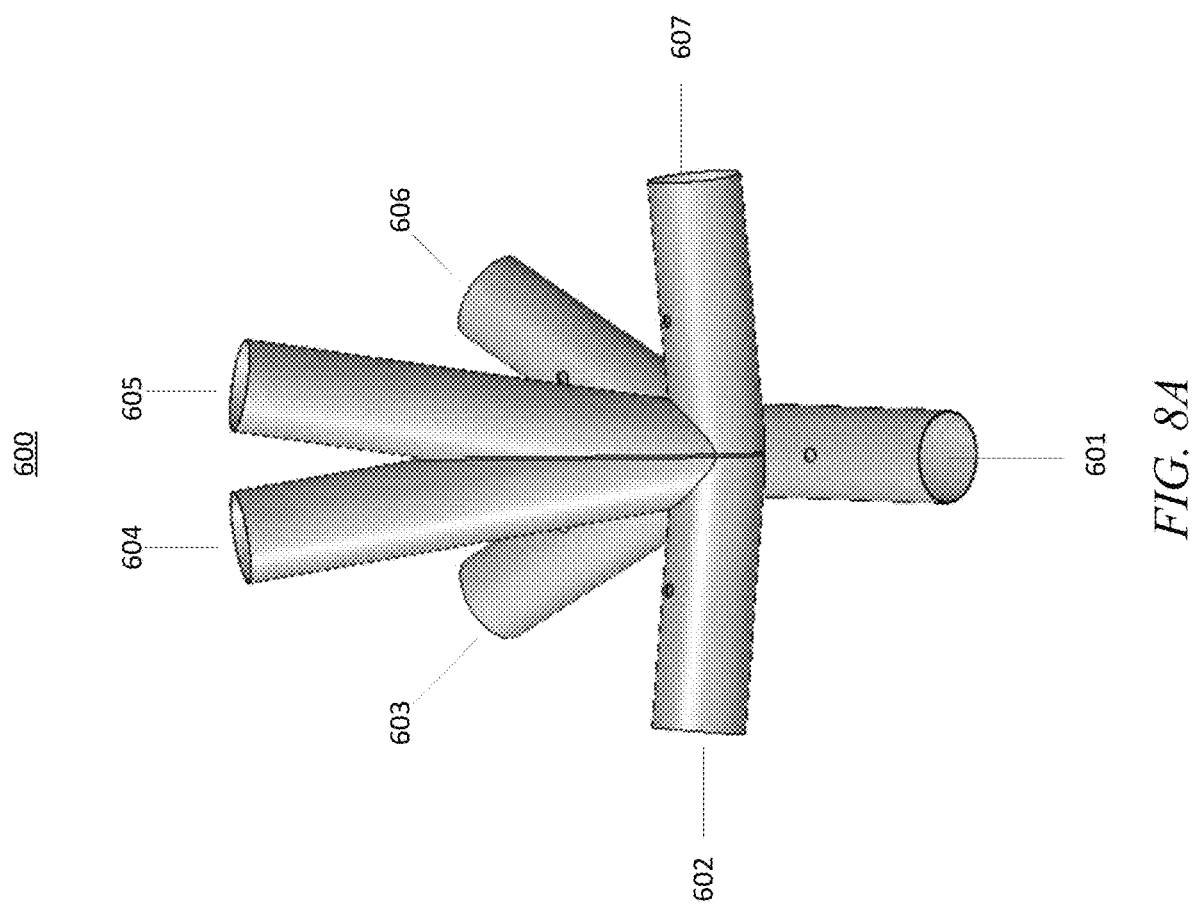
FIGS. 8A-8B illustrate different perspectives of an embodiment of a mainframe-to-geodesic base joint used for constructing a mainframe's pyramid structure.
Figure 8B:
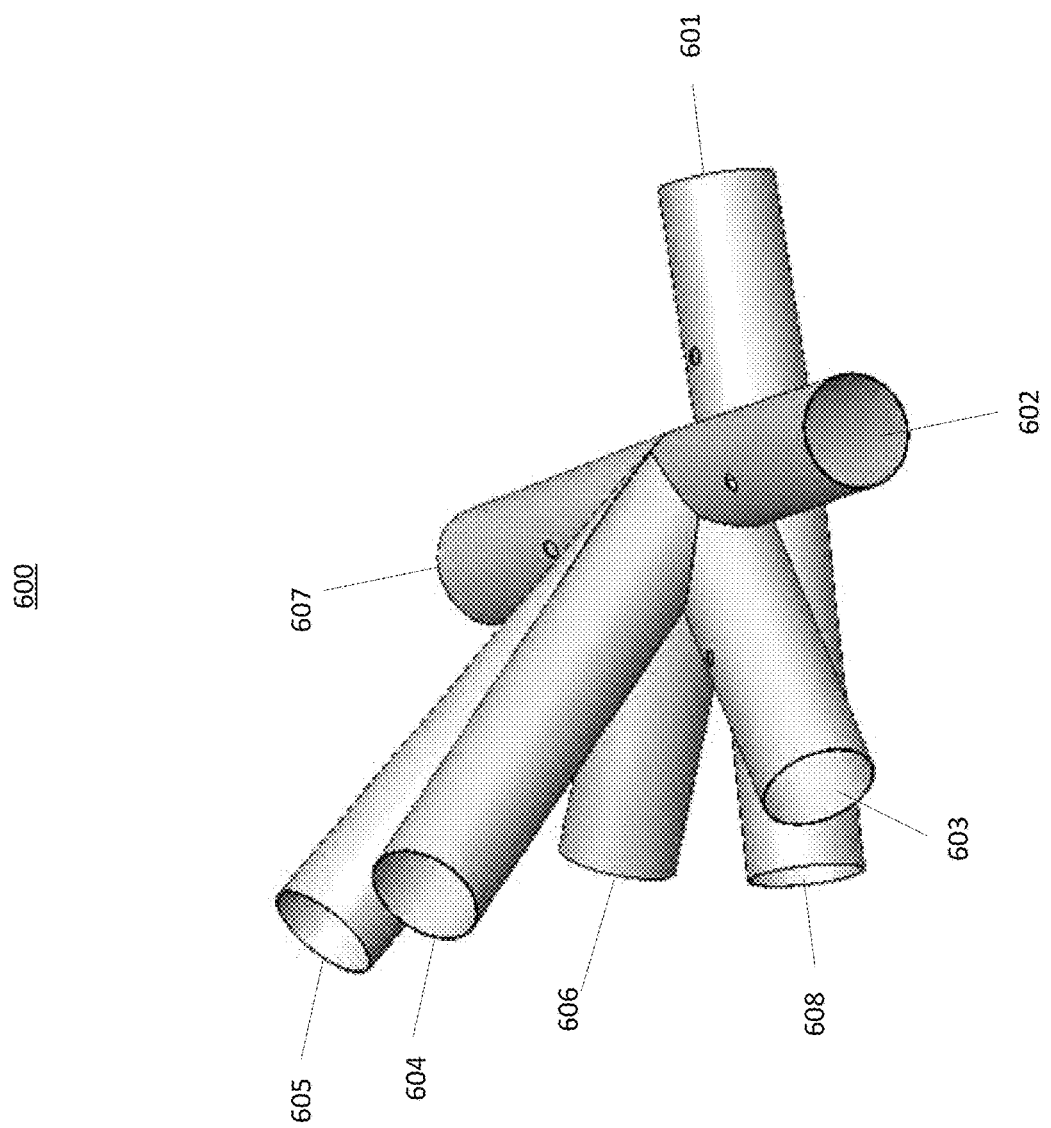

FIGS. 8A and 8B illustrate an example base joint 600 used for constructing a pyramid structure (e.g., 215a or 215b shown in FIG. 4). In particular embodiments, a base joint 600 may have eight slots 601, 602, 603, 604, 605, 606, 607, and 608 (not visible in FIG. 8A but visible in FIG. 8B). In particular embodiments, a base joint 600 may form a corner of the base of a pyramid structure. For example, FIG. 4 illustrates a base joint 600 forming the corner of the base of the pyramid structure 155a: slot 608 is connected to joint 1300 via connector 412; slot 602 is connected to joint 1700 via connector 411; slot 603 is connected to joint 1100 via connector 290; slot 604 is connected to joint 155a via connector 416; slot 607 is connected to an unlabeled base joint of an unlabeled adjacent pyramid structure; slot 606 is connected to another unlabeled base joint of the unlabeled adjacent pyramid structure; slot 605 is connected to an apex joint of the unlabeled adjacent pyramid structure; and slot 601 is not connected to any structure but would be if the airship was fully constructed. In particular embodiments, each of the slots 601-608 may be configured to receive and substantially envelop a tubular object, such as a connector. In particular embodiments, each of the slots 601-608 may be substantially cylindrical.

In particular embodiments, base joints with slightly different configuration than that of base joint 600 may be used for constructing pyramid structures with slightly different configuration. In particular embodiments where pyramid structures are used for constructing a circular mainframe, such as the mainframe shown in FIG. 4, slots 602 and 607 of a base joint 600 may be angled such that the connectors connected to slots 602 and 607 form one side of the exterior circumference of the circular mainframe. The exterior angle between other slots of the base joint 600 may also need to be adjusted in accordance with the structure of the circular mainframe. In other embodiments where pyramid structures are used to construct a straight structure (e.g., the gangway 104 in FIG. 1 or the gangway 285 in FIG. 2C), slots 602 and 607 of a base joint 600 may be straightly aligned such that the connectors connected to slots 602 and 607 form a straight line. The angle between other slots of the base joint 600 may need to be adjusted in accordance with the structure of the straight structure. In particular embodiments, the exterior angle formed by slots 602 and 607 of a base joint 600 may be adjusted in accordance to the geometry of mainframes. In particular embodiments, the exterior angle formed by slots 602 and 607 of a base joint 600 may be approximated with mathematical formulas associated with a circular polygon (e.g., 32-sided polygon). In such embodiments where a mainframe is a circular polygon with n sides, the exterior angle formed by slots 602 and 607 of the base joint 600 may be calculated with the formula $360° - (((n-2)/n) \times 180°)$, where n is the number of pyramid structures in the mainframe (or equivalently, the number of apex joint in the mainframe). For example, for a mainframe with 32 pyramid structures, the exterior angle formed by slots 602 and 607 of a base joint 600 may be about 191.25°.

In particular embodiments, pyramids structures formed with a base joint 600 may be constructed with different geometric properties. For example, if pyramid structures with lateral faces that are equilateral triangles are desired, a base joint 600 will need to be constructed with slots 604 and 608 forming an angle of about 60 degrees and slots 604 and 602 forming an angle of about 60 degrees. The angle between other slots of base joint 600 may also need to be adjusted. In other embodiments, a base joint 600 with different configuration may be constructed.

Figure 9:
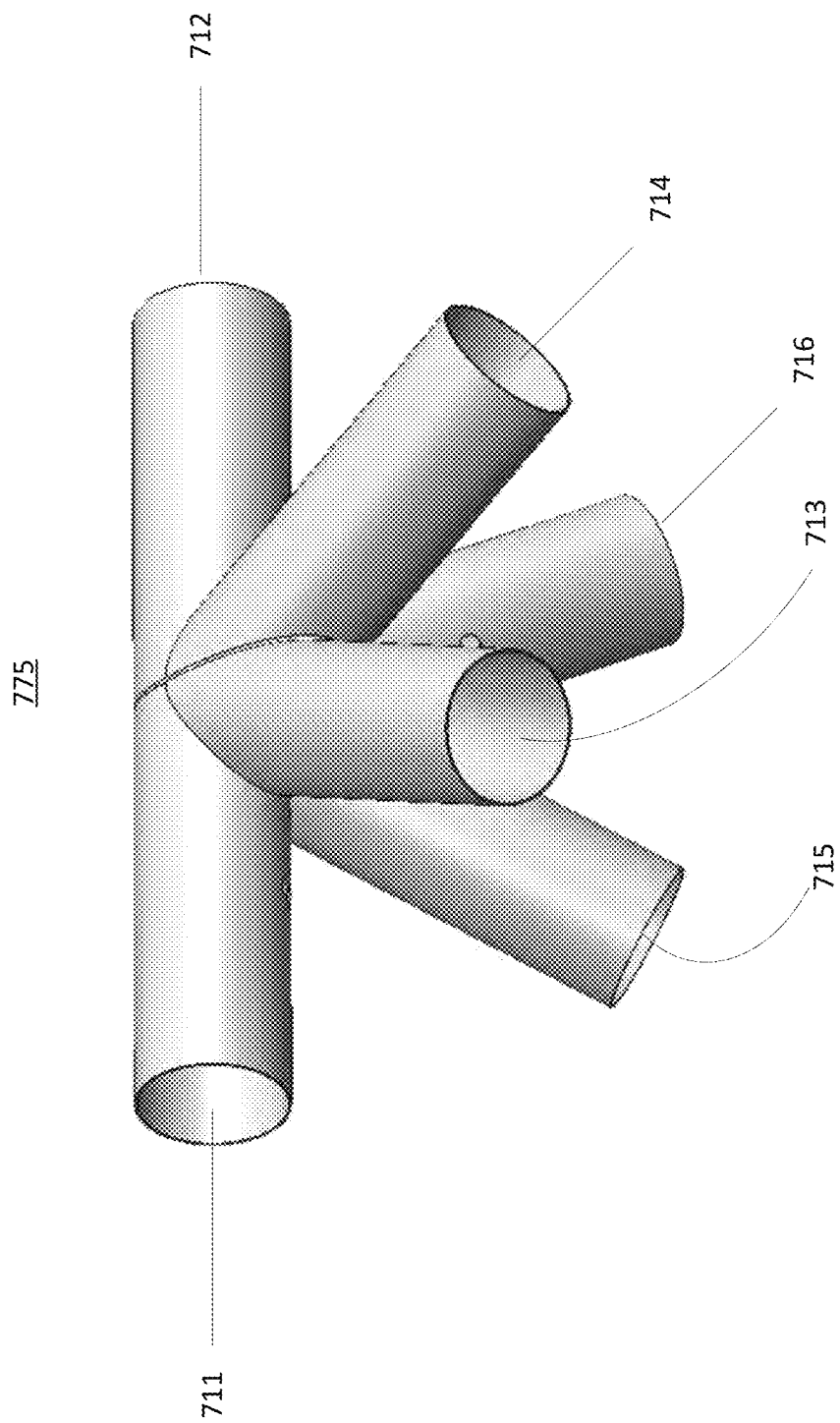
FIG. 9 illustrates an alternative embodiment of an apex joint used for constructing a gangway pyramid structure.

FIG. 9 illustrates an example apex joint 775. In particular embodiments, an apex joint 775 may have six slots 711-716. Slots 713 and 714 may be symmetrical to slots 715 and 716 across an imaginary plane cutting through the center of the joint 775. Slots 711 and 712 may be apex-to-apex slots. While these apex-to-apex slots are similar to those of apex joint 155, they are different in that their axes are aligned. In particular embodiments, the interior of slots 711 and 712 may not be connected, which means that two separate connectors would need to be inserted into each of the two slots. In other embodiments, the interior of slots 711 and 712 may form a continuous channel through which a single connector may be inserted. Other features of an apex joint 775 are similar to that of an apex joint 155 of a mainframe pyramid structure and, therefore, would not be repeated for brevity. In particular embodiments, an apex joint 775 may be used to construct a gangway pyramid structure, such as the one as shown in FIG. 6. In particular embodiments, an apex joint 775 may have four slots connected to a base of a gangway pyramid structure. For example, FIG. 6 illustrates an apex joint 775 with slots 713-716 connected to the base of the pyramid structure 398.

Figure 10A:
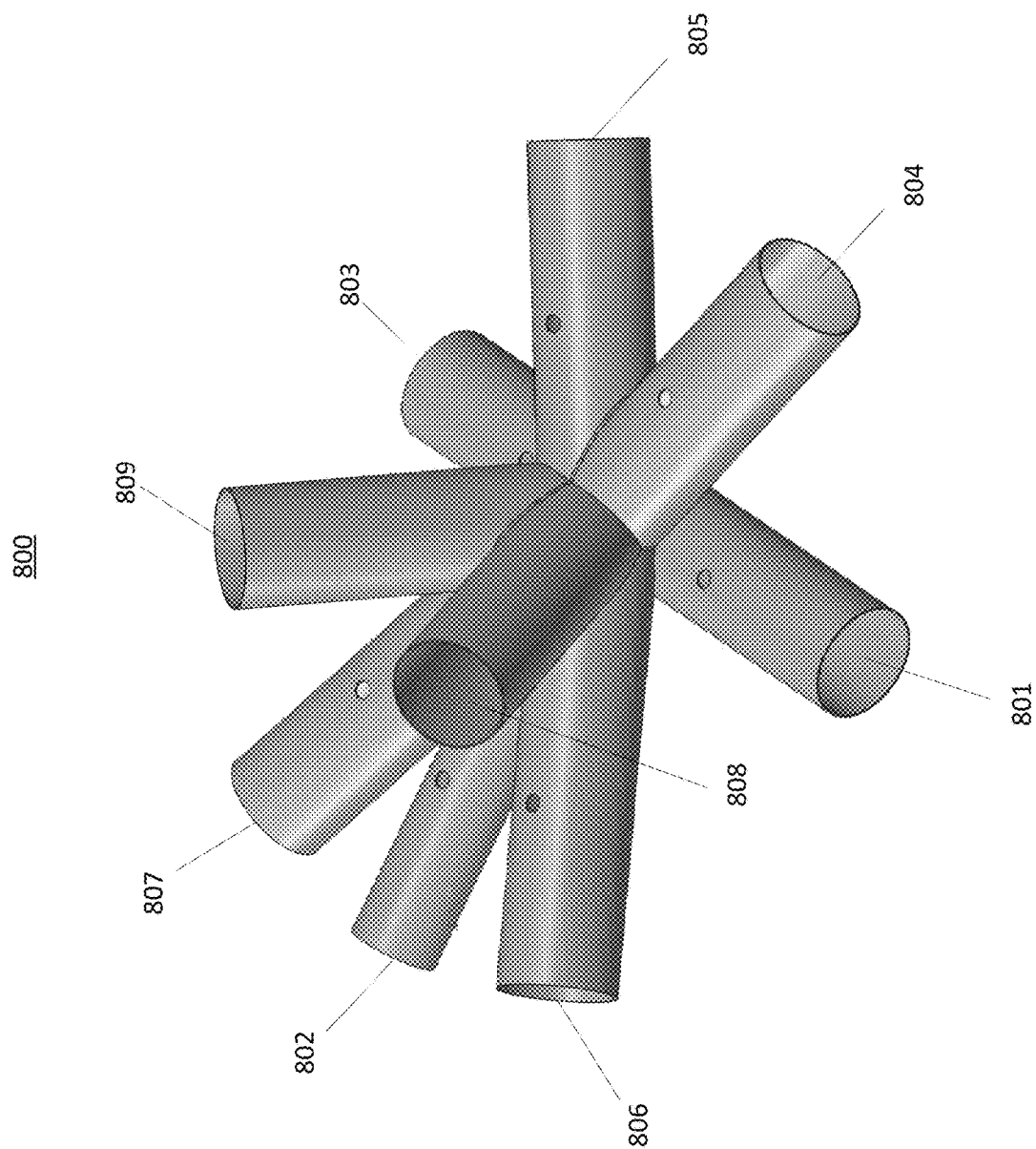
FIGS. 10A-10B illustrate different perspectives of an embodiment of a gangway-to-geodesic base joint of a gangway pyramid structure.
Figure 10B:
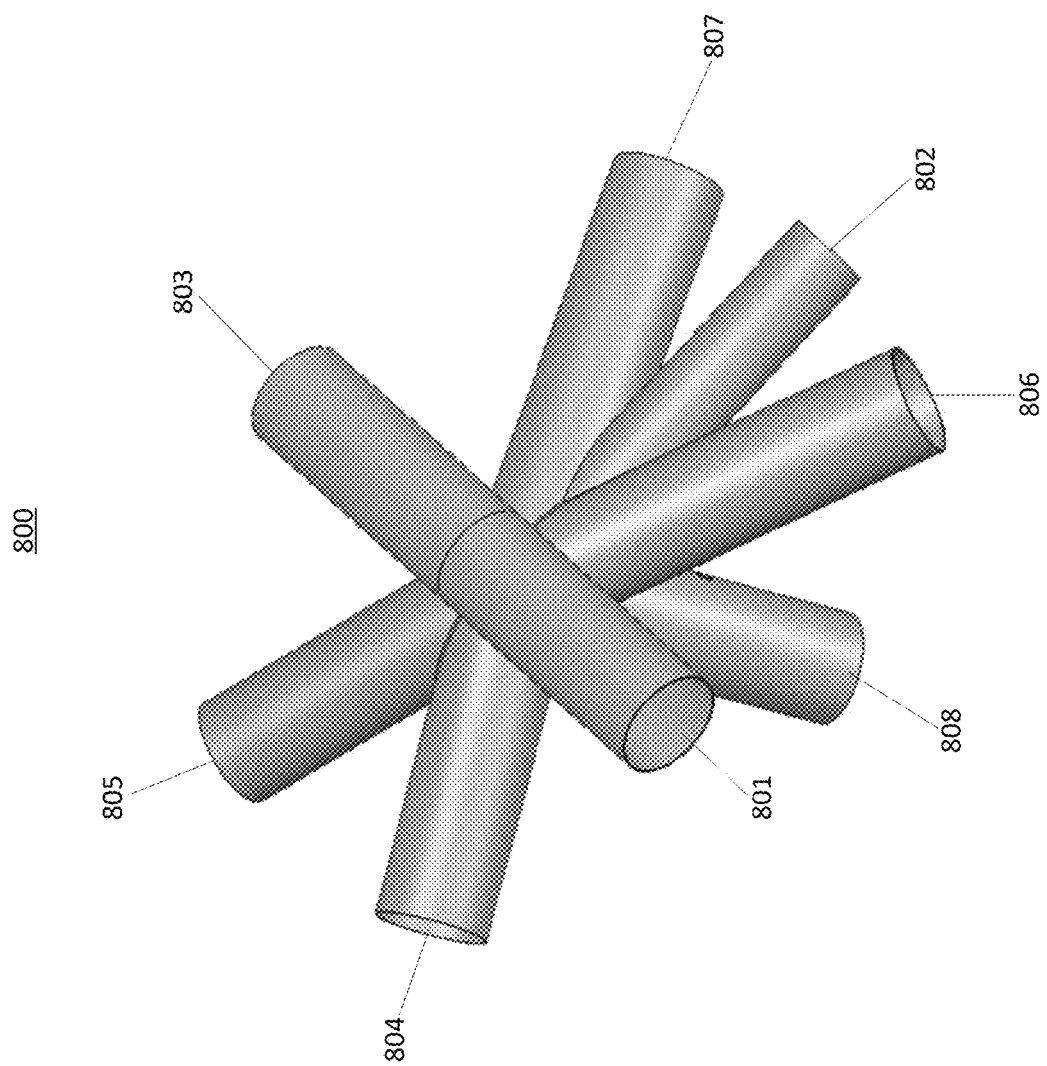

FIGS. 10A-10B illustrate an example gangway-to-geodesic base joint 800 of a gangway pyramid structure. In particular embodiments, a gangway-to-geodesic base joint 800 may contain nine slots 801-809. In particular embodiments, a gangway-to-geodesic base joint 800 may be used to form a corner of two gangway pyramid structures and to connect a gangway to a geodesic structure. For example, FIG. 6 illustrates a gangway-to-geodesic base joint 800a forming a corner of the gangway pyramid structures 398 and 399 and being used to connect a gangway to an unlabeled geodesic structure: slot 804 is connected to joint 900a of the unlabeled geodesic structure; slot 805 is connected to an unlabeled joint of the unlabeled geodesic structure; slot 803 is connected to adjacent gangway-to-geodesic base joint 800*b*; slot 801 is connected to mainframe-gangway-base-geodesic joint 1100; slots 808 and 809 are connected to the apex of gangway pyramid structures 398 and 399; slot 802 is connected to gangway base joint 1200*a*; slots 806 and 807 are connected to 6-way geodesic joint 900*b* and an unlabeled 6-way geodesic joint on the other side of the gangway. In particular embodiments, slots 801-807 may all be substantially on the same plane with respect to orientation and slots 808 and 809, which are used to form a side of a pyramid structure, may be configured to be substantially be on the same plane as the side of the pyramid structure.

Figure 11:
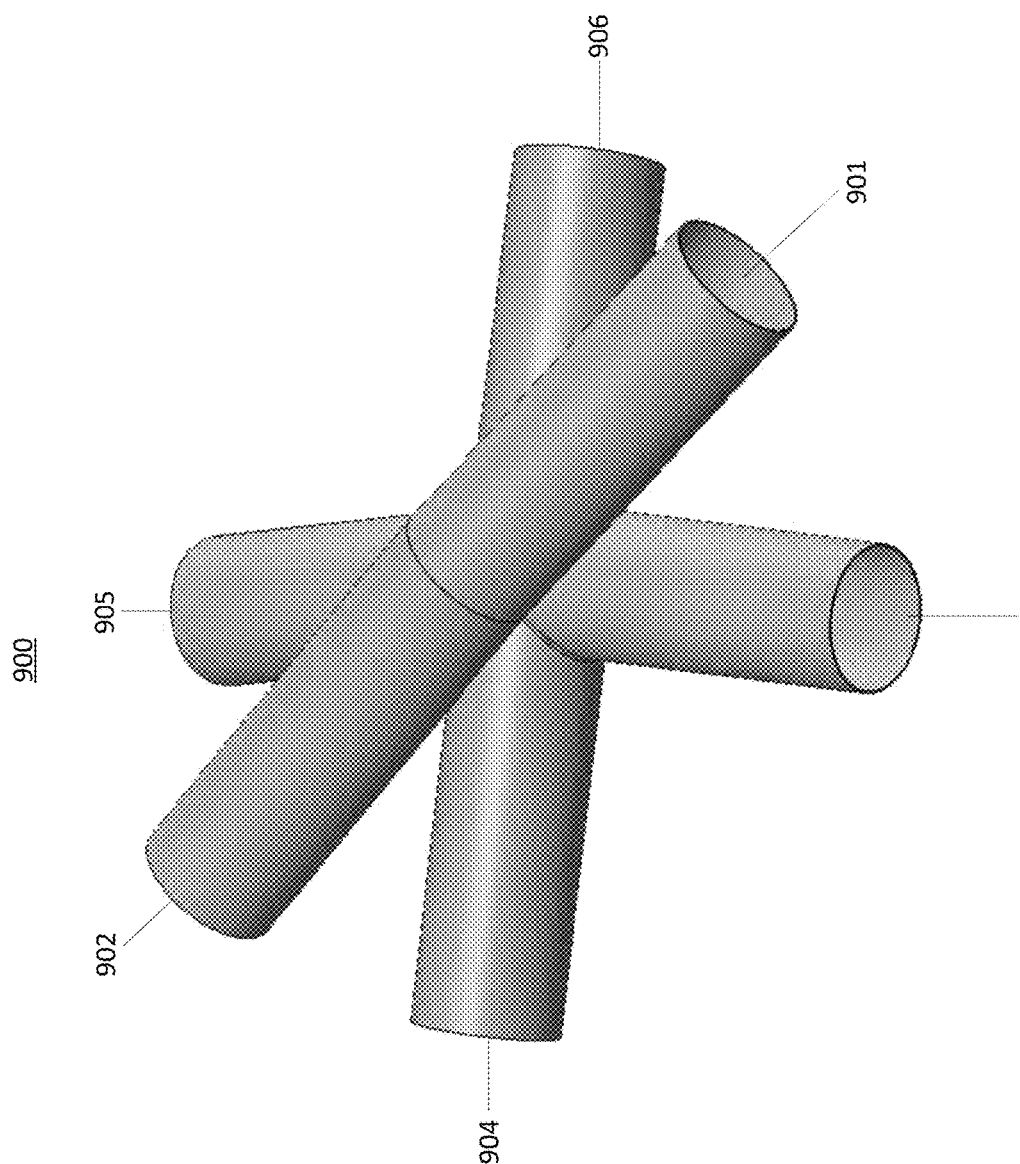
FIG. 11 illustrates an alternative embodiment of a 6-way geodesic joint.

FIG. 11 illustrates an example of 6-way geodesic joint 900. In particular embodiments, a 6-way geodesic joint 900 may be used to form a geodesic structure as shown in FIG. 5. In particular embodiments, a geodesic structure is constructed with a plurality of 6-way geodesic joints 900 connected to a plurality of longitudinal connectors 490 to form rows of triangles with alternating orientations. In particular embodiments, a 6-way geodesic joint 900 may have six connector slots 901, 902, 903, 904, 905, and 906. In particular embodiments, the interior of slots 901 and 902 may form a continuous channel to allow a single longitudinal connector 490 to pass through. For example, embodiment of a geodesic structure shown in FIG. 5 may comprise rows of longitudinal connectors 490 that is formed by a series of separate longitudinal connectors 490 or a single, longer longitudinal connector 490 passing through slots 901 and 902 of multiple-way geodesic joints 900. In other embodiments, the interior of slots 901 and 902 may not be connected, requiring separate longitudinal connectors 490 to be inserted into slots 901 and 902. In particular embodiments, a 6-way geodesic structure 900 may comprise an "X" pattern, formed by slots 903, 904, 905, and 906, that is placed under (or over, depending on its orientation) slots 901 and 902.

In particular embodiments, in addition to forming geodesic structures, a 6-way geodesic joints 900 may be used to form a portion of the base of a gangway pyramid structure. A 6-way geodesic joints 900 may also be used to connect a gangway pyramid structure to a geodesic structure. For example, FIG. 6 illustrates a 6-way geodesic gangway base joint 900*b* forming a portion of the base of the gangway pyramid structure 398: slots 901 and 902 are respectively connected to base joints 1000 and 1200*a* on one side of gangway pyramid structure 398; slots 903 and 904 are respectively connected to gangway base joints 800 and 1100 on the other side of gangway pyramid structure 398; slots 905 and 906 are respectively connected to 6-way geodesic joint 900*c* and mainframe-to-geodesic joint 1500.

Figure 12A:
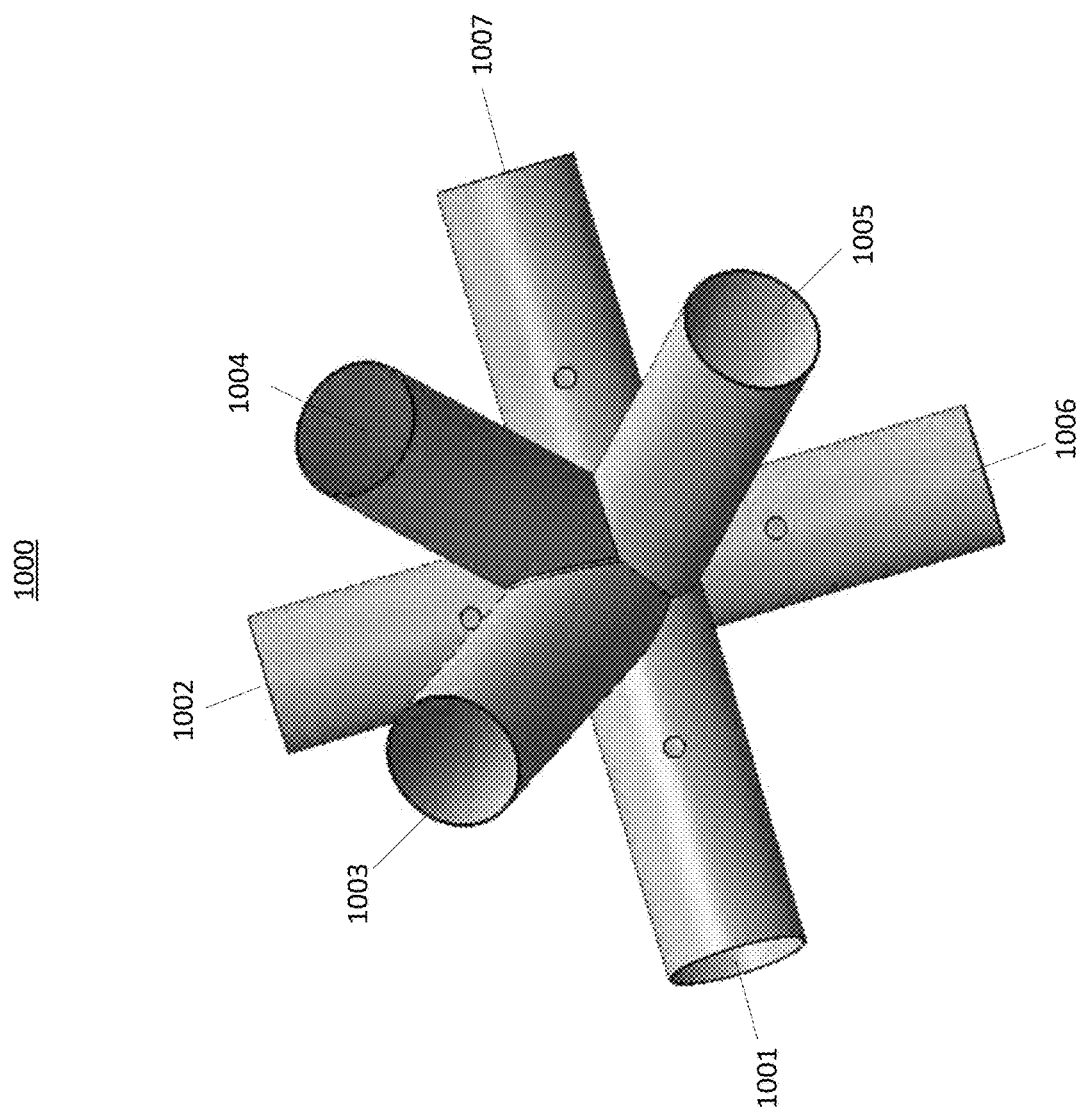
FIGS. 12A-12B illustrate different perspectives of an embodiment of a gangway-to-mainframe base joint.
Figure 12B:
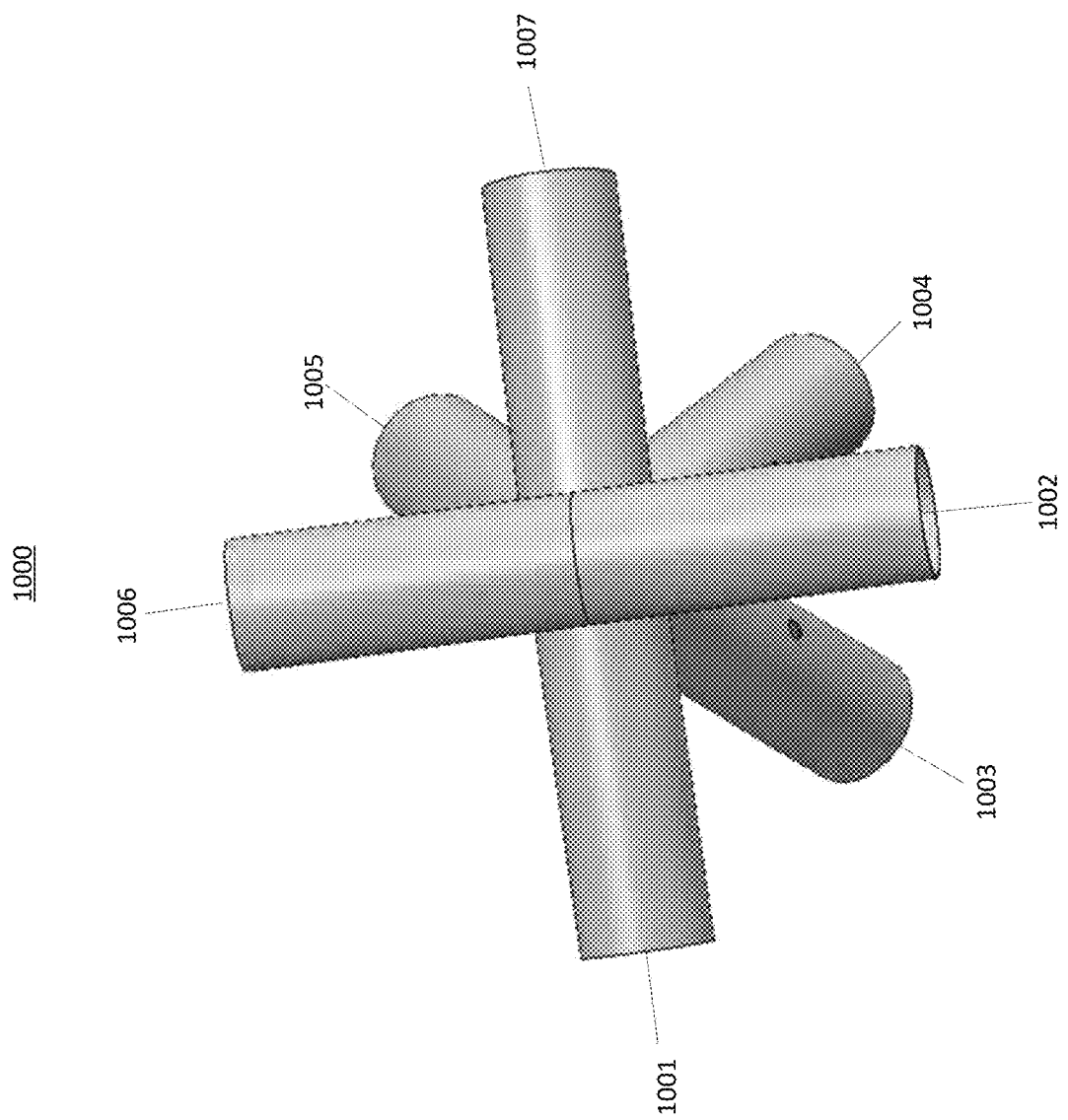

FIGS. 12A-12B illustrate an example gangway-to-mainframe base joint 1000. In particular embodiments, a gangway-to-mainframe base joint 1000 may have seven slots 1001, 1002, 1003, 1004, 1005, 1006, and 1007. In particular embodiments, a gangway-to-mainframe base joint 1000 may connect two mainframe pyramid structures to a gangway pyramid structure at their bases by forming a corner of the three pyramid structures. For example, FIG. 6 illustrates a gangway-to-mainframe base joint 1000 connecting mainframe pyramid structures 215*b* and 215*c* to gangway pyramid structure 398: slot 1001 is connected to 6-way geodesic gangway base joint 900*b*; slot 1002 is connected to mainframe-gangway-base-geodesic joint 1100; slot 1003 is connected to apex joint 775 of pyramid structure 398; slots 1004 and 1005 are connected to mainframe apex joints 1400 and 155*b* of mainframe pyramid structures 215*b* and 215*c*; slot 1006 is connected to mainframe-to-geodesic joint 1500; and slot 1007 is connected to mainframe base joint 1600.

Figure 13A:
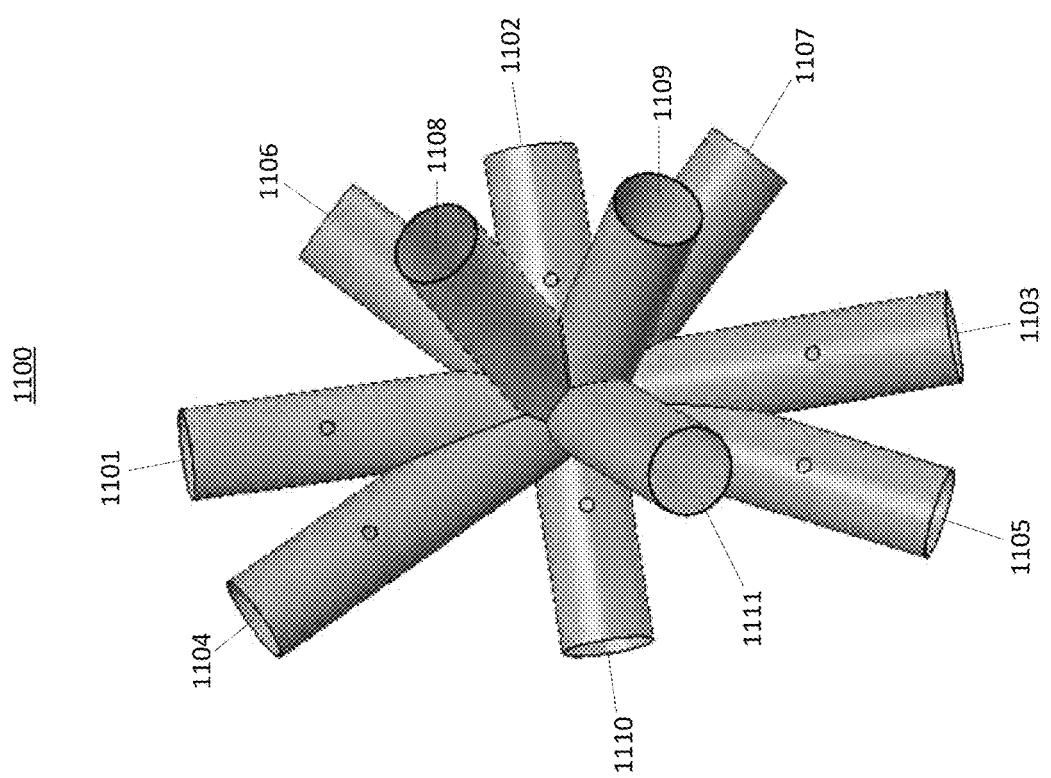
FIGS. 13A-13B illustrate different perspectives of an embodiment of a mainframe-gangway-base-geodesic joint.
Figure 13B:
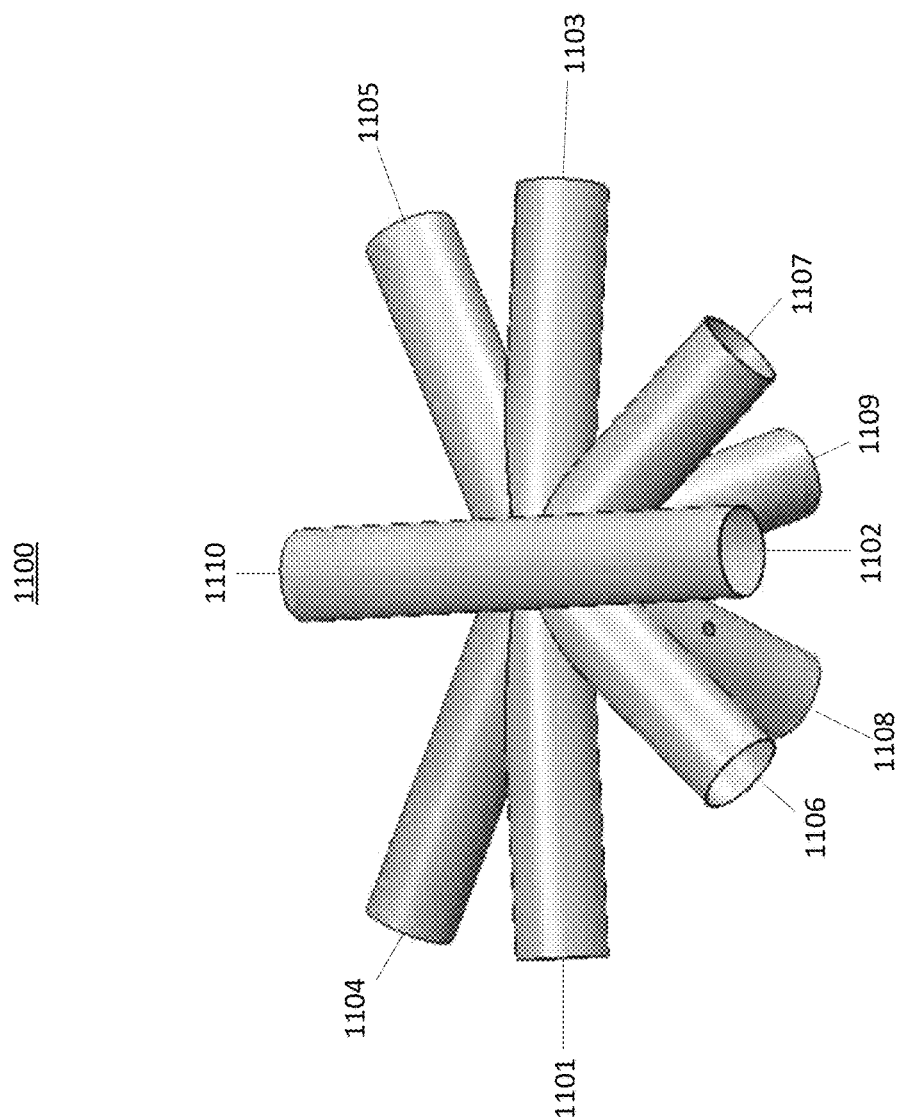

FIGS. 13A-13B illustrate an example mainframe-gangway-base-geodesic joint 1100. In particular embodiments, a mainframe-gangway-base-geodesic joint 1100 may have eleven connector slots for connecting to multiple other joints in gangways, mainframes, and geodesic structures. For example, FIG. 6 illustrates a mainframe-gangway-base-geodesic joint 1100: slots 1101 and 1102 are connected to joints 1300 and 1700 to form two adjoining sides of the base of the pyramid structure 215*a*; slot 1106 is connected to joint 600 to form the diagonal connector for that base; slots 1103 and 1102 are connected to joints 1000 and 1700 to form two adjoining sides of the base of pyramid structure 215*b*; slot 1107 is connected to joint 1600 to form the diagonal connector for that base; slots 1103 and 1110 are connected to joints 1000 and 800 to form two adjoining sides of the base of gangway pyramid structure 398; slot 1105 is connected to 6-way geodesic joint 900*b* on the other side of gangway pyramid structure 398; slots 1104 is connected to 6-way geodesic joint 900*a* of the adjoining geodesic structure; slot 1111 is connected to apex joint 775 of gangway pyramid structure 398; slot 1108 is connected to apex joint 155*a* of pyramid structure 215*a*; and slot 1109 is connected to apex joint 1400 of pyramid structure 215*b*. FIG. 6 further illustrates slot 1106 as being angled at 10 degrees relative to slots 1101 and 1102 and slot 1107 as being angled at 10 degrees relative to slots 1102 and 1103. In other embodiments, slots 1106 and 1107 may be angled at different angles in accordance to the configuration of structures connected to the mainframe-gangway-base-geodesic joint 1100.

Figure 14A:
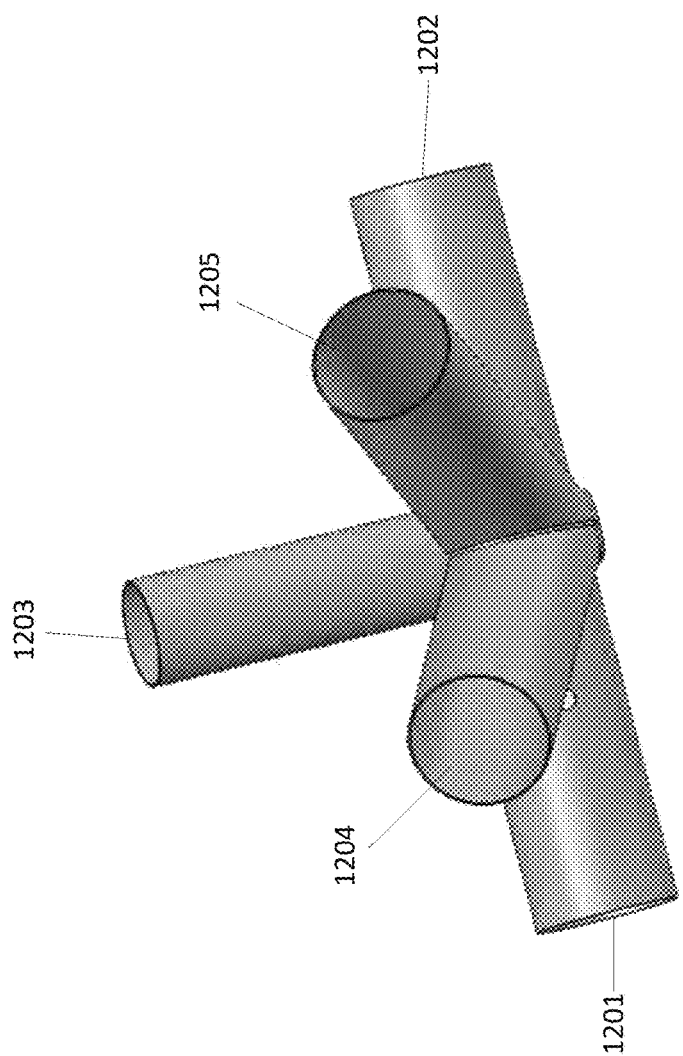
FIGS. 14A-14B illustrate different perspectives of an embodiment of a base joint of a gangway pyramid structure.
Figure 14B:
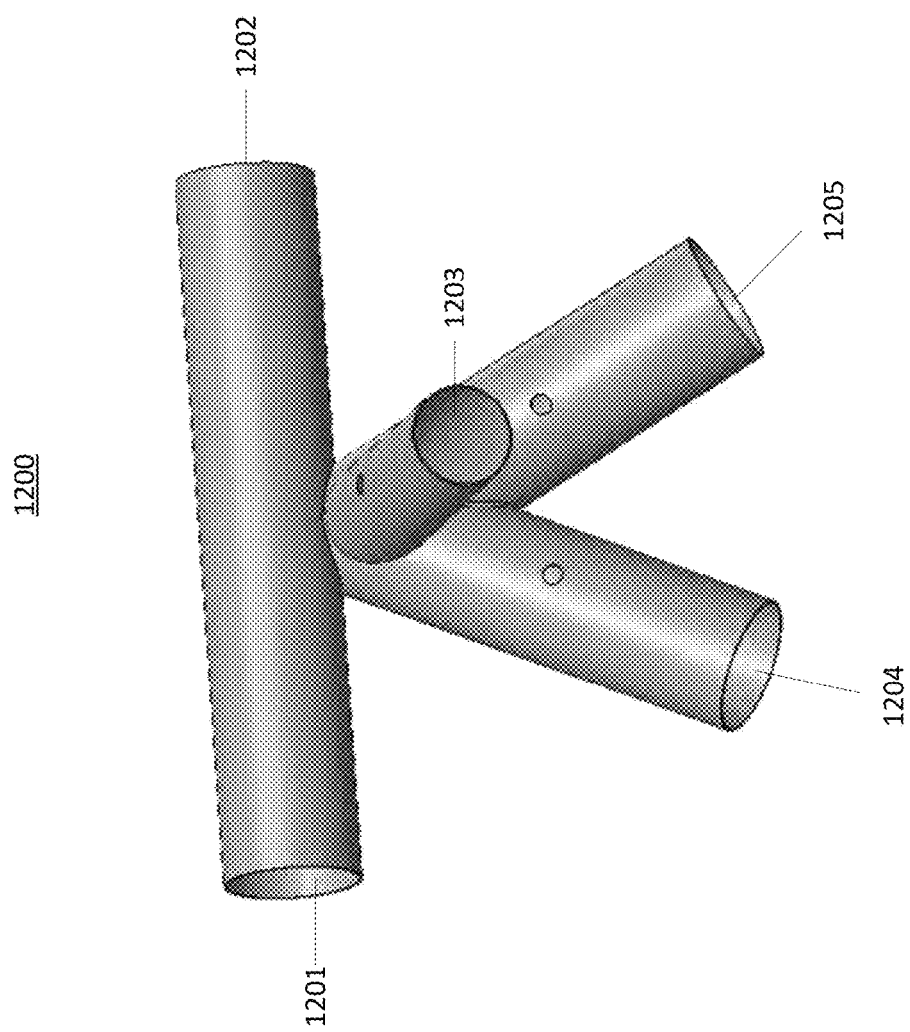

FIGS. 14A-14B illustrate an example gangway base joint 1200 used in a gangway pyramid structure. As shown in FIG. 6, a gangway base joint 1200*a* may be connected with a gangway-to-geodesic base joint 800*a* to form one side of a base of gangway pyramid structure 399. In particular embodiments, gangway pyramid structures may be different than intersecting gangway pyramid structures in that their bases are constructed using different joints. For example, FIG. 6 illustrates a gangway pyramid structure 399 with a base formed by gangway base joints 1200*a* and 1200*b* and gangway-to-geodesic base joints 800*a* and 800*b*, whereas intersecting gangway pyramid structure 398 is illustrated with a base formed by gangway-to-mainframe base joint 1000, mainframe-gangway-base-geodesic joint 1100, gangway-to-geodesic base joint 800, and gangway base joint 1200*a*. In particular embodiments, gangway base joint 1200 may form adjacent corners of two adjacent gangway pyramid structures. For example, FIG. 6 illustrates a gangway base joint 1200*a* forming the corner for gangway pyramid structures 398 and 399. In particular embodiments, gangway base joint 1200 may include three gangway base-to-base slots 1201, 1202, and 1203. For example, FIG. 6 illustrates slots 1201 and 1203 forming the corner of a base of one gangway pyramid structure 399 and slots 1202 and 1203 forming the corner of a base of gangway pyramid structure 398. In particular embodiments, slots 1201 and 1202 may connect to two adjacent 6-way geodesic gangway base joints (e.g., 6-way geodesic gangway base joints 900*b* in FIG. 6), while slot 1203 may connect to a gangway-to-geodesic base joint (e.g., 800 in FIG. 6) on the other side of the gangway. In particular embodiments, base-to-apex slots 1204 and 1205 may connect to apex joints of the adjoining gangway pyramid structures (e.g., 399 and 398 in FIG. 6).

Figure 15A:
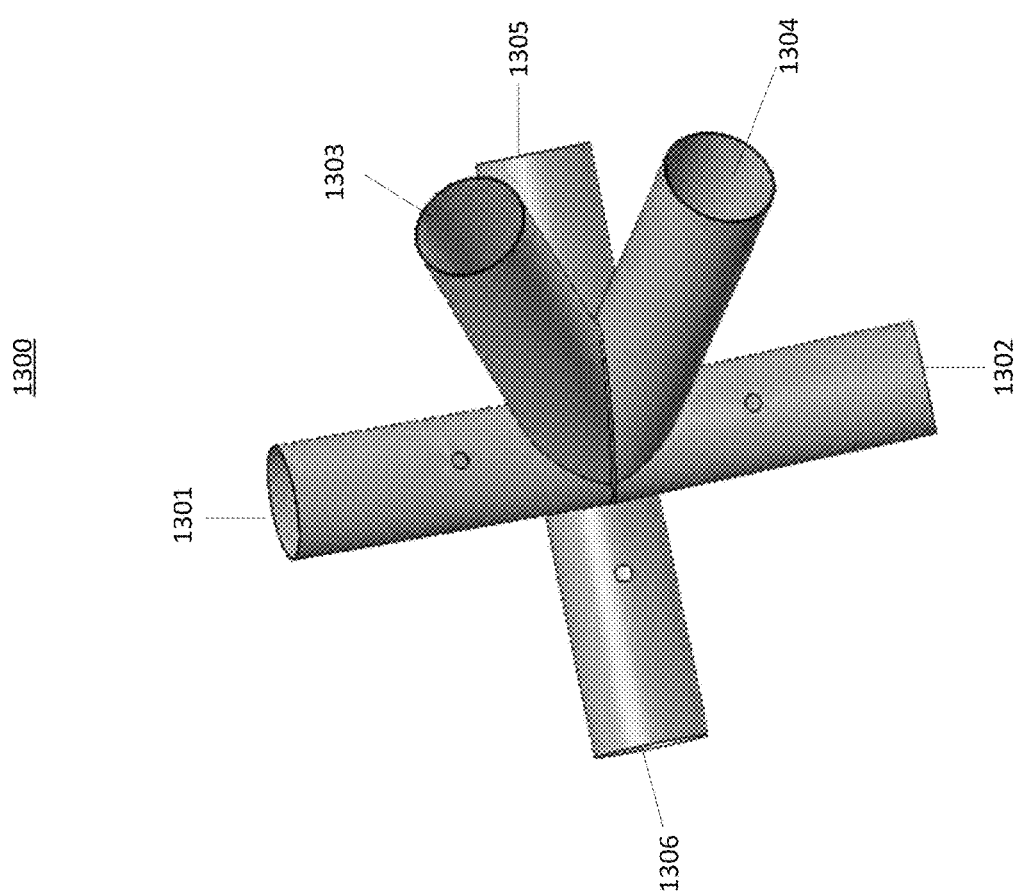
FIGS. 15A-15B illustrate different perspectives of an embodiment of a mainframe-to-geodesic base joint.
Figure 15B:
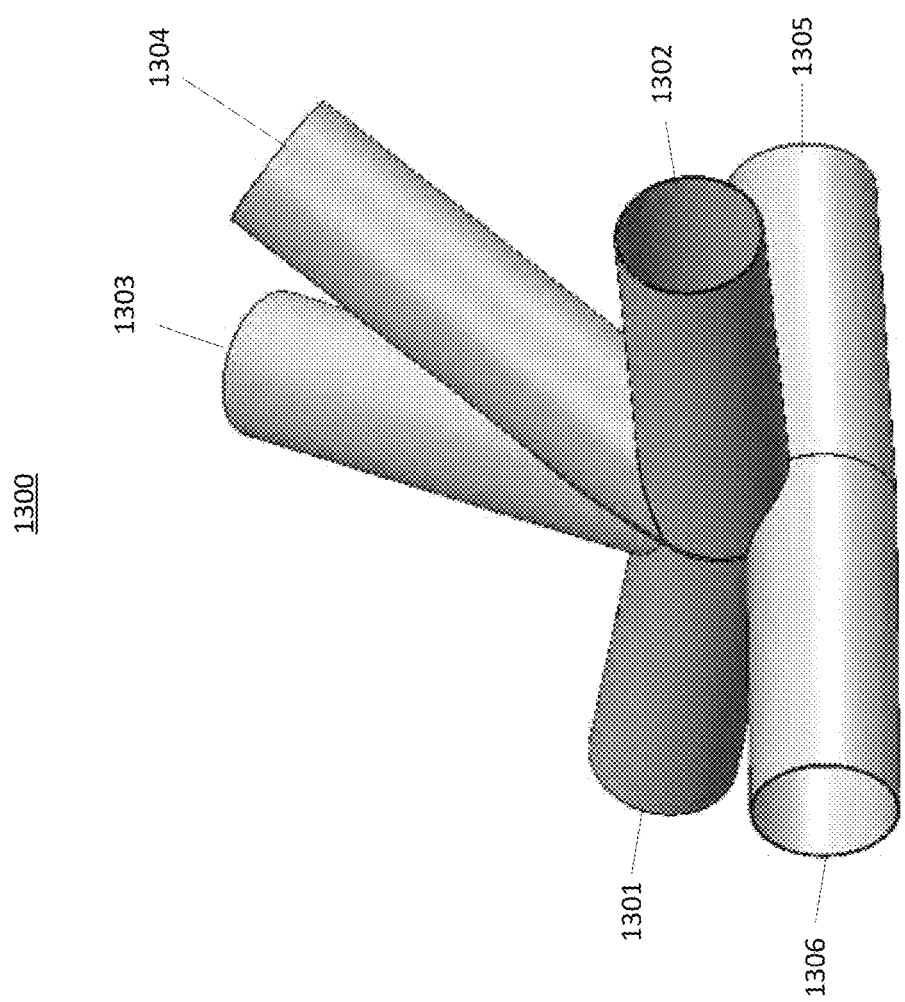

FIGS. 15A and 15B illustrate an example mainframe-to-geodesic base joint 1300. In particular embodiments, a mainframe-to-geodesic base joint 1300 may be configured to connect two mainframe pyramid structures at the corner of each of their respective bases to a geodesic structure via a longitudinal connector. For example, FIG. 6 illustrates a mainframe-to-geodesic base joint 1300 used to form the corners of mainframe pyramid structure 215a and an adjacent mainframe pyramid structure above it (not shown). In particular embodiments, a base joint 1300 may have six connector slots. Slots 1301 and 1302 may be configured to connect to adjacent mainframe base joints (e.g., 1100 in FIG. 4). Center connector slot 1305 may connect to another base joint (e.g., 600 in FIG. 4) located on the other side of the mainframe. Apex connector slots 1303 and 1304 may be configured to connect to apexes of two adjacent mainframe pyramid structures (e.g., apex joint 155a in FIG. 4). Connector slot 1306 may be configured to connect to, via a longitudinal connector, a 6-way geodesic joint (e.g., 900a in FIG. 6) of the adjacent geodesic structure.

Figure 16A:
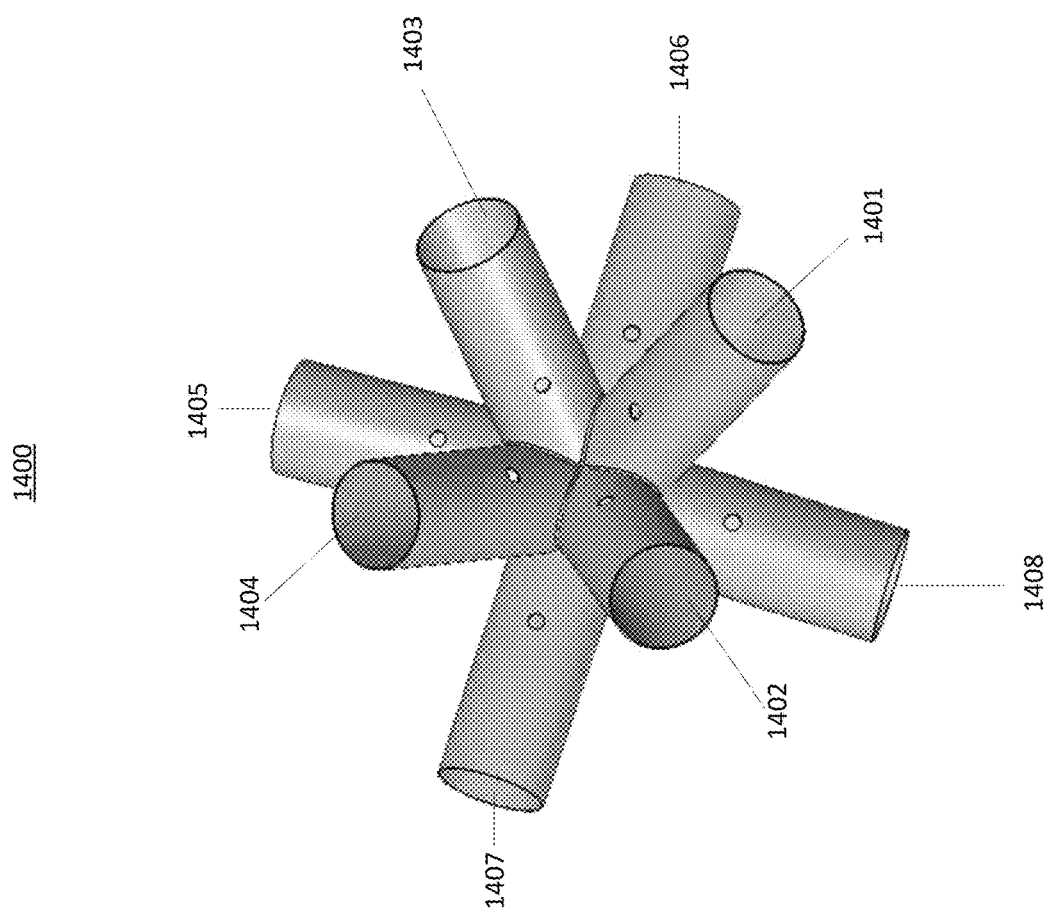
FIGS. 16A-16B illustrate different perspectives of an embodiment of a gangway-to-mainframe apex joint.
Figure 16B:
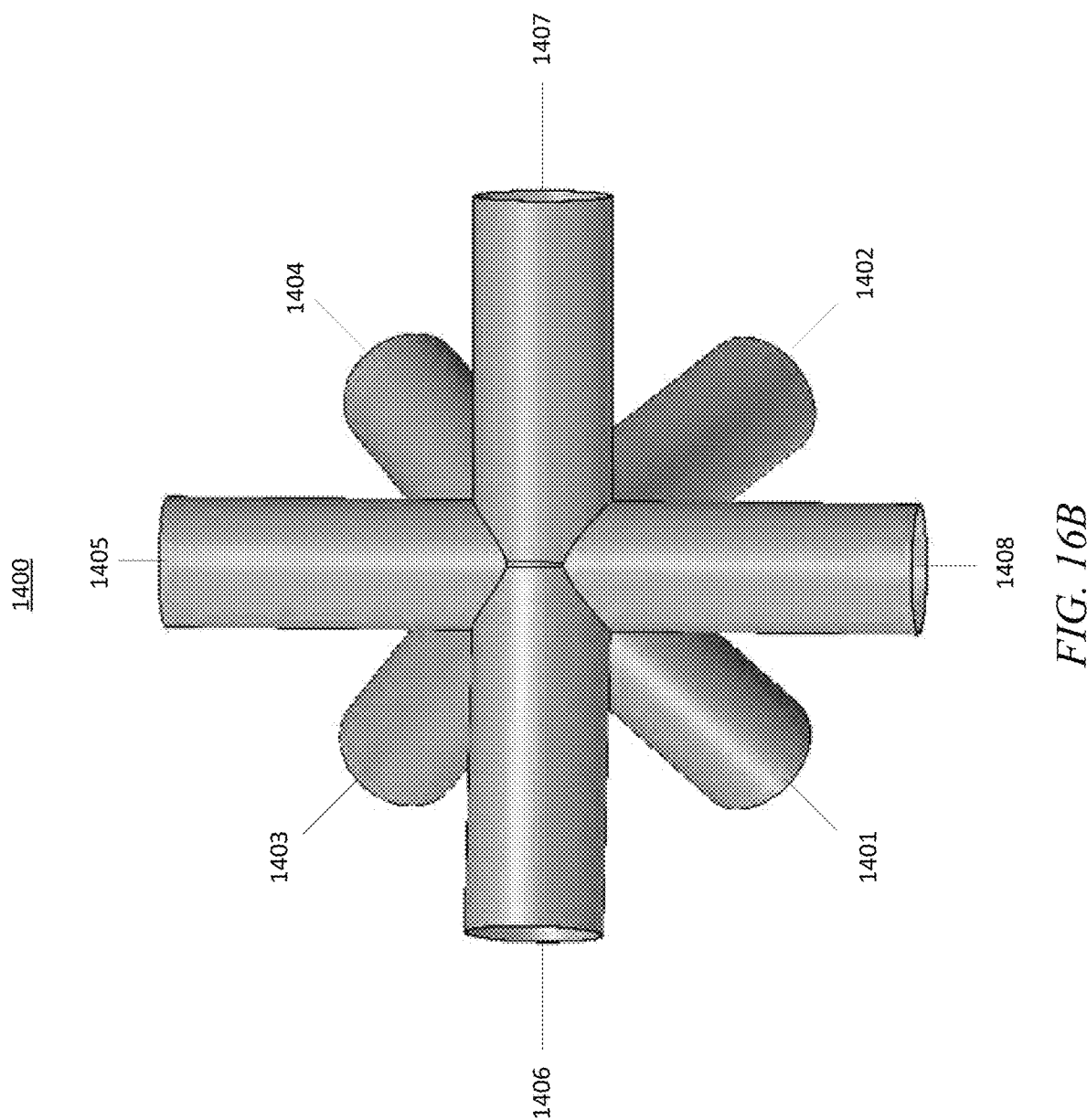

FIGS. 16A and 16B illustrate an example gangway-to-mainframe apex joint 1400. In particular embodiments, a gangway-to-mainframe apex joint 1400 may contain eight connector slots 151, 152, 153, 154, 155, 156, 157, and 158. Apex-to-base connector slots 151-154 may respectively connect to the four base joints (e.g., 1700, 1100, 1600, and 1000 in FIG. 6) of an intersecting mainframe pyramid structure (e.g., 215b in FIG. 6). In particular embodiments, intersecting mainframe pyramid structure (e.g., 215b in FIG. 6) may be adjacent to two mainframe pyramid structures (e.g., 215a and 215c in FIG. 6) and two intersecting gangway pyramid structures (e.g., 398 in FIG. 6 and another unshown intersecting gangway pyramid structure on the opposite side). Four apex-to-apex connector slots 155-158 may connect to apex joints of adjacent pyramid structures (e.g., 155a, 155b, and 775 in FIG. 6 and another apex joint of a unshown intersecting gangway pyramid structure).

Figure 17:
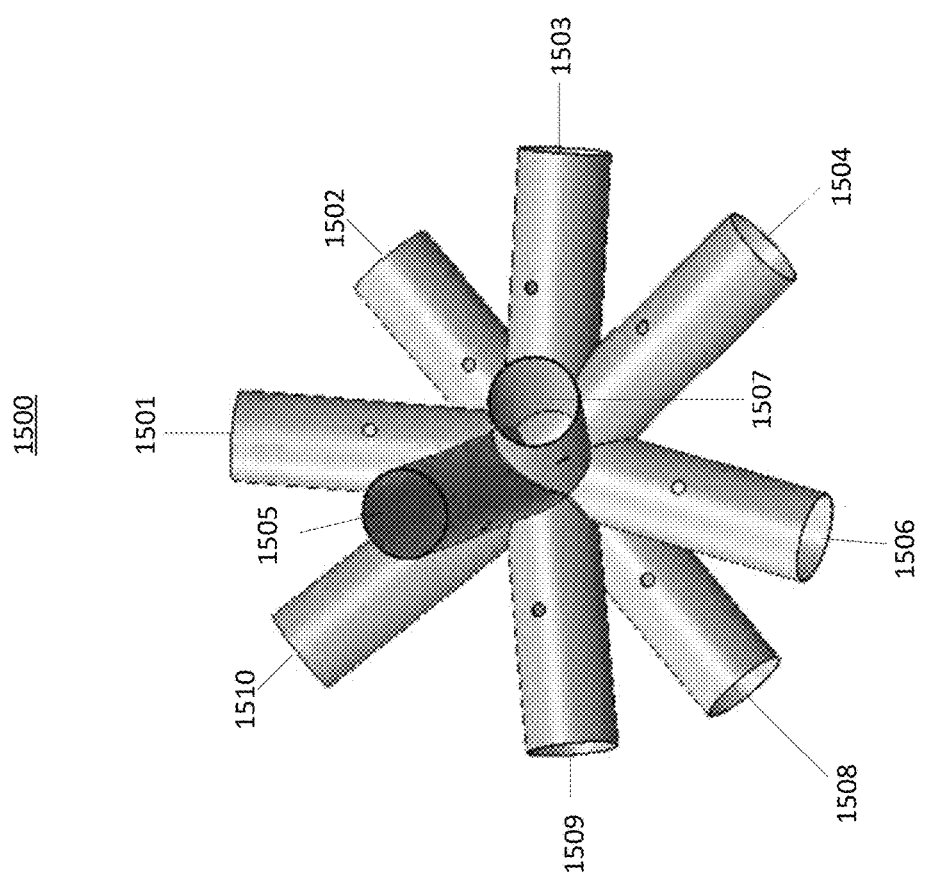
FIG. 17 illustrates an embodiment of a mainframe-to-geodesic joint.

FIG. 17 illustrates an example mainframe-to-geodesic joint 1500. In particular embodiments, a mainframe-to-geodesic joint 1500 may include ten connector slots 1501, 1502, 1503, 1504, 1505, 1506, 1507, 1508, 1509, and 1510. In particular embodiments, slots 1501-1510 may be used to form adjacent corners of two mainframe pyramid structures and to connect to a gangway and an adjoining geodesic structure. For example, as illustrated in FIG. 6, slots 1504, 1506, 1507, and 1508 are illustrated as forming the corner of intersecting mainframe pyramid 215c: slot 1504 is connected to joint 1000 to form one side of pyramid structure 215c; slot 1508 is connected to joint 1800 to form an adjacent side of pyramid structure 215c; slot 1506 is connected to, via a diagonal connector, mainframe base joint 1600 at the opposite corner of pyramid structure 215c; and slot 1507 is connected to apex joint 155b of pyramid structure 215c. Slots 1508, 1510, 1509, and 1505 are illustrated as being used to connect to the adjacent mainframe pyramid structure (only partially shown). The other three slots 1503, 1502, and 1501 are illustrated as being connected to the adjoining geodesic structure via 6-way geodesic joints 900: slot 1503 is connected to 6-way geodesic joint 900b; slot 1502 is connected to 6-way geodesic joint 900c; and slot 1501 is connected to a 6-way geodesic joint 900 that is not illustrated.

Figure 18A:
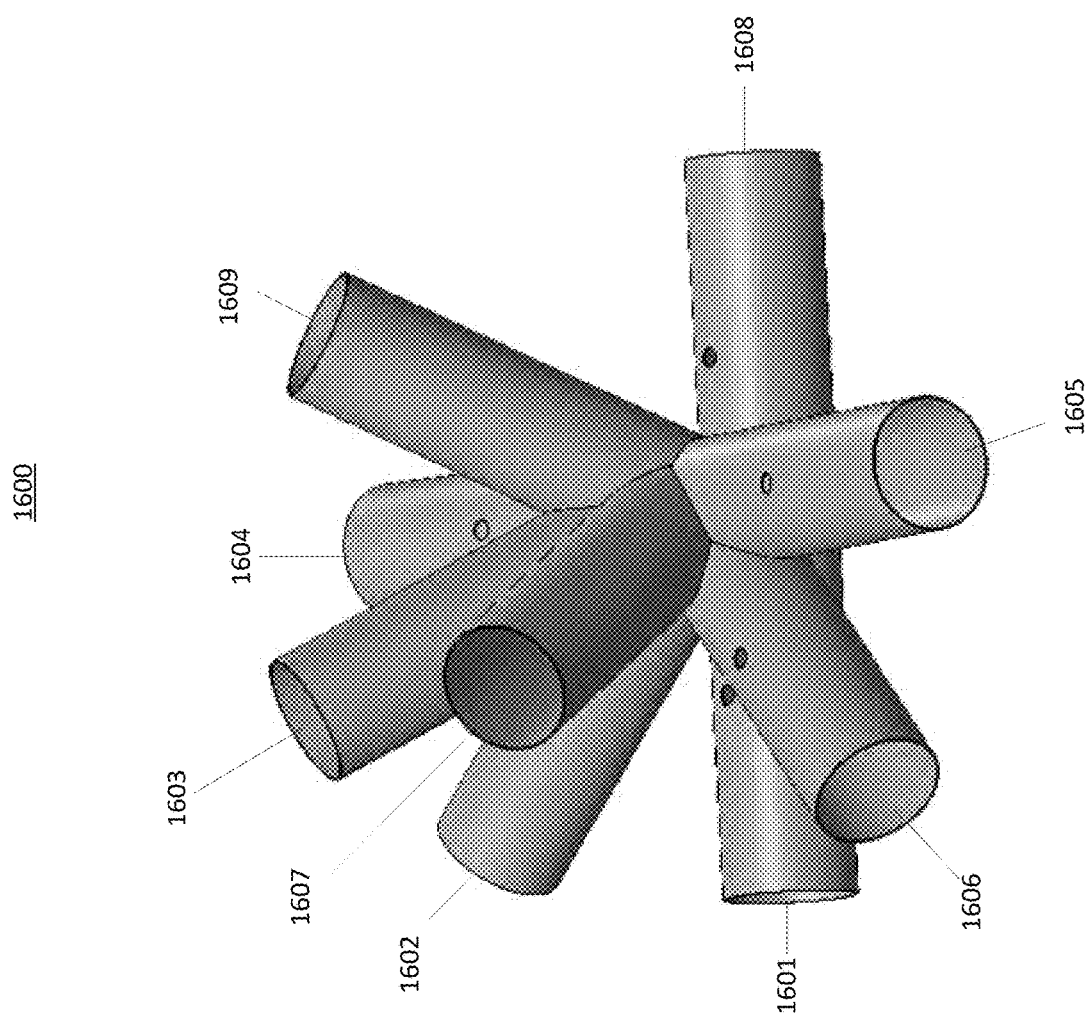
FIGS. 18A-18B illustrate different perspectives of an embodiment of a mainframe base joint with nine connector slots.
Figure 18B:
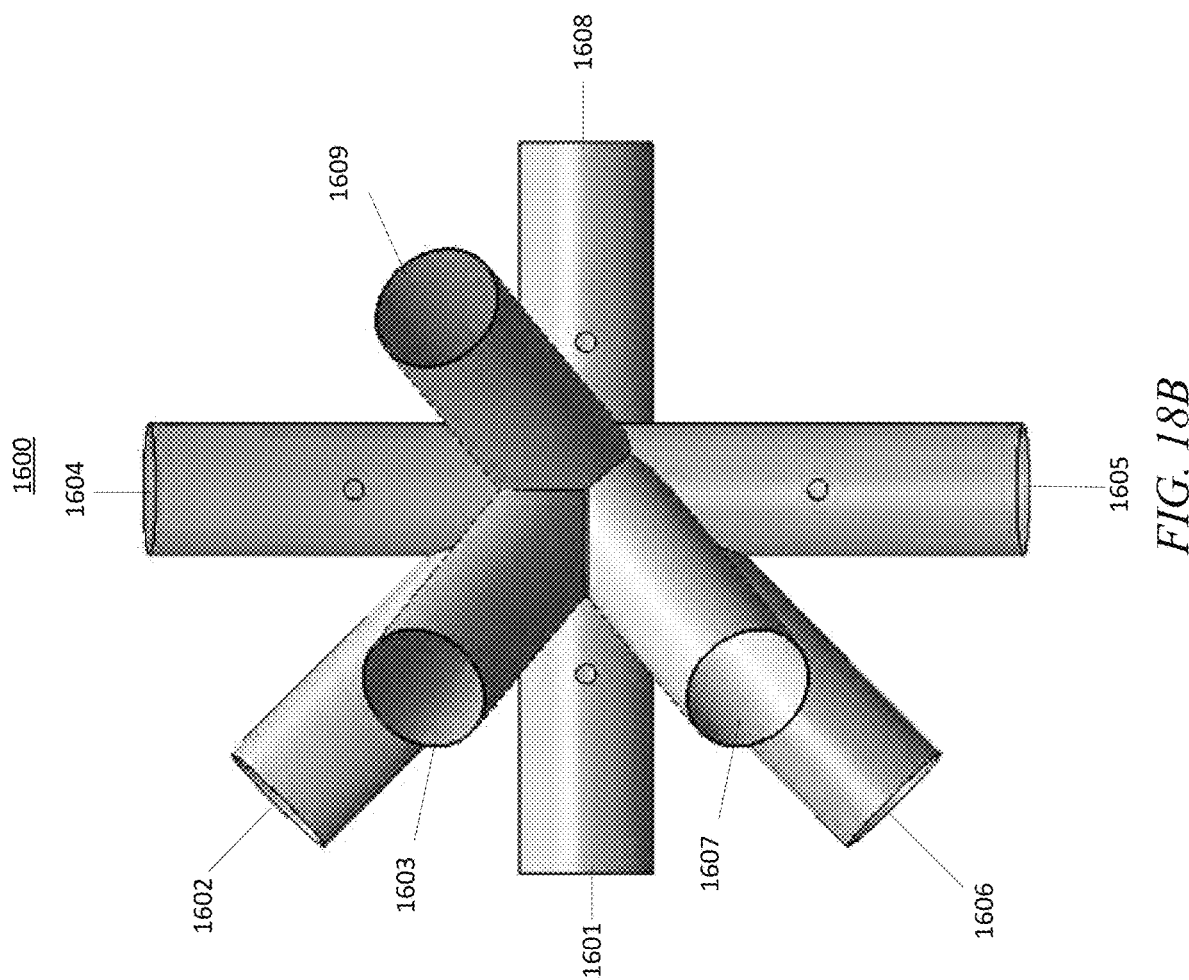

FIGS. 18A and 18B illustrate an example mainframe base joint 1600. In particular embodiments, a mainframe base joint 1600 may include nine connector slots 1601, 1602, 1603, 1604, 1605, 1606, 1607, 1608, and 1609. In particular embodiments, a mainframe base joint 1600 may be used to form adjoining corners of an intersecting mainframe pyramid structure (e.g., 215b in FIG. 6), a mainframe pyramid structure (e.g., 215c in FIG. 6), a gangway pyramid structure (not illustrated in FIG. 6 but would be if the airship was further constructed), and an adjoining geodesic structure (not illustrated in FIG. 6 but would be if the airship was further constructed). For example, FIG. 6 illustrates slots 1601, 1604, 1602, and 1603 as forming the corner of intersecting mainframe pyramid structure 215b: slot 1601 is connected to gangway-to-mainframe base joint 1000; slot 1602 is connected to, via a diagonal connector, mainframe-gangway-base-geodesic joint 1100; slot 1604 is connected to mainframe base joint 1700; and slot 1603 is connected to gangway-to-mainframe apex joint 1400. Slots 1601, 1606, 1605, and 1607 are illustrated as forming the adjoining corner of mainframe pyramid structure 215c: slot 1601 is connected to gangway-to-mainframe base joint 1000; slot 1607 is connected to mainframe apex joint 155b; slot 1605 is connected to base joint 1800; slot 1606 is connected to, via a diagonal connector, mainframe-to-geodesic joint 1500; slot 1608 is illustrated as forming a side of the adjacent gangway pyramid structure (not illustrated); and slot 1609 is illustrated as being connected to the apex joint of that gangway pyramid structure.

Figure 19A:
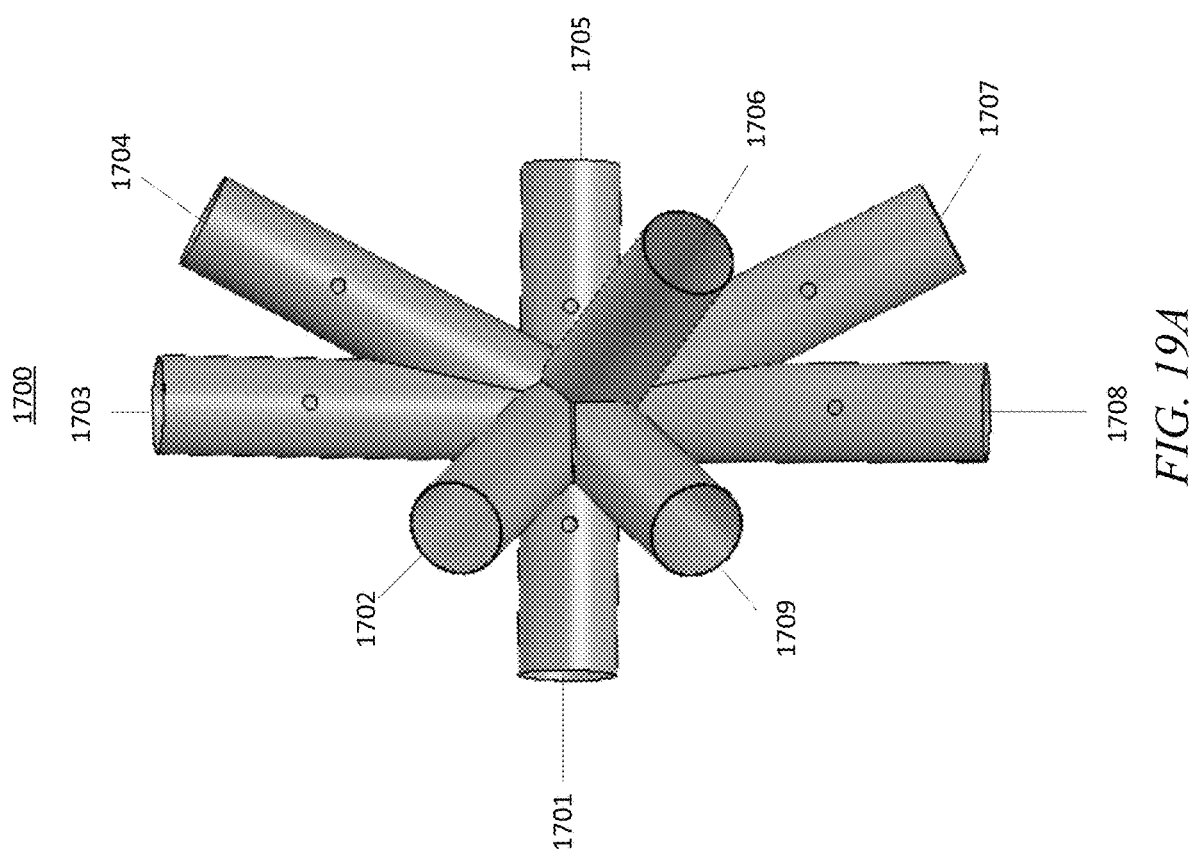
FIGS. 19A-19B illustrate different perspectives of an embodiment of a mainframe-to-geodesic base joint.
Figure 19B:
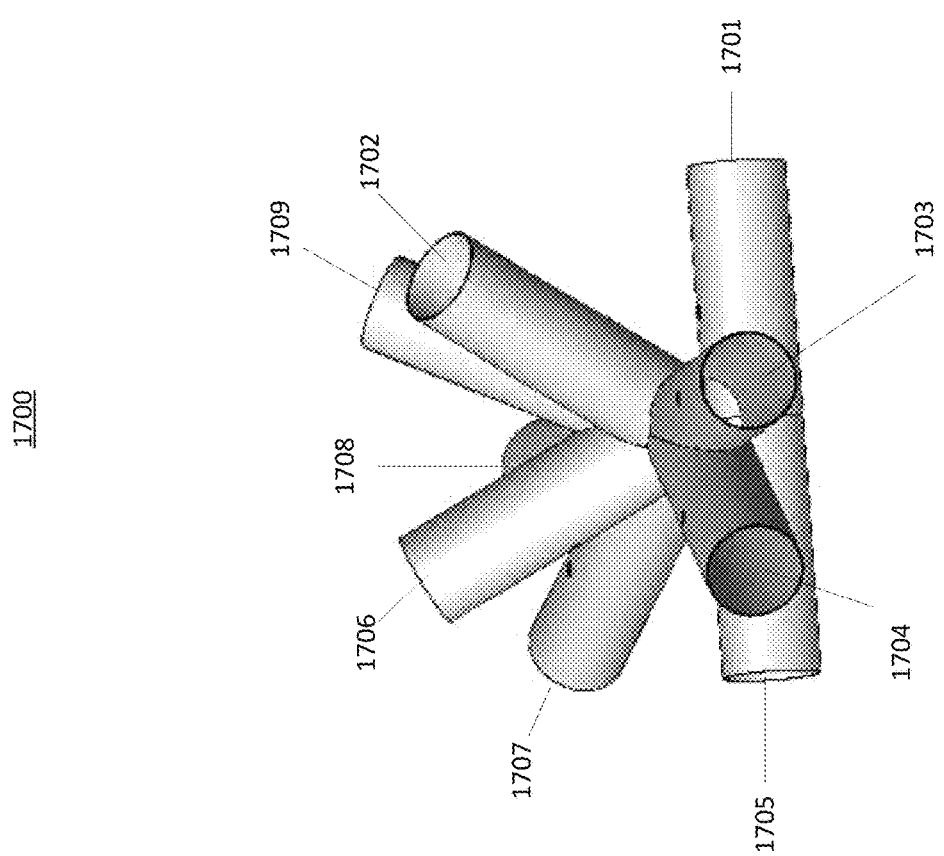

FIGS. 19A and 19B illustrate an example mainframe base joint 1700. In particular embodiments, a mainframe base joint 1700 may include nine connector slots 1701, 1702, 1703, 1704, 1705, 1706, 1707, 1708, and 1709. In particular embodiments, a mainframe base joint 1700 may be used to form adjoining corners of intersecting mainframe pyramid structure (e.g., 215b in FIG. 6), a mainframe pyramid structure (e.g., 215a in FIG. 6), a gangway pyramid structure (not illustrated in FIG. 6 but would be if the airship was further constructed), and an adjoining geodesic structure (not illustrated in FIG. 6 but would be if the airship was further constructed). For example, in FIG. 6, slots 1701, 1708, and 1709 are illustrated as forming the corner of intersecting mainframe pyramid structure 215b: slot 1701 is connected to mainframe-gangway-base-geodesic joint 1100; slot 1709 is connected to mainframe apex joint 1400; and slot 1708 is connected to base joint 1600. Slots 1701, 1702, and 1703 are illustrated as forming the corner of mainframe pyramid structure 215a: slot 1701 is connected to mainframe-gangway-base-geodesic joint 1100; slot 1702 is connected to mainframe apex joint 155a; and slot 1708 is connected to base joint 600 (not shown in FIG. 6 but shown in FIG. 4). Slots 1705, 1706, and 1707 are illustrated as forming the corner of a gangway pyramid structure that is not illustrated but would be illustrated in FIG. 6 if the airship was further constructed: slot 1705 may be connected to the base joint of that gangway pyramid structure to form a side of the gangway; slot 1706 may be connected to the apex joint of that gangway pyramid structure; and slot 1707 may be connected to the 6-way geodesic joint on the other side of the gangway. Lastly, slot 1704 may be connected to a 6-way geodesic joint that is not illustrated.

Figure 20A:
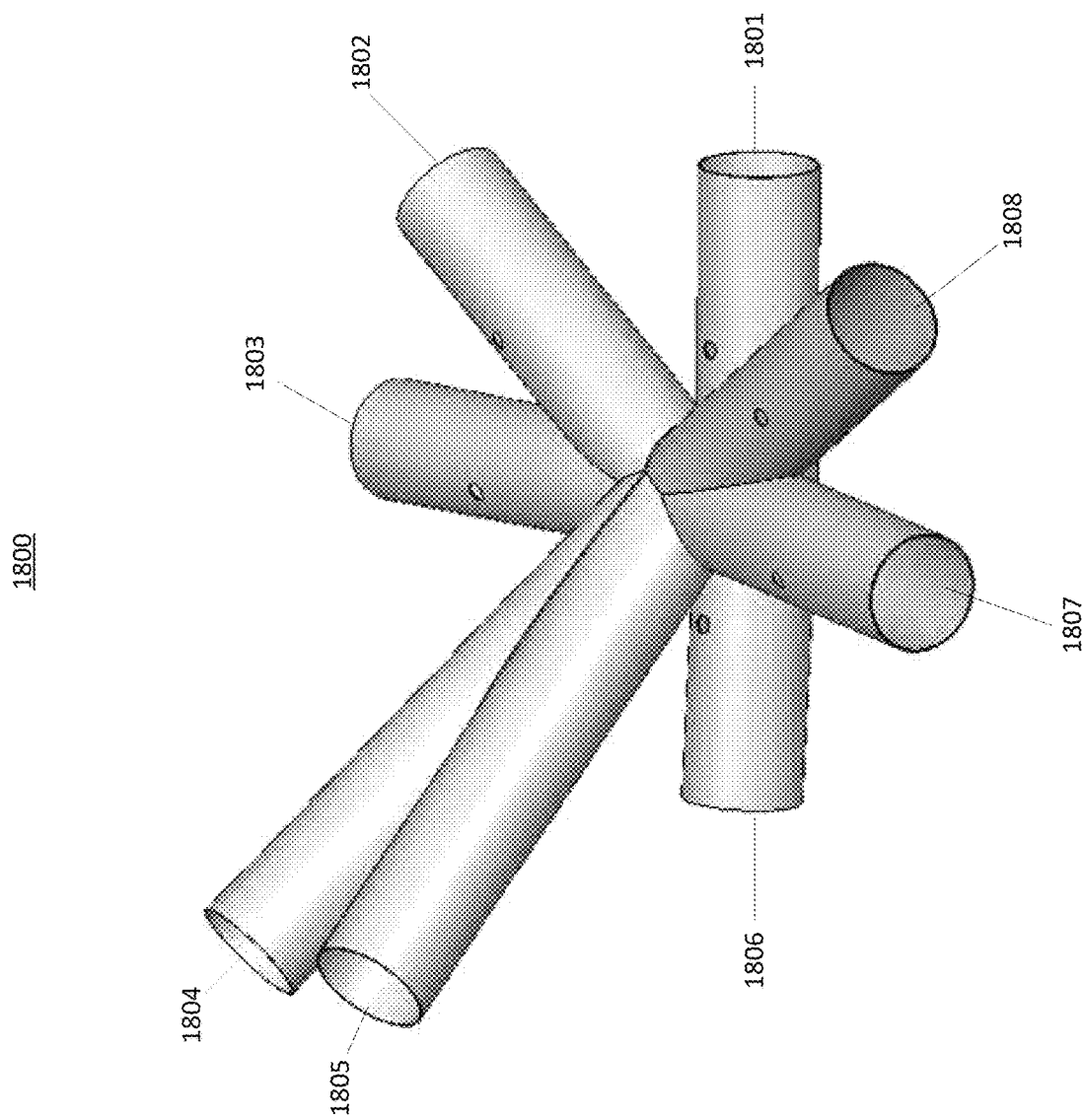
FIGS. 20A-20B illustrate different perspectives of an embodiment of a mainframe-to-geodesic base joint with eight connector slots.
Figure 20B:
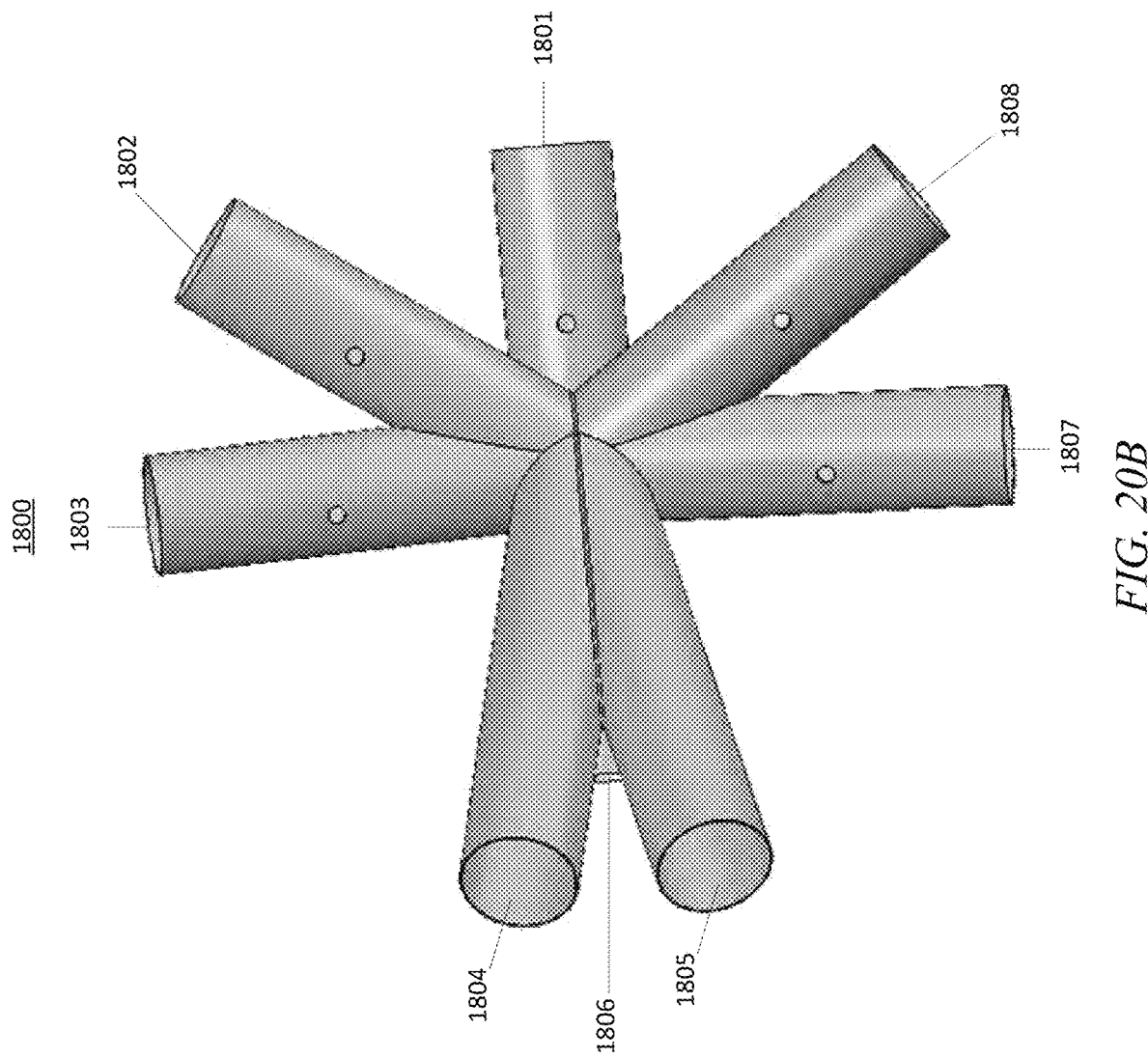

FIGS. 20A and 20B illustrate an example mainframe base joint 1800. In particular embodiments, a mainframe base joint 1800 may include eight connector slots 1801, 1802, 1803, 1804, 1805, 1806, 1807, and 1808. In particular embodiments, a mainframe base joint 1800 may be used to form a corner of a mainframe pyramid structure (e.g., 215c in FIG. 6) and another adjoining mainframe pyramid structure (e.g., unlabeled pyramid structure that is partially shown in FIG. 6). For example, as illustrated in FIG. 6, slots 1803, 1804, and 1806 are illustrated as forming the corner of intersecting mainframe pyramid structure 215c: slot 1803 is connected to joint 1600; and slot 1804 is connected to mainframe apex joint 155b; slot 1806 is connected to base joint 1500. Slots 1807, 1805, and 1806 are illustrated as forming the corner of the adjoining, partially shown mainframe pyramid structure. Slots 1801, 1808, and 1802 may be used to connect to an adjoining geodesic structure that is not illustrated but would be if the airship was further constructed: slot 1801 may connect to a 6-way geodesic joint 900 on the same row using a longitudinal connector; slot 1808 may connect to a 6-way geodesic joint 900 on another row of a geodesic structure; and slots 1802 may connect to a 6-way geodesic joint 900 that is part of the base of a gangway pyramid structure.

As illustrated in FIGS. 2A-2C and as described above, an airship may be constructed using pyramid structures 250. In particular embodiments, each pyramid structure 250 may be constructed using joints and connectors. In particular embodiments, the pyramid structures 250, may be used to construct mainframes 240-245, gangways 285, and geodesic structures 495-497. For example, FIG. 2B illustrates a plurality of mainframe pyramid structures connected to each other to form a mainframe. For another example, FIG. 2C illustrates a plurality of gangway pyramid structures connected to each other to form gangway 285. In particular embodiments, mainframes may be assembled with the aid of a universal mainframe jig.

Figure 21A:
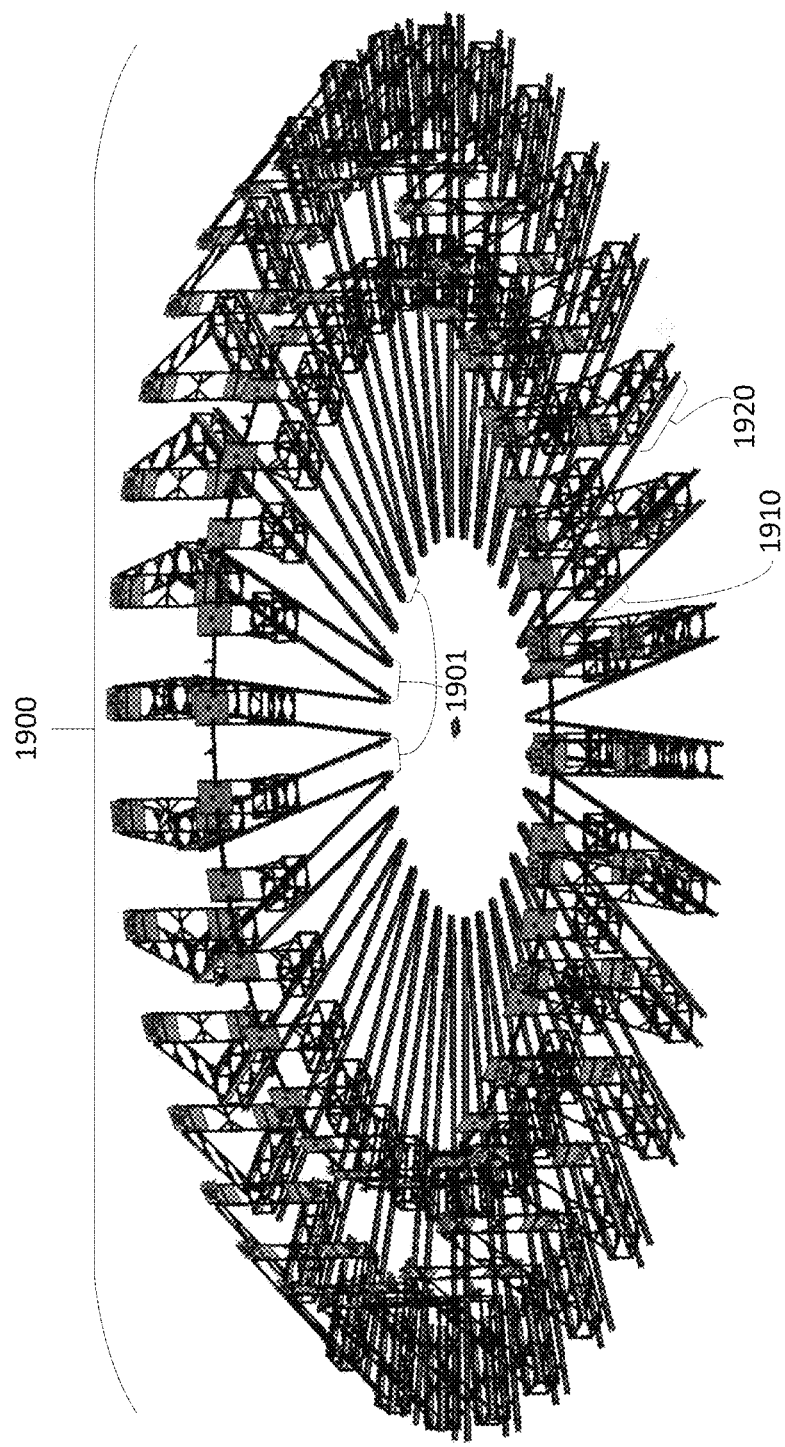
FIGS. 21A-21B illustrate a universal mainframe jig and rails on which a universal mainframe jig may operate.
Figure 21B:
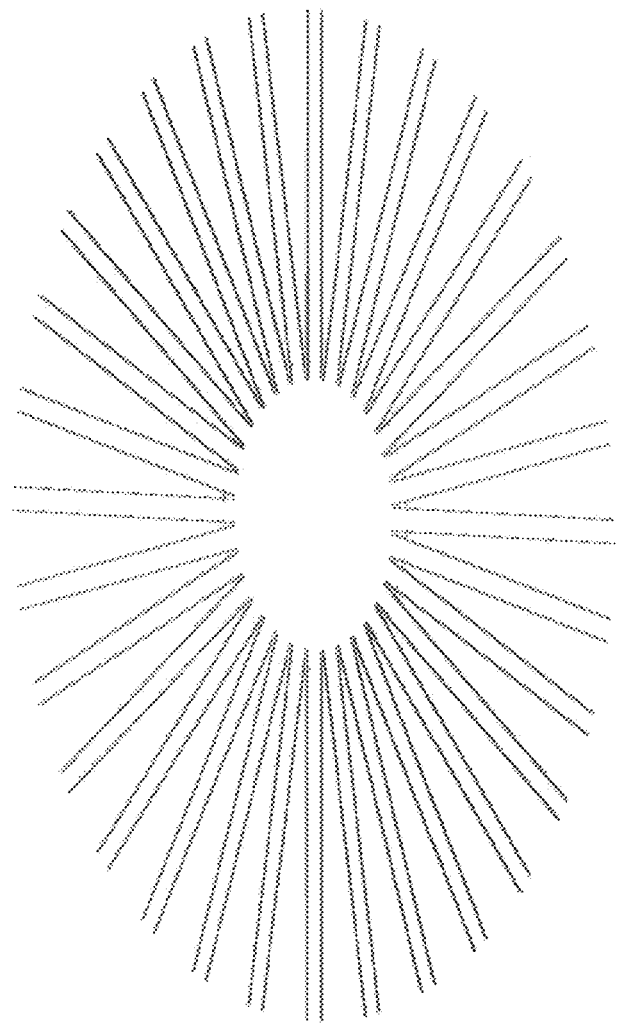

FIGS. 21A-21B illustrate an example universal mainframe jig 1900 and an example rails 1901 on which universal mainframe jig 1900 may operate. FIG. 21A illustrates a universal mainframe jig 1900, rails 1901, front carts 1910, and back carts 1920. FIG. 21B illustrates rails 1901, on which a universal mainframe jig 1900 may operate. In particular embodiments, a mainframe may be assembled in the space between front carts 1910 and back carts 1920. Front carts 1910 and back carts 1920 may be utilized to assist with holding various components of mainframes (e.g., joints and connectors), allowing human, robotic, or other assembly operators to assemble a mainframe. In particular embodiments, assembly operators may begin at one point on the circular universal mainframe jig 1900 and work their way around the jig, placing and securing joints and connectors in the formations described within this application. In particular embodiments, carts (i.e., front carts 1910 and back carts 1920) may be configured to slide along rails 1901 allowing the assembly of mainframes with varying sizes (e.g., radius, diameter, and circumference). For example, uniformly sliding the carts toward the center of a universal mainframe jig 1900 means that the circular pattern formed by the carts will be smaller allowing smaller mainframes to be assembled. Alternatively, uniformly sliding the carts outwardly means that the circular pattern formed by the carts will be larger allowing larger mainframes to be assembled. In the particular embodiment shown in FIG. 21A, the carts are configured toward the outside of rails 1901 allowing relatively large mainframes to be assembled. In particular embodiments, each of the tracks forming rails 1901 may have markers (e.g., holes) such as those shown in FIG. 24 or other indicators to allow the carts to be uniformly configured at predetermined locations relative to the center of a universal mainframe jig 1900. This allows the carts to substantially form a circular pattern. In particular embodiments, longer or shorter rails 1901 may be utilized to allow greater flexibility in assembling mainframes of varying sizes. In particular embodiments, adjusting the configuration of back carts 1920 and front carts 1910 may allow assembly of tapered mainframes, such as those shown in FIG. 2B. In particular embodiments, as illustrated in FIG. 21A, the top plate of a front cart may be connected to the top plates of adjacent front carts. In other embodiments, the front carts may be connected to other portions of adjacent front carts. In particular embodiments, top or bottom plates of a back cart may be connected to corresponding plates of adjacent back carts.

Figure 22A:
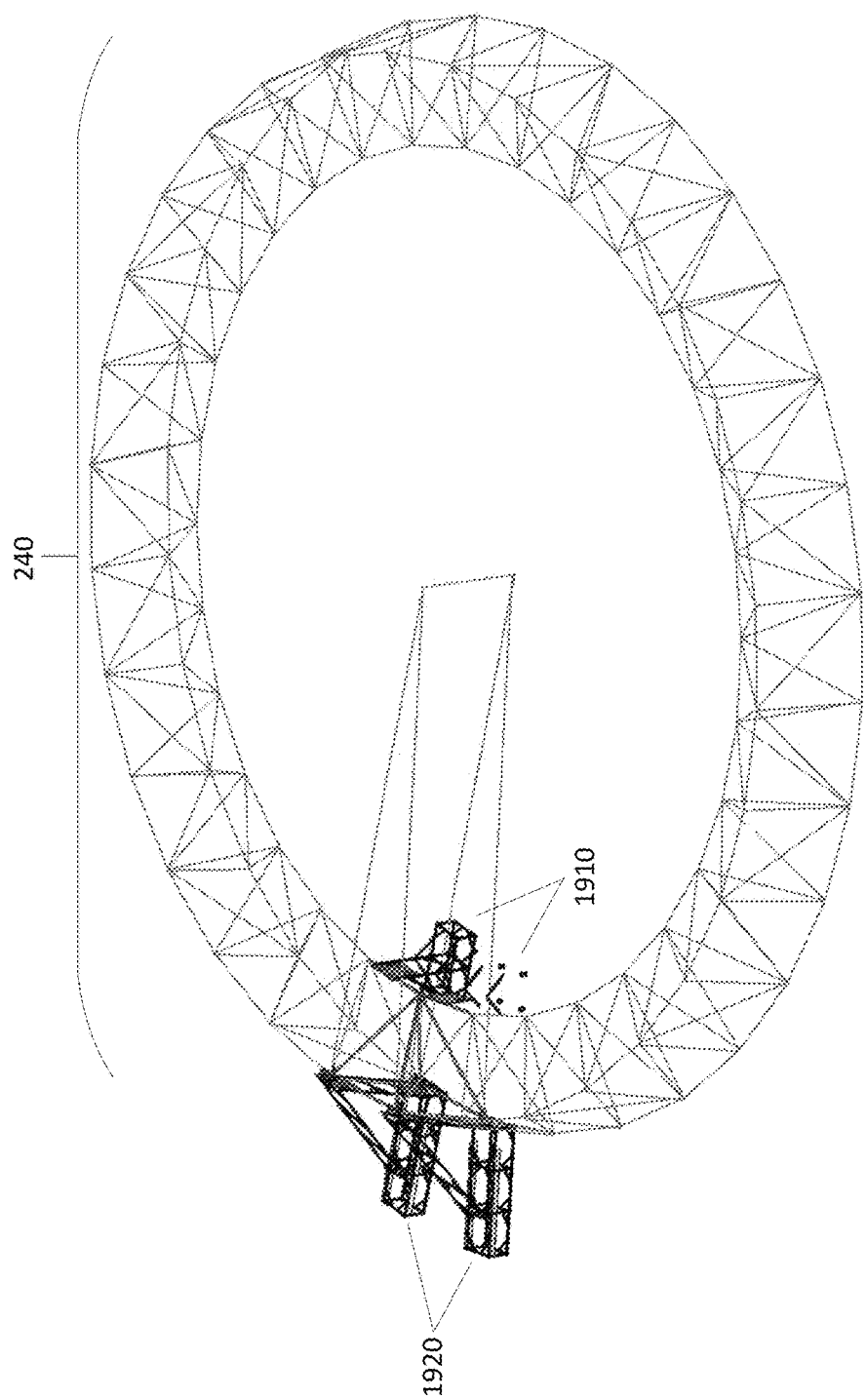
FIGS. 22A-22B illustrate a mainframe on a portion of a universal mainframe jig.
Figure 22B:
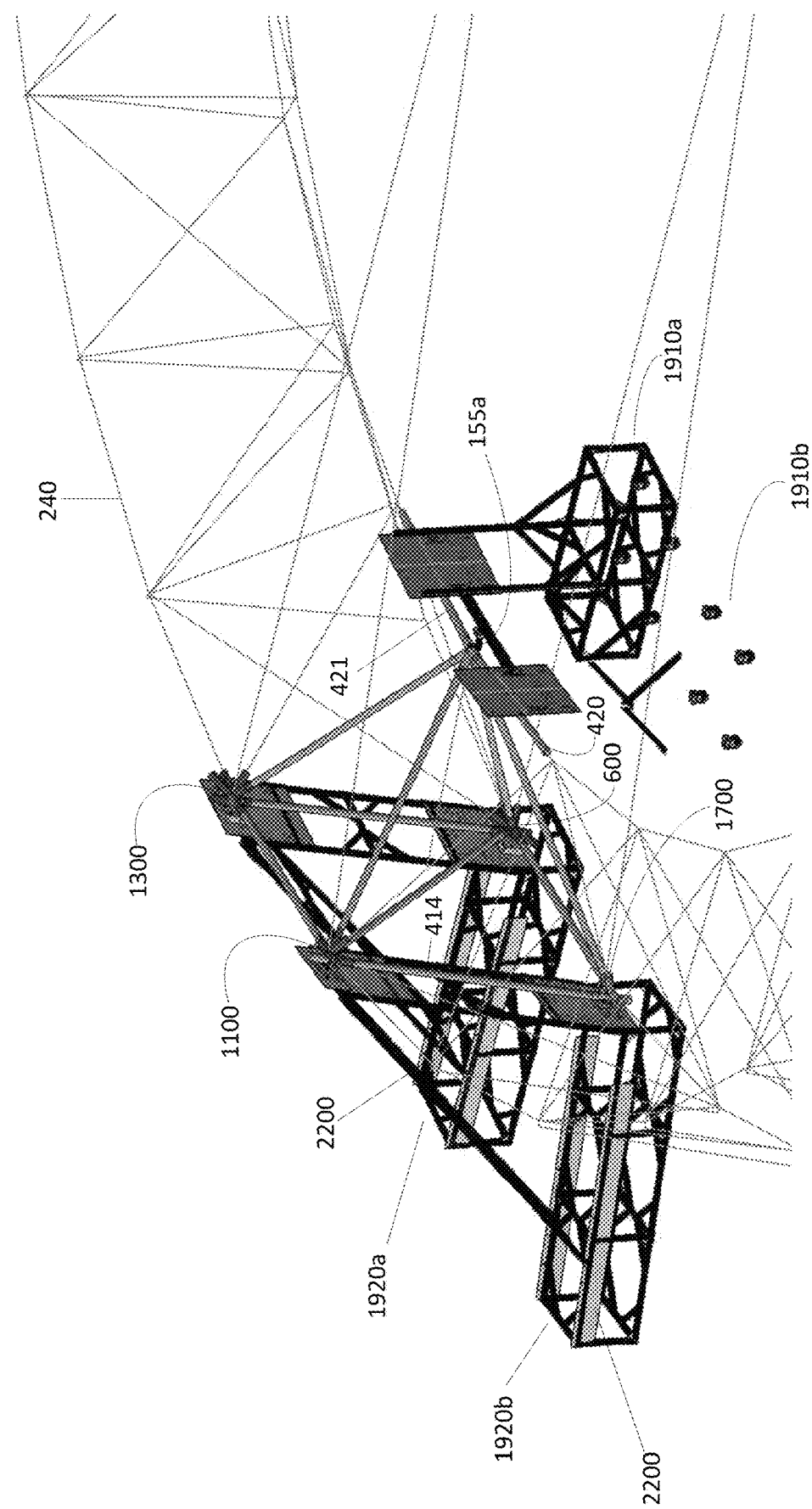

FIGS. 22A-22B illustrate an example mainframe on a portion of a universal mainframe jig 1900. It should be understood that FIGS. 22A-22B illustrate an embodiment in which only two of each carts are utilized for illustrative purposes. In particular embodiments, back carts 1920 and front carts 1910 may be in a substantially circular pattern around a mainframe, similar to those shown in FIG. 21A. In particular embodiments, it may be preferable to utilize a larger number of carts in a substantially circular pattern for greater stability and ease of assembly of the mainframes. In other embodiments, reducing the number of carts used may allow for reduced costs of equipment and labor. This disclosure contemplates any number of carts sufficient for the assembly of mainframes. In particular embodiments, vertical height of pyramid structures forming the mainframes may be adjusted by adjusting the gap between front carts 1910 and back carts 1920. For example, if the gap between front carts 1910 and back carts 1920 are widened, the pyramid structures assembled on the carts will have a larger vertical height. Conversely, decreasing the gap between front carts 1910 and back carts 1920 may result in a decrease the pyramid structures' vertical height.

FIG. 22B illustrates a zoomed-in view of a portion of mainframe on a portion of a universal mainframe jig 1900. In particular embodiments, sliding the carts to a particular spot on rails 1901 may change the horizontal width of the pyramid structures. For example, sliding the carts closer to the center of a universal mainframe jig 1900 decreases the circumference of the mainframe assembled on the carts, which also means that the distance between back cart 1920a and back cart 1920b is decreased corresponding to the decrease in the circumference. Further, since base joints 1100 and 1300 are secured on back carts 1920a and 1920b, the distance between base joints 1100 and 1300 also decreases, resulting in a smaller horizontal width of pyramid structures assembled on these carts. Increasing the circumference of the mainframe will similarly result in a larger horizontal width of the pyramid structures assembled on the carts. In particular embodiments, pyramid structures may be assembled to have a base with four congruent sides. For example, when adjusting the size of mainframes to be assembled by sliding carts to a particular location on rails 1901, distance between the top plate and bottom plate of the back carts 1920 may be adjusted according to the change in the horizontal width of the pyramid structures such that all sides of the base of the pyramid structures are congruent. For example, when back carts 1920a and 1920b are moved closer to the center of the universal mainframe jig 1900, the distance between the top plates of the back carts 1920a and 1920b (securing, respectively, joints 1300 and 1100) and the bottom plates of the back carts 1920a and 1920b (securing, respectively, joints 600 and 1700) may be respectively reduced corresponding to the decrease in the distance between the back carts 1920a and 1920b such that the sides of the base of the pyramid structure assembled on these carts are congruent. Increasing the circumference of the mainframe may similarly require the distance between the top plates and bottom plates of the back carts 1920 to be increased to allow the sides of the base of the pyramid structure to be congruent. In particular embodiments, adjusting the circumference of the mainframes may not require the joint holder of front carts 1910 to be adjusted if front carts 1910a and 1910b are centered between the joint holders of back carts 1920a and 1920b and the joint holders of the back carts 1920*a* and 1920*b* are symmetrically adjusted corresponding to the change in the circumference. For example, in FIG. 22B, configuration of front carts 1910 may not need to be adjusted when the size of the mainframes is adjusted, however, the apex joint 155*a* may need still to be replaced with a similar joint with adjusted slot openings. In other embodiments, configuration of front carts 1910 may need to be adjusted to accommodate the changing size of the mainframes.

In particular embodiments, the process of assembling mainframes on a universal mainframe jig 1900 may begin after securing front carts 1910 and back carts 1920 at a particular location on rails 1901. Once the carts are configured on rails 1901 at the desired location, the assembly process may begin with the assembly of a portion of a mainframe. The process of assembling a portion of a mainframe may begin when a particular component of the mainframe is secured to either front carts 1910 or back carts 1920. For example, the process of assembling a portion of a mainframe may begin when a base joint 1300 or 1100 is secured to one of the back carts 1920. For another example, the process of assembling a portion of a mainframe may begin when an apex-to-apex connector 421 or 420 (shown in FIG. 4) is secured to the front carts 1910*a* or 1910*b*. For another example, the process of assembling a portion of a mainframe may begin when a base joint 700 or 1600 is secured to a cart. Once the first component of the mainframe is secured to a cart, additional components may be joined to that first component, ultimately allowing for the construction of a circular mainframe. For example, an assembly of a mainframe may begin when a base joint 1100 is secured to the back cart 1920*b*. An assembly worker (e.g., a human, mechanical, or robotic assembly worker) may then attach connectors (e.g., 414, 290, 413, 415, and 418 shown in FIG. 4), as well as the corresponding, mirrored connectors (e.g., 291, 463, 465, and 468 shown in FIG. 4) to the base joint 1100. Additional joints may then be attached to the connectors, including a base joint 600 to the connector 290, a base joint 1700 to the connector 414, a base joint 1300 to the connector 413, and an apex joint 155*a* to the connector 418. As shown in FIG. 22B, a single back cart may be used to secure at least two base joints (e.g., 1100 and 1700). In particular embodiments, only the connectors may be secured to the carts. For example, a back cart 1920 may secure a connector 414 that runs between base joints 1100 and 1700. In particular embodiments, only the joints may be secured to the carts. In particular embodiments, both joints and connectors may be secured to the carts. Once each of those joints are connected, additional connectors may be attached to the joints, including, for example, connectors 420 and 421 from the apex joint 155*a*. Then, each of the connectors 420 and 421 may be connected to the front cart 1910*a*. This process of connecting joints and connectors may be repeated until an entire circular mainframe is assembled. In particular embodiments, plates attached to the carts may be made of metal or other material suitable for securing joints and connectors to the carts. In particular embodiments, each of the back carts 1920 may comprise two securing plates for securing, respectively, two of the base joints and each of the front carts 1910 may comprise a single securing plate for securing a single apex-to-apex connector. In particular embodiments, each of the back carts 1920 may comprise an adjustment strap configured to allow for the assembly of tapered mainframes. The function of this adjustment strap is illustrated with additional detail in FIG. 24, below.

Figure 23A:
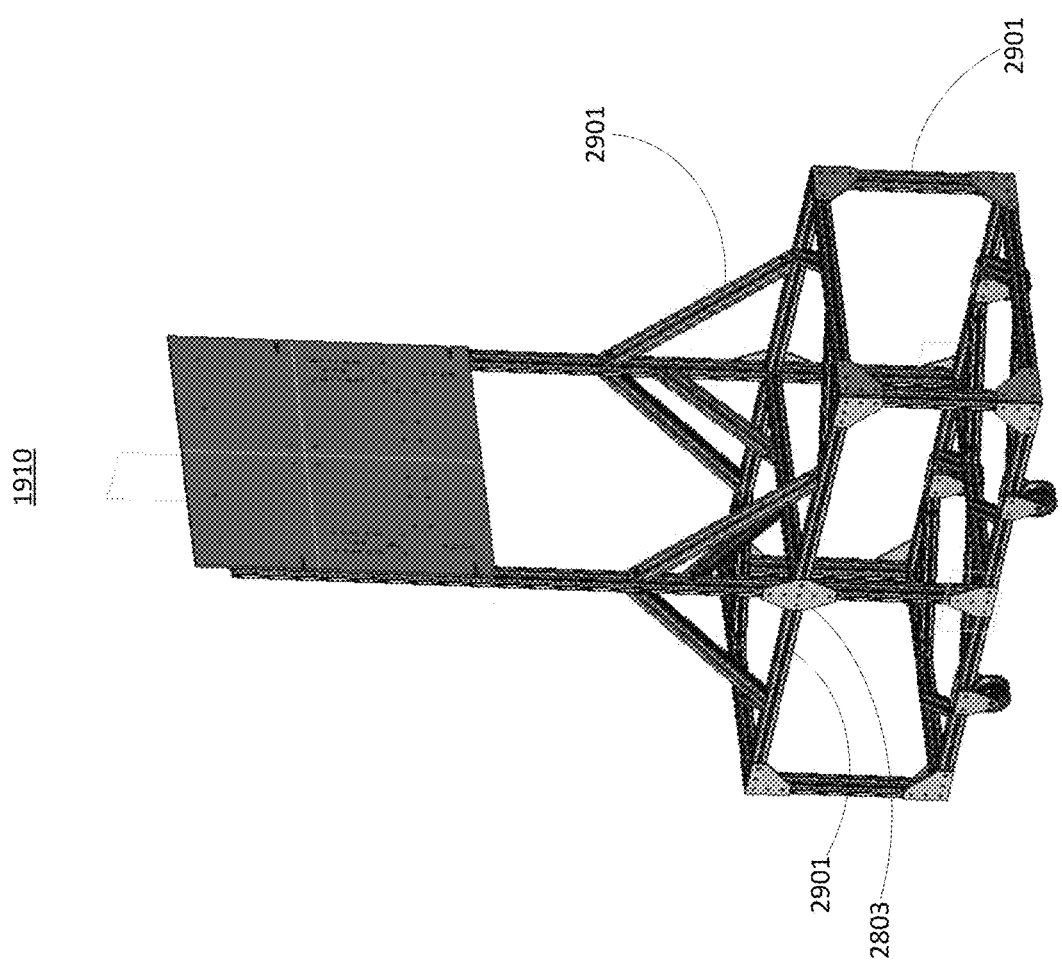
FIGS. 23A-23B illustrate carts used as part of a universal mainframe jig.
Figure 23B:
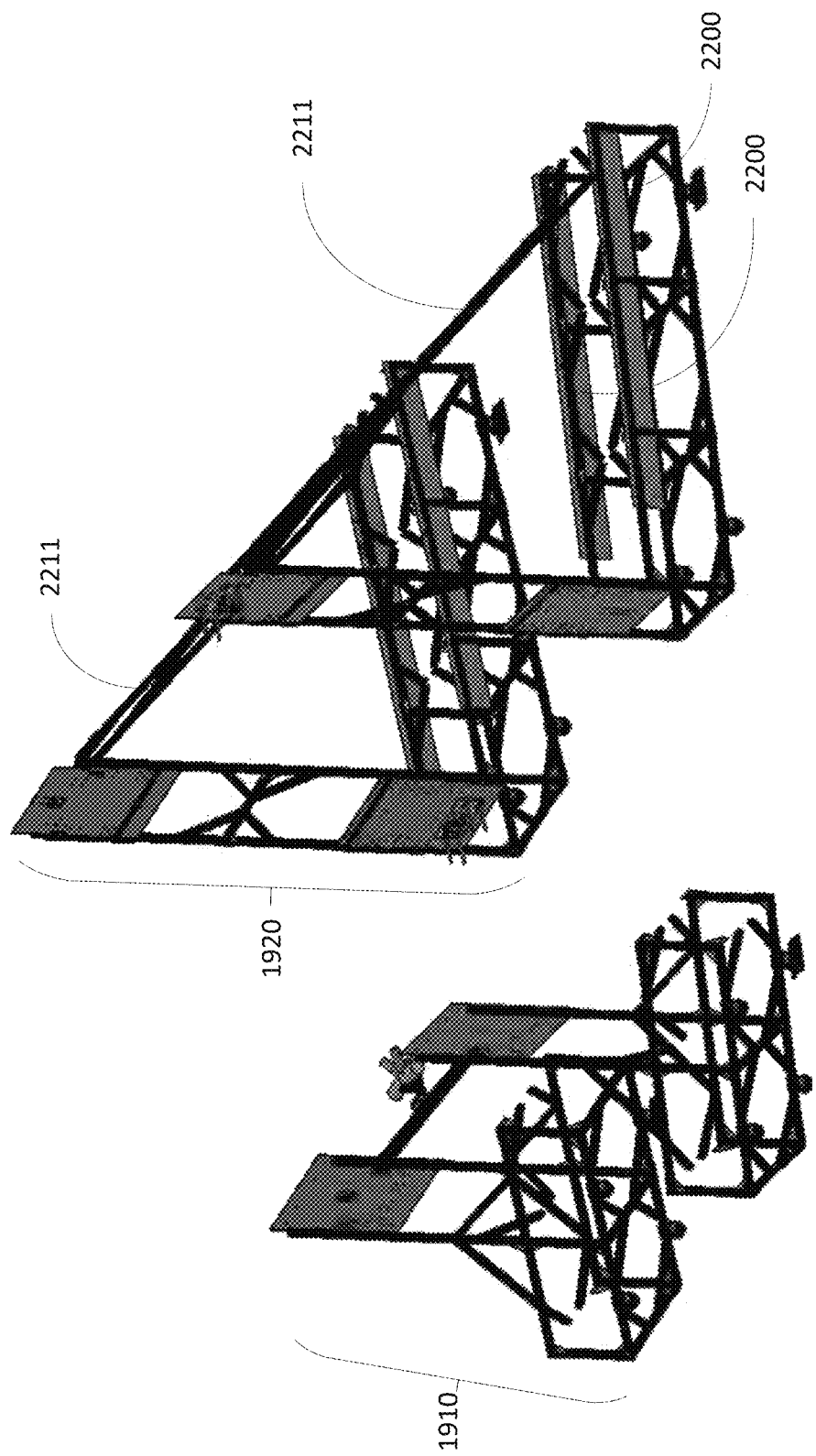

FIGS. 23A-23B illustrate carts used as part of a universal mainframe jig. FIG. 23A illustrates a front cart 1910 used to hold inner components of mainframes. In particular embodiments, front carts 1910 may be used to hold apex-to-apex connectors (e.g., 420 and 421 in FIG. 4) used to connect two apex joints (e.g., 155*a* and 1400 in FIG. 4). FIG. 23B illustrates a pair of front carts 1910 and a pair of back carts 1920. In particular embodiments, each cart may be equipped with wheels to allow it to move along the rails 1901. In particular embodiments, back carts 1920 may be equipped with an adjustment strap 2200 used to adjust the size of mainframes to be assembled.

Figure 24:
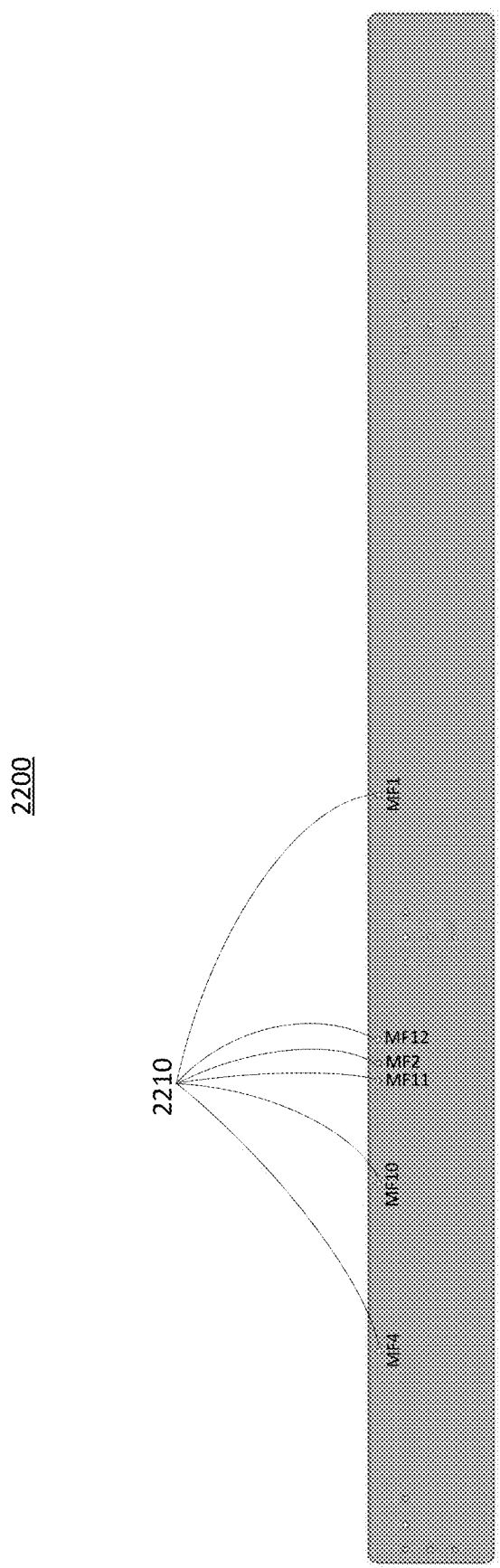
FIG. 24 illustrates an adjustment strap used on a rear cart of a universal mainframe jig.

FIG. 24 illustrates adjustment strap 2200 used on back cart 1920 of universal mainframe jig 1900. In particular embodiments, an adjustment strap 2200 may run along the back edges of back carts 1920. In particular embodiments, an adjustment strap 2200 may include multiple markers (e.g., holes 2210). For example, FIG. 24 illustrates adjustment strap 2200 with holes 2210 labeled MF4, MF10, MF11, MF2, MF12, and MF1. Each of these MF labels are associated with a particular configuration of back carts 1920 corresponding to a particular degree of tapering of mainframes to be assembled. In particular embodiments, a structure 100 of a rigid airship may be constructed with 12 mainframes, which mainframes may be consecutively designated as MF1 through MF12. Given that mainframes (e.g., 240 shown in FIG. 1) and tapered mainframes (e.g., 241-245 shown in FIG. 1) have varying degrees of tapering along the exterior edges, an adjustment strap 2200 provides holes 2210 with MF designations so that the back carts 1920 can be adjusted according to a particular mainframe to be assembled with a particular size and degree of tapering. The bottom end of sloped rails 2211 (illustrated in FIG. 23B) of the back carts 1920 that connect from the top connecting plate to the back-rear corner of the back carts may be shifted to one the holes 2210. For example, by shifting the bottom end of the sloped rails 2211 to holes 2210 marked MF4, an un-tapered mainframe 240 (shown in FIG. 2A) may be constructed. For another example, by shifting the bottom end of the sloped rails 2211 to holes 2210 marked MF2, a tapered mainframe 242 (shown in FIG. 2B) may be constructed.

Particular embodiments described herein utilizing the "rollercoaster" jig provide a safer and faster assembly methodology of manufacturing airships. Traditionally, airships are kept stationary while being built, which means that builders must climb to great heights to build airships. In particular embodiments, individual mainframes 240-245 may first be constructed on a universal mainframe jig 1900, then each of mainframes 240-245 may be erected and placed on a rollercoaster jig. Once mainframes 240-245 are erected on the rollercoaster jig, geodesic structures, gangways, and other components may be connected to the mainframes. Embodiments of the rollercoaster jig may allow an airship (or partially completed portions of it) to be rotated while being built so that builders may stay grounded, thereby improving safety and speed of manufacturing airships. In particular embodiments, geodesic structures may be manufactured on the ground and connected to portions of the mainframes by rotating the mainframe to bring the portions being worked on to an elevation suitable for builders on the ground.

Figure 25:
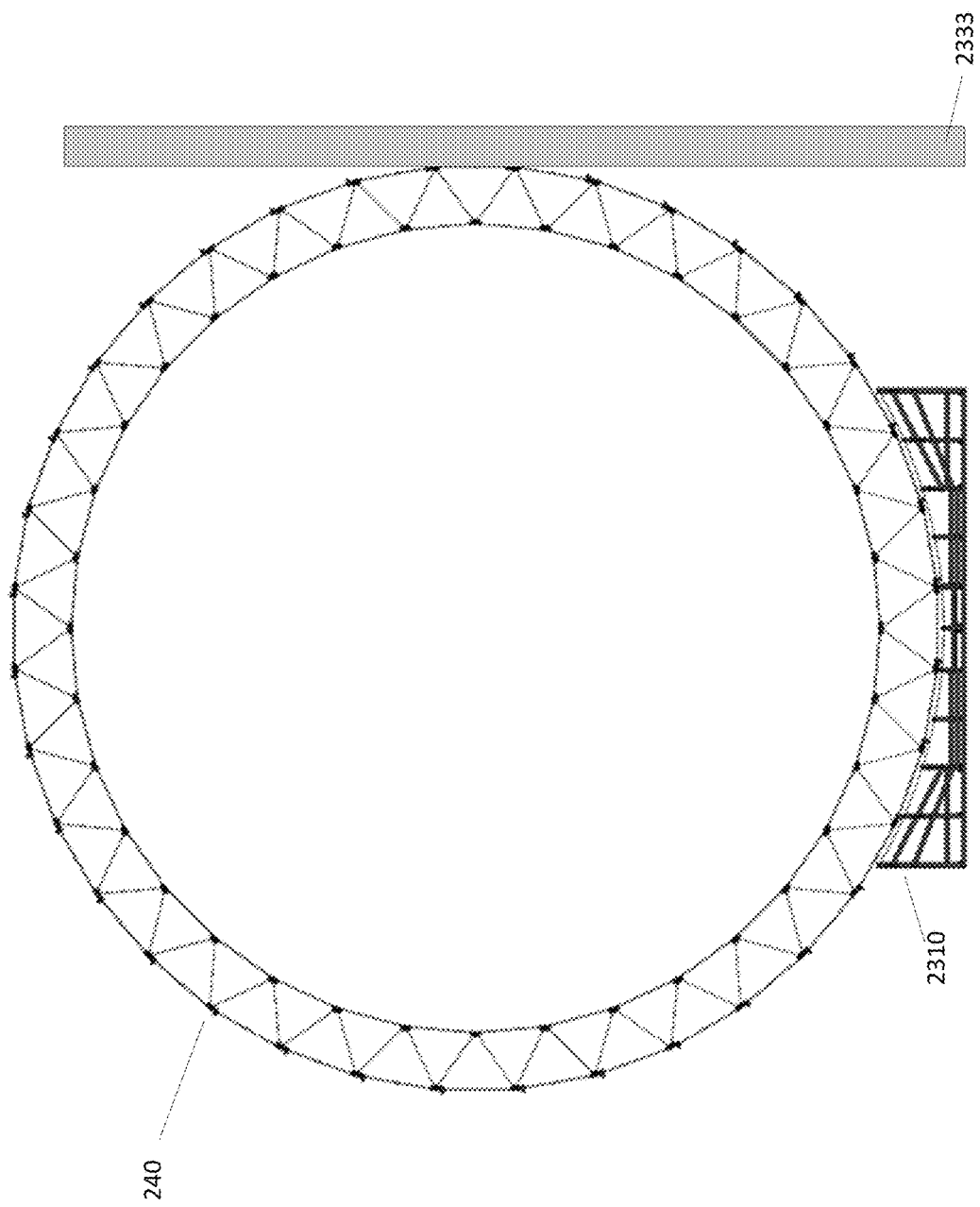
FIG. 25 illustrates an embodiment of a mainframe assembled on a rollercoaster jig.

FIG. 25 illustrates an example of a mainframe erected on top of a rollercoaster jig. It should be appreciated that a partially completed mainframe may also be set on the rollercoaster jig 2310 while it is being built. In particular embodiments, the rollercoaster jig may also comprise tower 2333 to prevent mainframes from falling off the rollercoaster jig 2310.

Figure 26A:
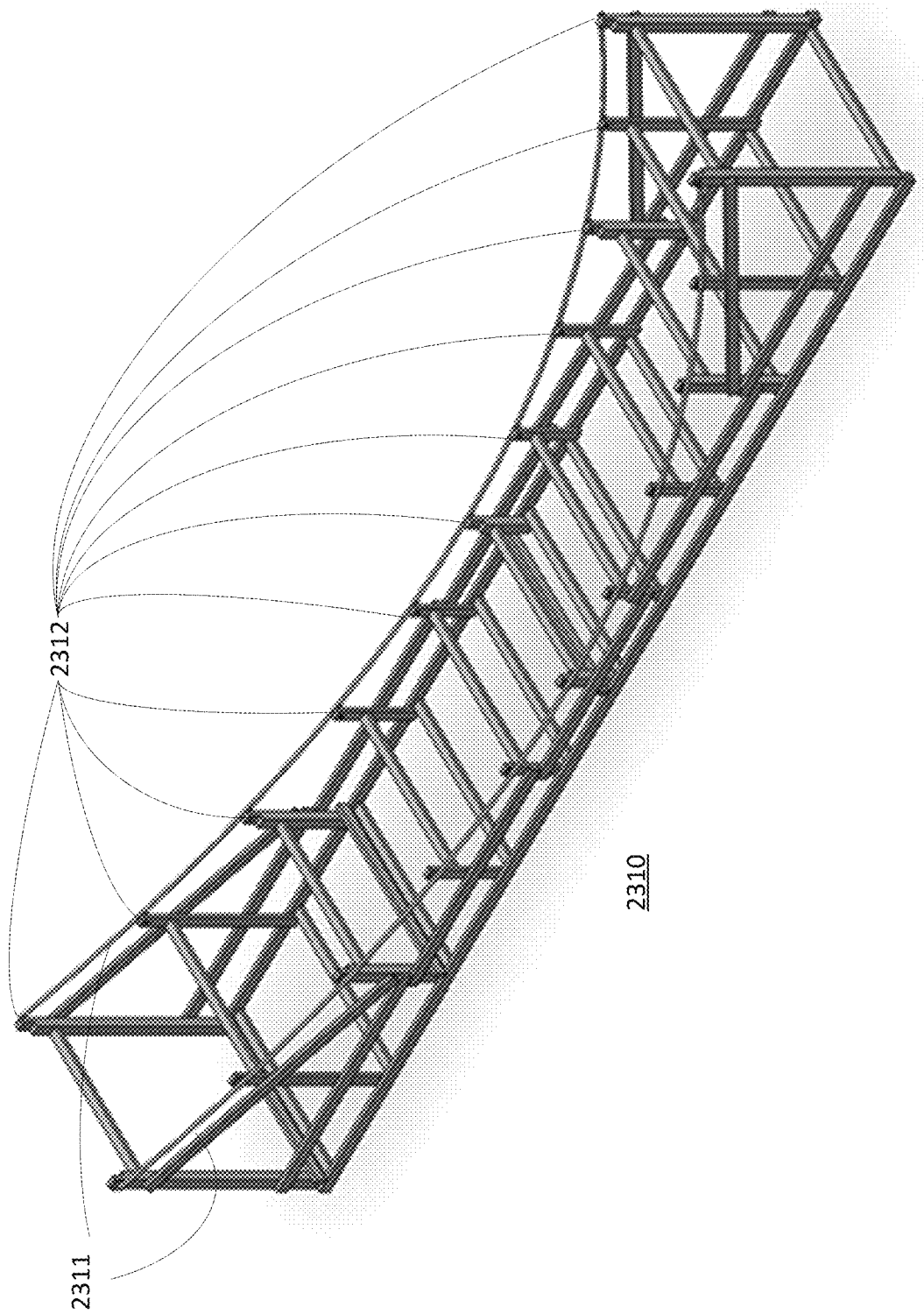
FIGS. 26A-26B illustrate embodiments of a rollercoaster jig.
Figure 26B:
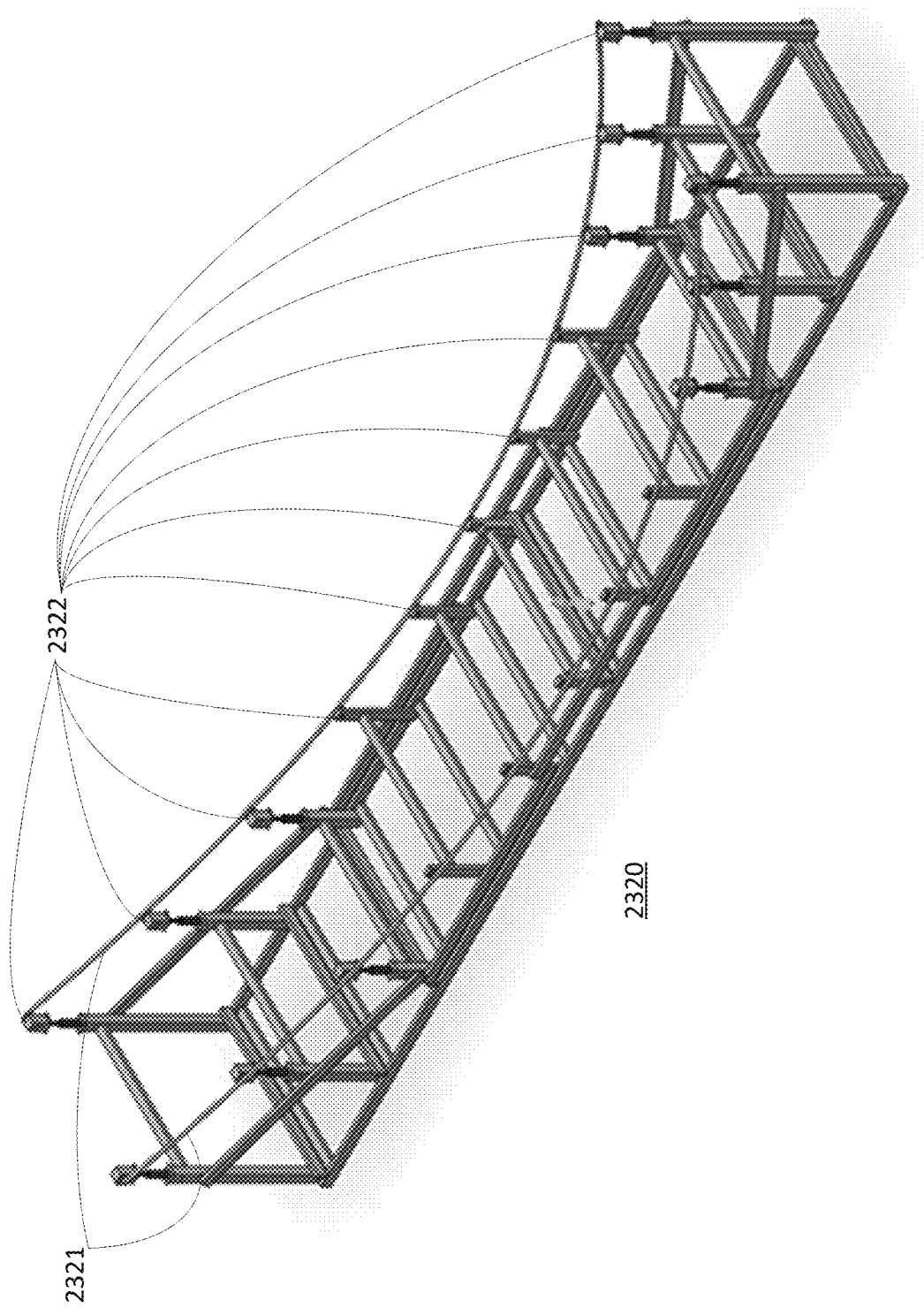

FIGS. 26A-26B illustrate an example rollercoaster jig. In the embodiment shown in FIG. 26A, rollercoaster jig 2310 may have a pair of rails 2311 running parallel to one another. The distance between rails 2311 may depend on the width of the mainframe which the rollercoaster is designed to support. For example, the distance between rails 2311 may be configured to substantially match the width of the mainframe. In particular embodiments, rails 2311 may form an arc, which may conform to the curvature of the mainframe. The length of rails 2311 may be any suitable length to provide adequate support for the mainframe. In the embodiment shown in FIG. 26A, rails 2311 may be affixed to stationary supporting structures 2312 (e.g., with fixed heights). In the embodiment shown in FIG. 26B, rails 2321 may be affixed to adjustable supporting structures 2322 (e.g., individually adjustable with respect to height), which may be used to adjust the height and/or curvature of the rollercoaster's rails 2321.

Figure 27A:
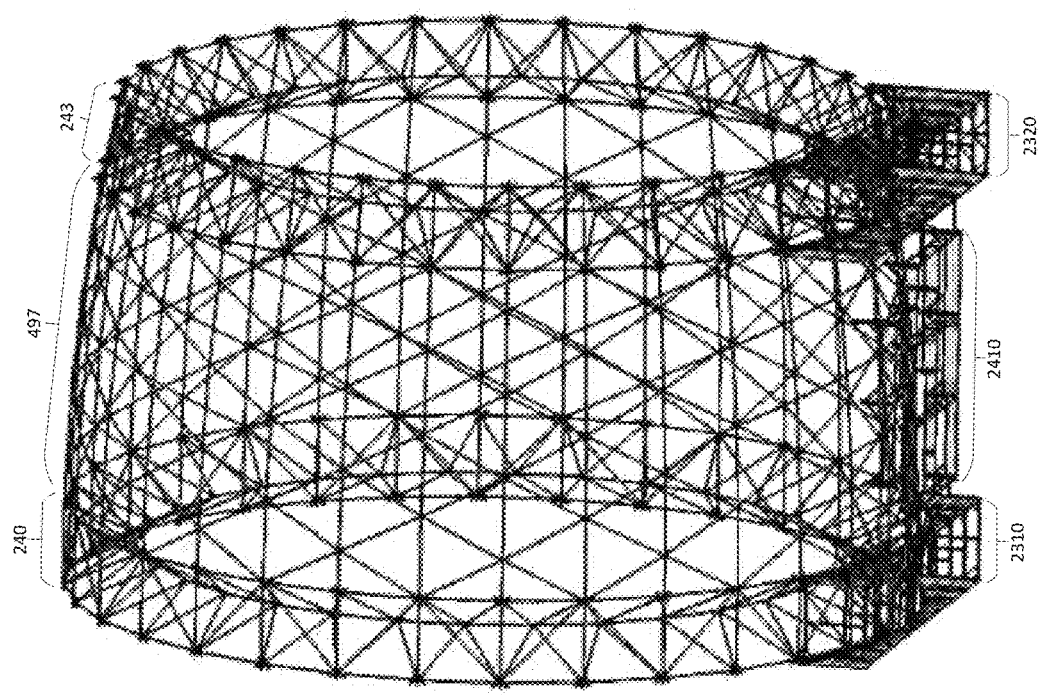
Figure 27B:
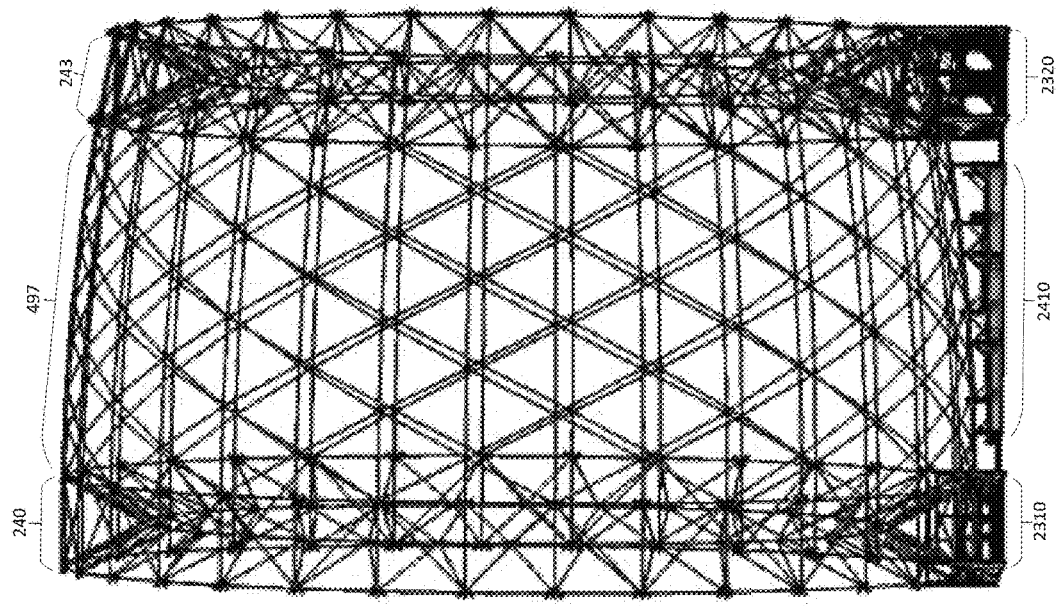

FIGS. 27A-27B illustrate two adjacent mainframes 240 and 243 placed on top of two rollercoaster jigs 2310 and 2320. In particular embodiments, two mainframes are connected to each other with a geodesic structure after the mainframes are erected on top of rollercoaster jigs. In these embodiments, portions of mainframes sitting directly on top of rollercoaster jigs (i.e., bottom portions that are closest to the ground) are connected to each other with a portion of a geodesic structure. Once these bottom portions are connected to each other with the portion of the geodesic structure, the mainframes are synchronously rotated on the rollercoaster jigs until portions of mainframes that are not yet connected to each other are sitting directly on top of the rollercoaster jigs. Then, these bottom, unconnected portions are connected to each other with another portion of the geodesic structure. This process repeats until the two mainframes are entirely connected to each other. For example, FIGS. 27A and 27B illustrate two mainframes 240 and 243 that have been fully connected to each other on top of rollercoaster jigs 2310 and 2320. In the embodiments shown in FIGS. 27A and 27B, mainframes 240 and 243 were first erected and placed on top of rollercoaster jigs 2310 and 2320. Then, a portion of geodesic structure 497 was either constructed on top of platform 2410 and connected to the mainframes or a pre-constructed portion of geodesic structure 497 was placed on top of the platform 2410 and connected to the mainframes. Then, the mainframes were synchronously rotated on the rollercoaster jigs and connected to each other according to the process described above. In particular embodiments, each of the two mainframes sitting on top of rollercoaster jigs may have to be rotated at different speeds in order to synchronously rotate the mainframes. This difference in speed depends on the mainframes' difference in size. For example, in the embodiments shown in FIGS. 27A and 27B, to synchronously rotate the two mainframes, mainframe 240 had to be rotated slightly faster than mainframe 243 in order to accommodate for the smaller size of mainframe 243.

FIG. 27B illustrates another view of mainframes 240 and 243 connected to each other by geodesic structure 497. In particular embodiments, rollercoaster jigs may be adjusted to position the centers of the mainframes in align with each other. For example, rollercoaster jig 2320 holding up mainframe 243 is raised slightly higher because mainframe 243 is tapered and has a smaller size (e.g., diameter) than mainframe 240. This allows the center of mainframe 243 to be in alignment to the center of mainframe 240. In particular embodiments, rollercoaster jigs may be adjusted to accommodate the tapering of mainframes. For example, FIG. 27B illustrates the outer side of rollercoaster 2320 adjusted higher than the inner side to accommodate the tapering of mainframe 243. In particular embodiments, geodesic structures may also be tapered. For example, as illustrated in FIG. 27B, mainframes 240 and 243 is connected by a tapered geodesic structure 497.

Figure 28:
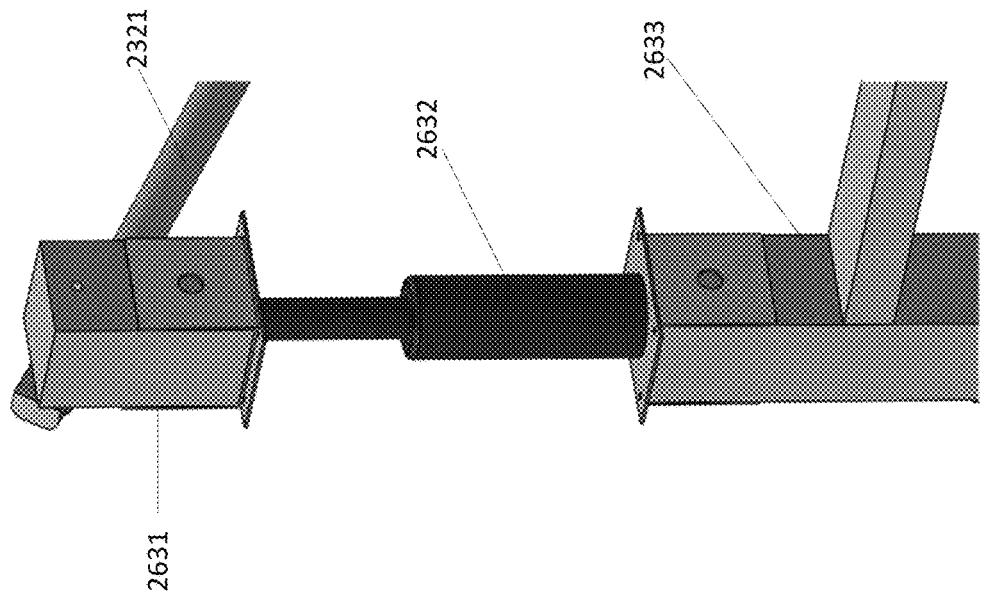
FIG. 28 illustrates an embodiment of an adjustable supporting structure for the rollercoaster jig.

FIG. 28 illustrates a close-up view of one of the adjustable supporting structures 2322. Each of rails 2321 may be attached to attachment block 2631. Attachment block 2631 may be affixed to an adjustable platform 2632, which in turn may be affixed to the body of the jig 2633. These adjustable supporting structures allow rollercoaster jigs to be adjusted to accommodate mainframes of different sizes and degrees of tapering.

Figure 29A:
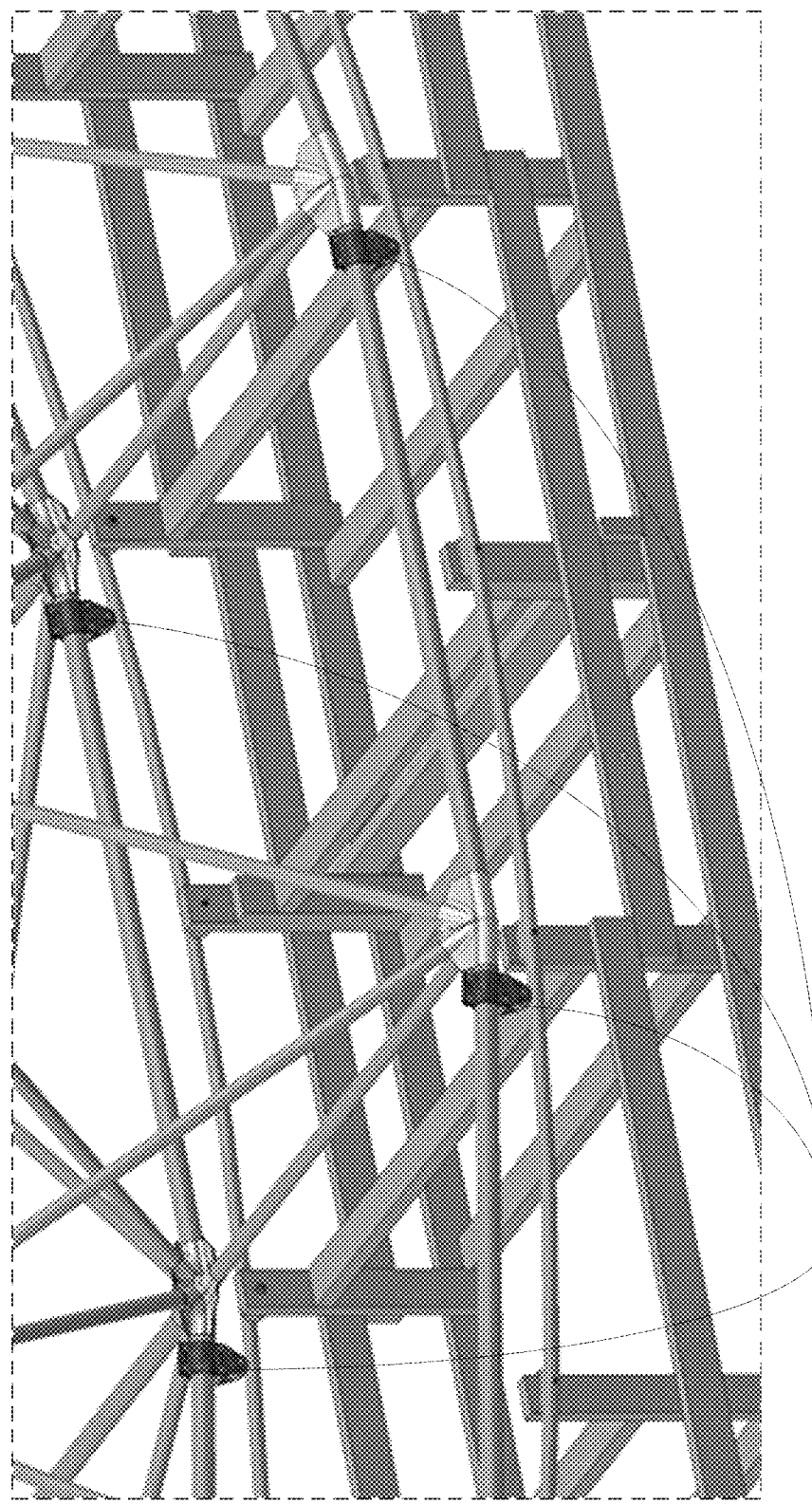
FIGS. 29A-29B illustrate an embodiment of detachable wheels for a mainframe to interface with a rollercoaster jig.
Figure 29B:
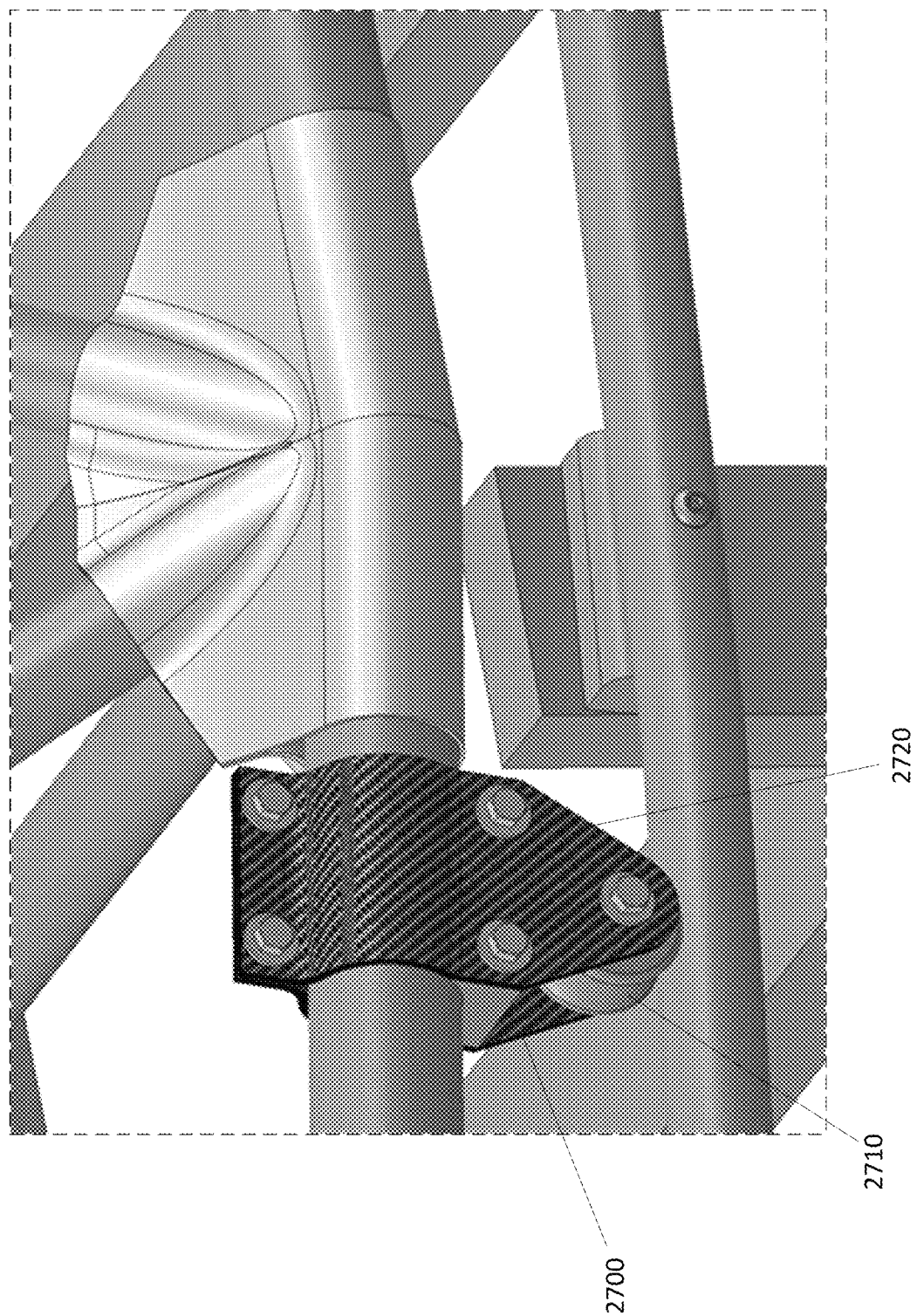

FIGS. 29A-29B illustrate an embodiment of detachable wheels 2700. In particular embodiments, the outer surface of a mainframe may have detachable wheels configured to interface the mainframe with the rails of a rollercoaster jig, which allow the mainframe to rotate along its axis. A detachable wheel 2700 may be affixed at or near each base joint of the mainframe. In particular embodiments, wheels 2710 may have a concave surface to improve its fit on top of convex rails. In particular embodiments, wheels 2710 may have a concave surface to fit over concave rails (the concavity of the rails may form a channel in which the wheels may be placed). In particular embodiments, housing 2720 for the wheel 2710 may be manufactured using carbon-fiber twills. In particular embodiments, housing 2720 may be manufactured using 3D-printed molds. In particular embodiments, screws may be used to affix housing 2720 to a mainframe and wheels 2710. In another embodiment, two wheels may be attached to opposite ends of an elongated housing. The top side of the housing may have adjustable clamps that may be clamped to the connectors of a mainframe, such as, for example, any connector forming the base of a pyramid structure. Once the airship is constructed, the detachable wheels may be detached from the airship's mainframes.

In particular embodiments, a mainframe may be rotated on a rollercoaster jig manually (e.g., by sliding them across the surface of the rollercoaster jig or by manually cranking a lever to rotate the mainframe on the rollercoaster). In other embodiments, a powered drive unit may be used to facilitate the rotation of a mainframe on a rollercoaster jig. The drive unit may be gas powered, electric powered, or powered by any other form of energy. In particular embodiments, multiple rollercoaster jigs may be arranged side by side, each with a corresponding mainframe. The rollercoaster jigs may be engaged simultaneously to rotate all of the corresponding mainframes. In this way, large sections of airship body, comprising multiple sections of mainframe, may be rotated for assembly. In particular embodiments, a drive unit attached to each of the multiple rollercoaster jigs may facilitate the rotation. In particular embodiments, the drive units may be synchronized, either mechanically or electronically (e.g., by a central computer) so that each section of mainframe is rotated at the same time and by the appropriate degrees of rotation.

Figure 30A:
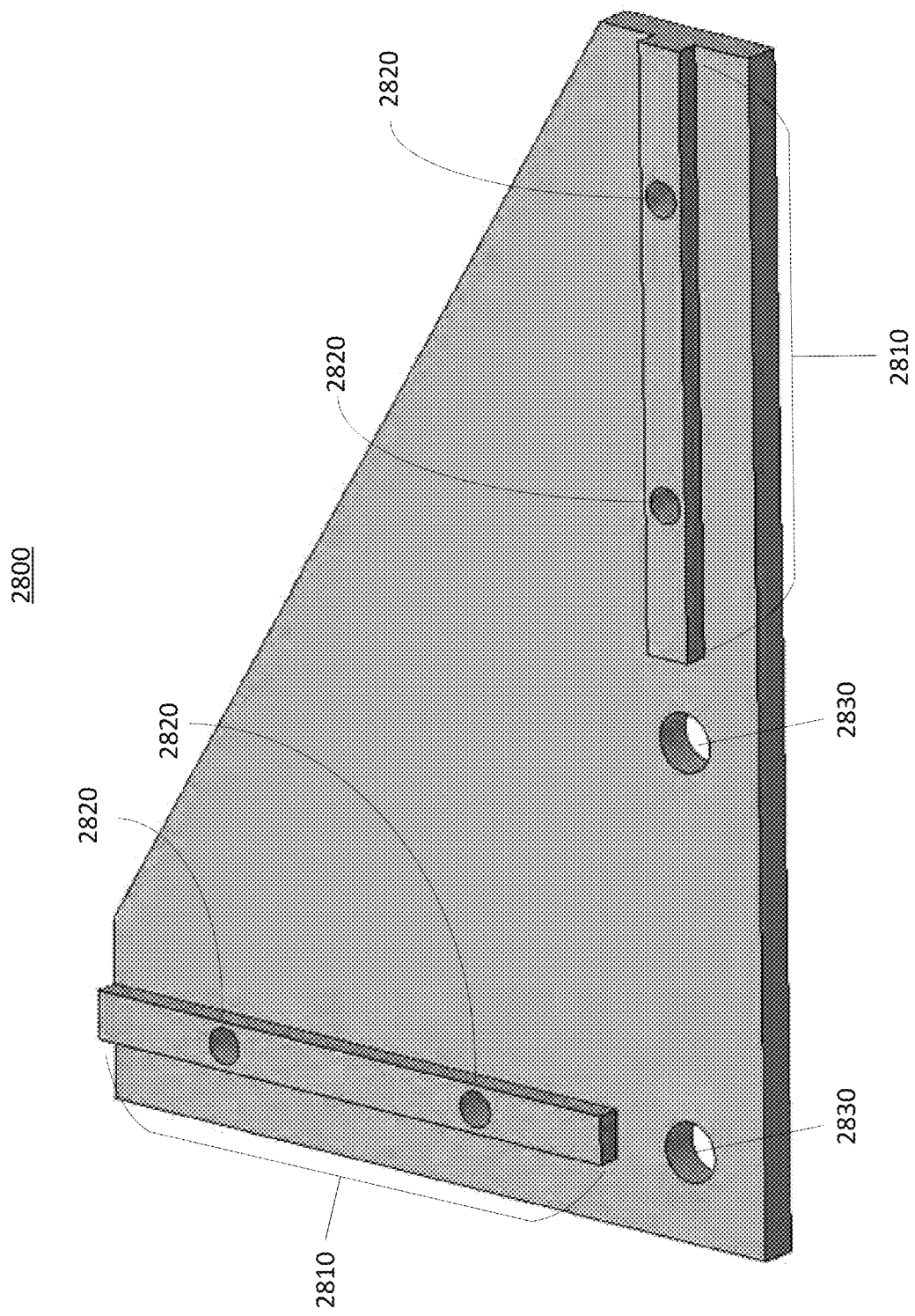
FIGS. 30A-30G illustrate embodiments of joining plates for joining extruded aluminum framing. In particular.
Figure 30B:
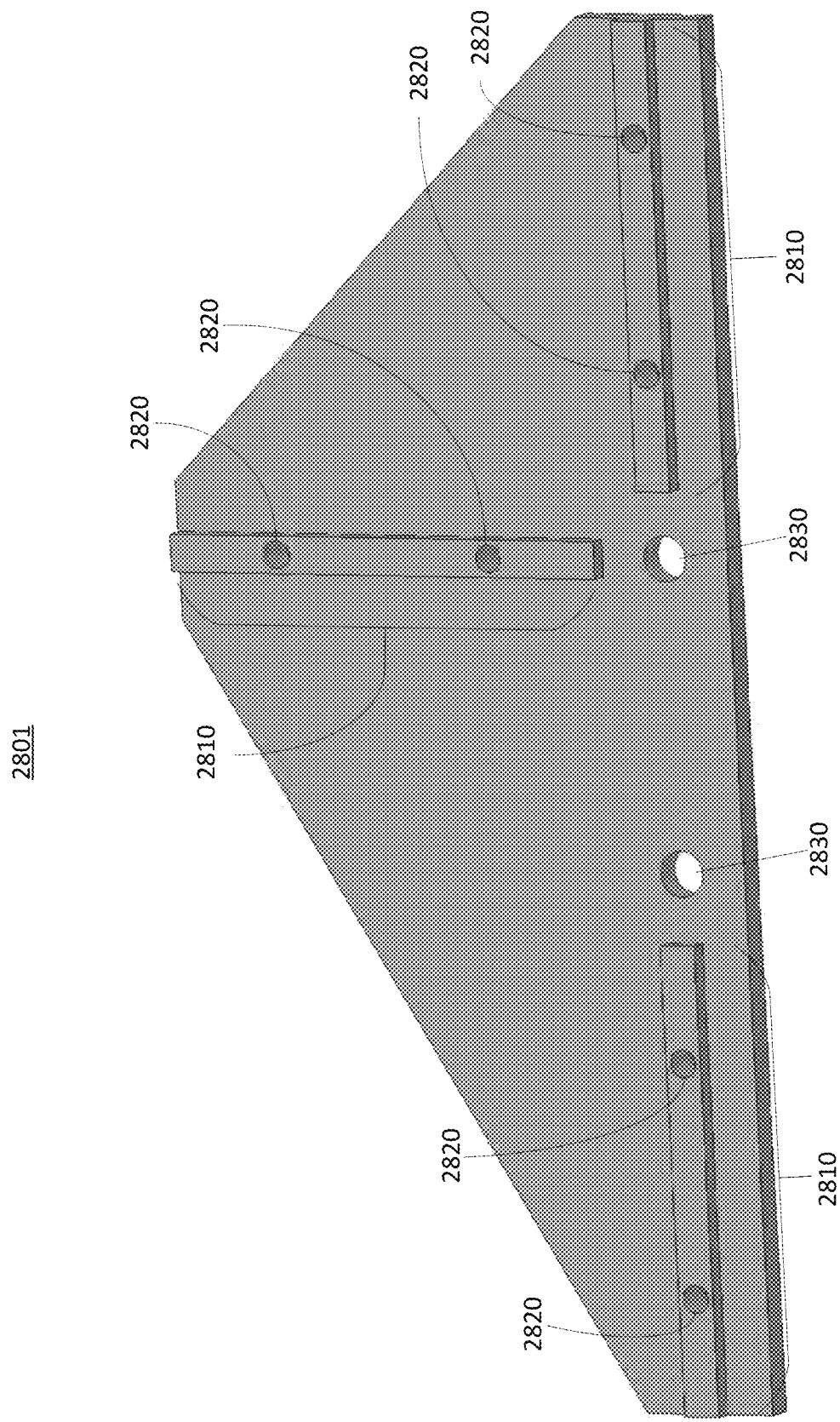
Figure 30C:
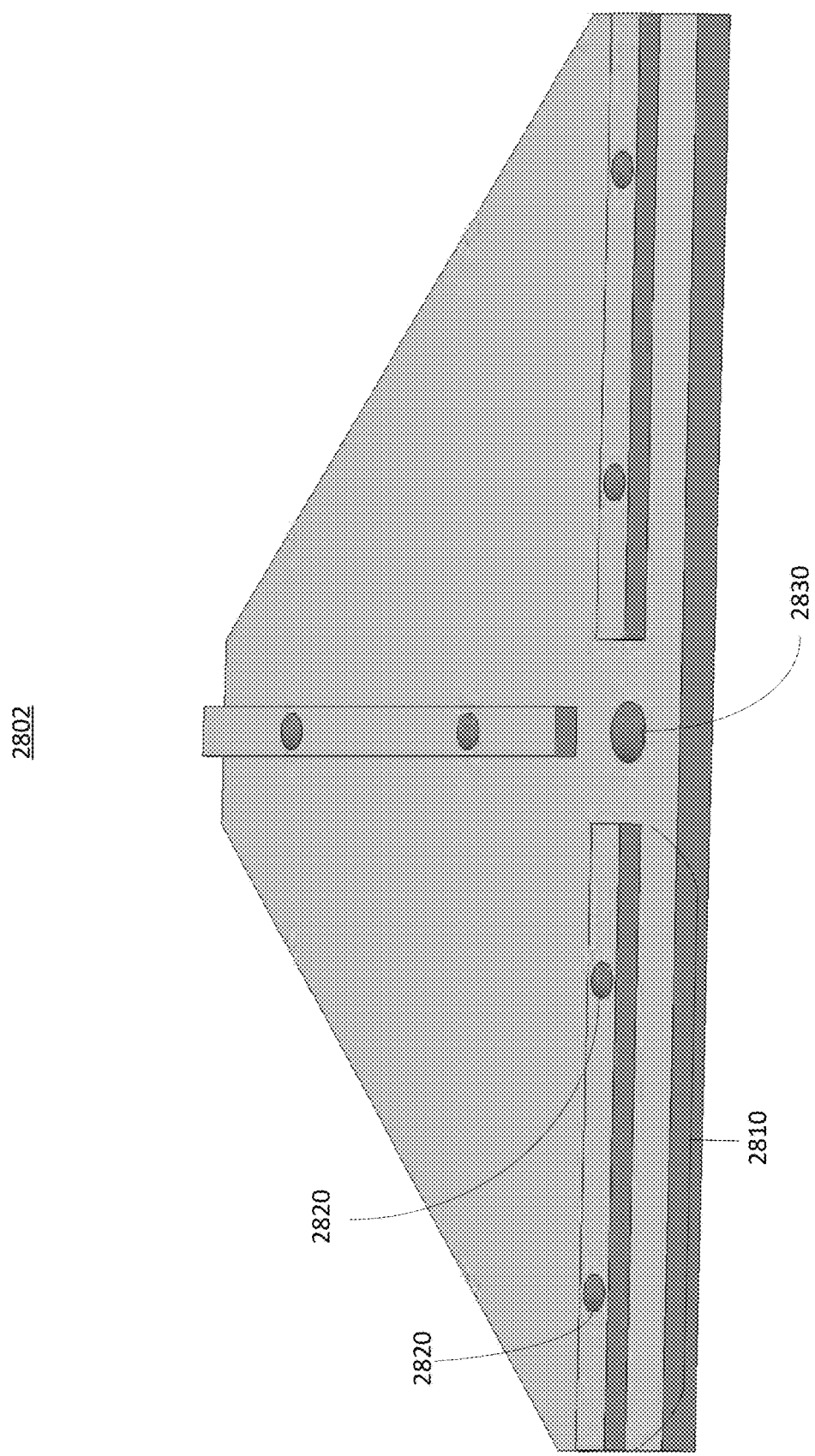
Figure 30D:
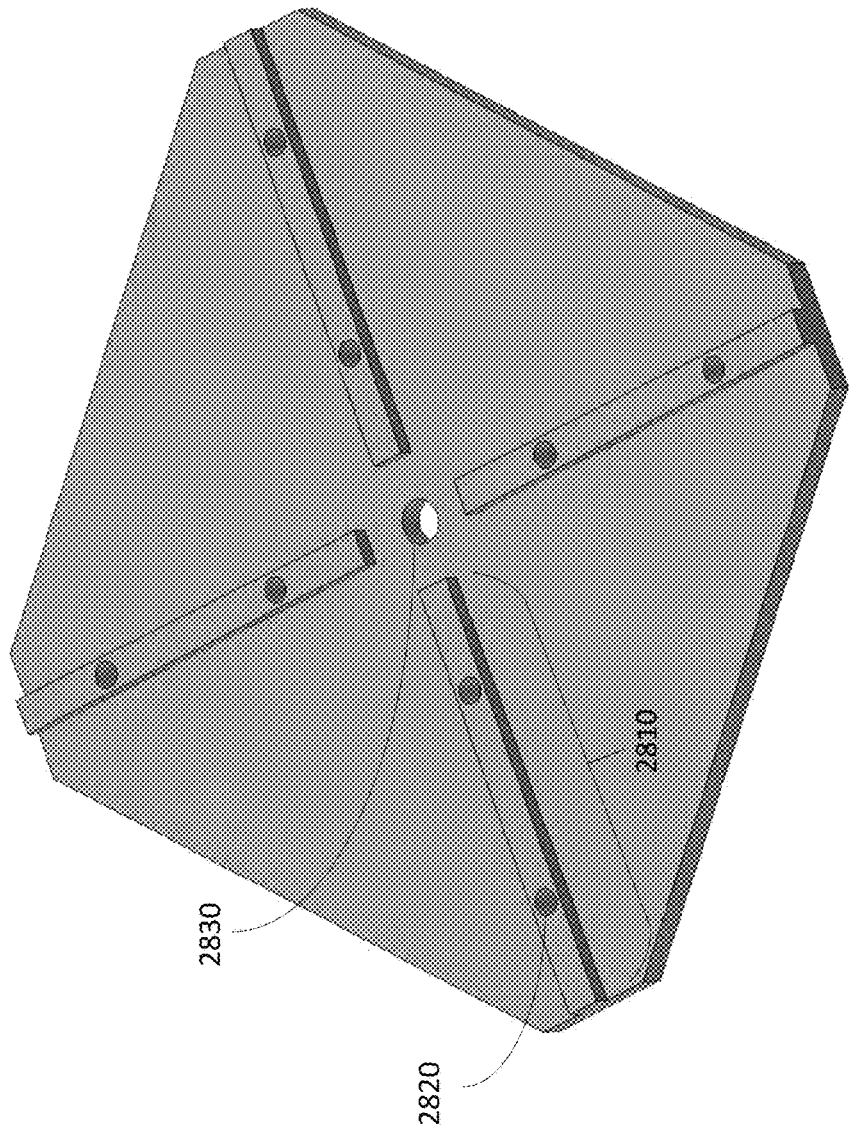
Figure 30E:
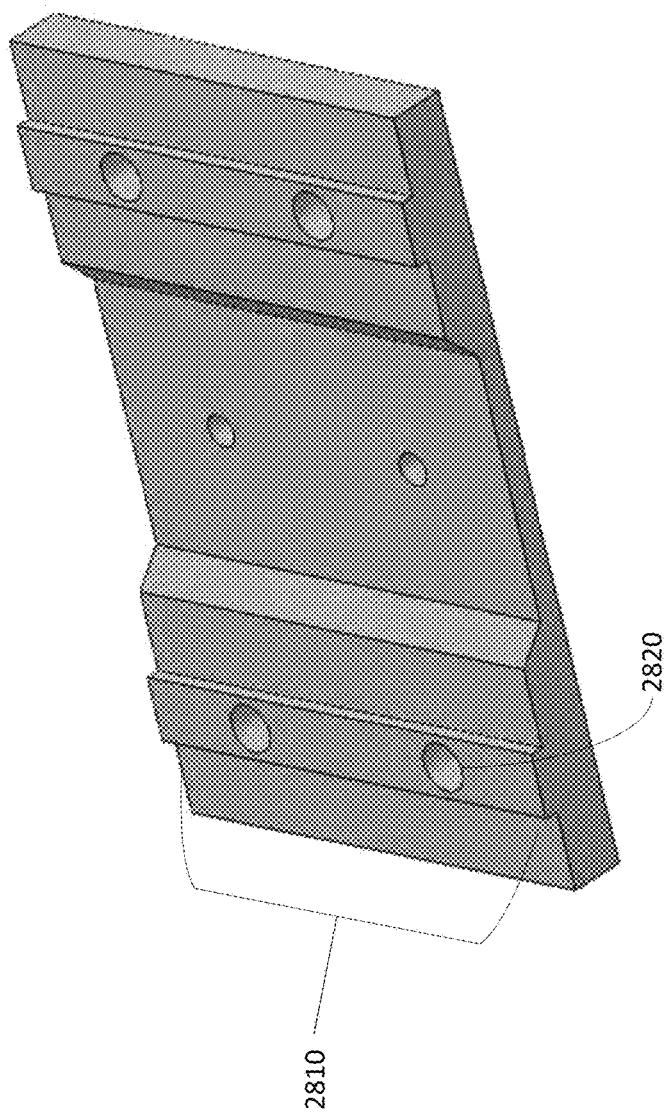
Figure 30F:
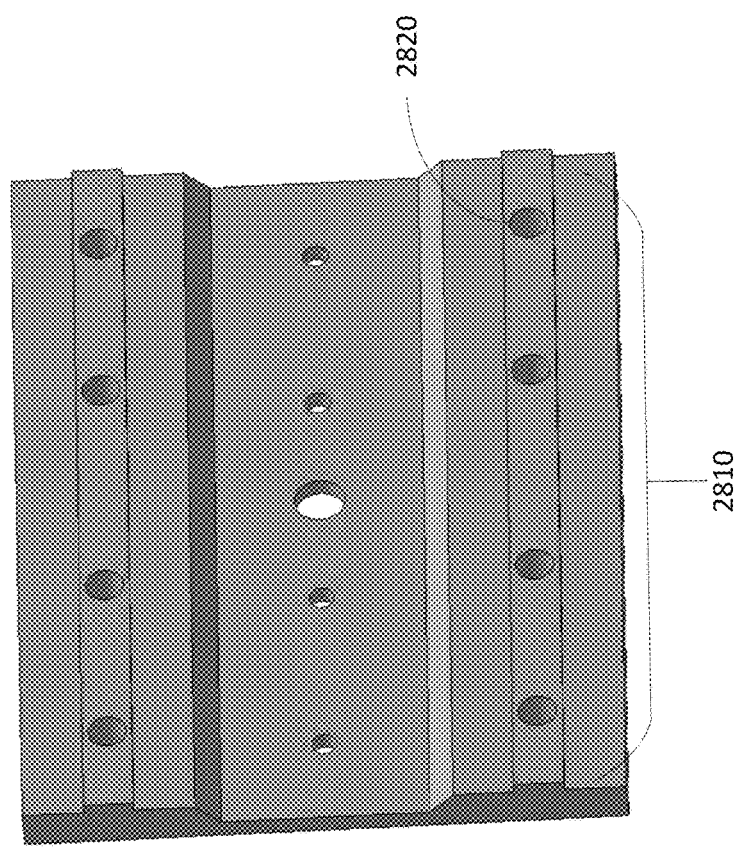
Figure 30G:
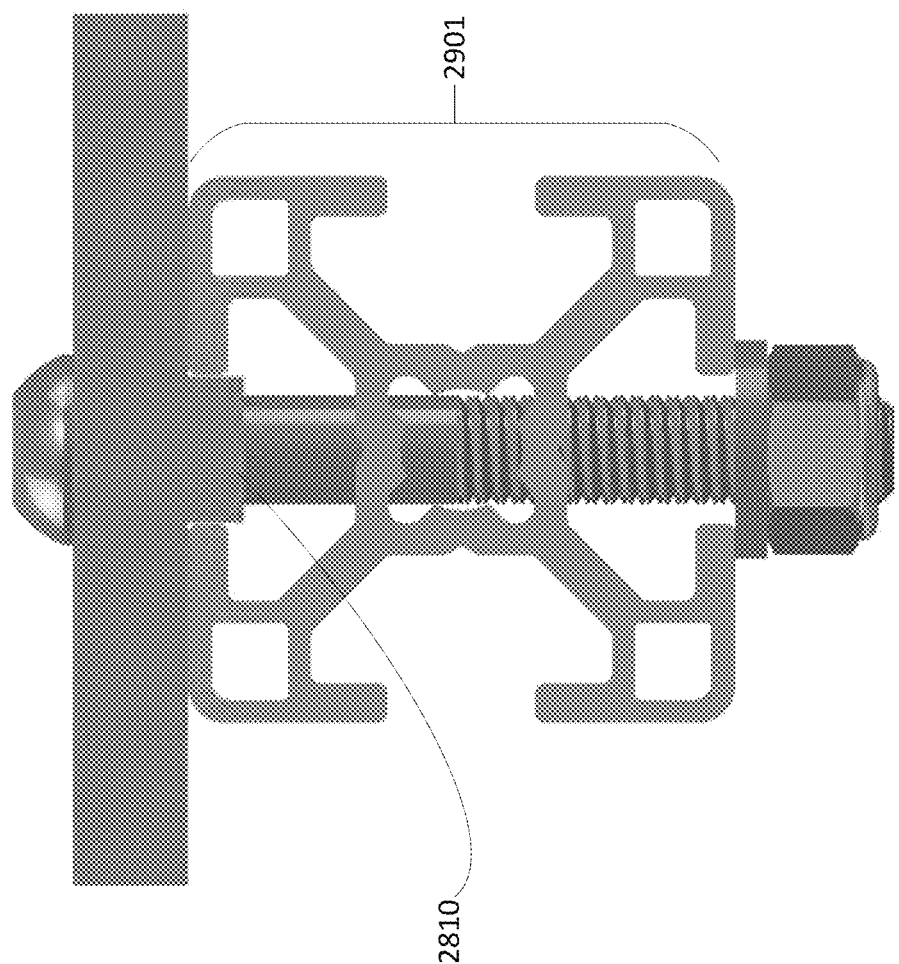

FIGS. 30A-30G illustrate embodiments of joining plates 2800-2805 for joining extruded aluminum framing. In particular embodiments, joining plates may be used in the assembly of airships or jigs for the construction of airships, including hull jigs, mainframe jigs, or other jigs for the construction of airships. For example, FIG. 23A illustrates a front cart 1910 used in a universal mainframe jig 1900 with several joining plates (e.g., joining plate 2803) which are connected with aluminum framings 2901. In particular embodiments, joining plates may comprise metallic plates that may be used to join two or more pieces of extruded aluminum framing. In some embodiments extruded aluminum framing may comprise T-slot structural framing, also known as 80/20 framing. Framing of this type may comprise lengths of square or rectangular extruded aluminum alloy with a T-slot down the centerline of one or more sides. For example, FIG. 30G illustrates a cross-sectional view of an 80/20 framing 2901 fastened to a joining plate with a bolt and nut.

Existing methods for joining extruded aluminum framing may use metallic plates that are substantially flat across the surface. These metal plates may have holes through which fasteners can be passed. By passing a fastener through the hole and securing the fastener to a piece of extruded aluminum framing, that piece can be secured to the metallic plate. In this way, two or more pieces of extruded aluminum framing can be joined together at various orientations. However, existing methods for joining two or more pieces of extruded aluminum framing with a metallic plate may suffer from issues because the joining plates are substantially flat across their surface. For example, aluminum framing fastened to a plate that is substantially flat across the surface may pivot around the fasteners, or otherwise become loose, resulting in rattle, slippage, or movement between the pieces. FIGS. 30A-30G illustrate embodiments for an improved method of joining multiple pieces of extruded aluminum framing that overcomes these problems by allowing for a press or friction fit between the metallic joining plate and the extruded aluminum frame. For example, FIG. 30G illustrates an 80/20 aluminum framing press fit onto rail 2810 of a joining plate, which allows the 80/20 aluminum framing to be secured to the joining plate.

FIG. 30A illustrates an embodiment of a corner joining plate 2800 for joining two pieces of extruded aluminum framing. In some embodiments, two pieces of extruded aluminum framing may be press fit onto each of the two rails 2810. The piece of extruded aluminum framing that is press fit onto rail 2810 may then be further secured to the corner joining plate by passing fasteners (e.g., nuts and bolts, as shown in FIG. 30G, or any other types of fasteners) through the holes 2820 and 2830 in the joining plate. Similarly, a piece of framing may be press fit onto rail 2810 and then further secured using holes 2820 and 2830. Small holes 2820 may be configured to utilize one type of fastener, while larger holes 2830 may be configured to utilize a different type of fastener. In other embodiments, only some of the holes 2820, and 2830 may be utilized with fasteners.

FIGS. 30B-30G illustrate other embodiments of joining plates that may be used for joining two or more pieces of extruded aluminum framing. FIG. 30B illustrates an embodiment of a joining plate 2801 with which three pieces of extruded aluminum framing may be joined in a T formation. FIG. 30C illustrates an embodiment of a joining plate 2802 with which three pieces of extruded aluminum framing may be joined in a T formation. FIG. 30D illustrates an embodiment of a four-way joining plate 2803 with which two or more pieces of extruded aluminum framing may be joined in an X formation (with each piece at a 90-degree angle to each other piece). FIG. 30D illustrates an embodiment of a joining plate configured to connect four pieces of extruded aluminum framing. FIGS. 30E and 30F illustrate embodiments of joining plates 2804 and 2805 in which two or more pieces of extruded aluminum framing may be joined such that the pieces are parallel to one another. It should be understood that the embodiments illustrated by FIGS. 30A-30G are only examples and that many configurations of joining plates may be used.

The apparatuses described above may be used to efficiently and cost-effectively build airships. In particular embodiments, each of the aforementioned joints used in the construction of a rigid airship's frame may be manufactured using molds. In particular embodiments, any of the molds described herein may be manufactured as follows. Each component of a mold (e.g., the male, female, or center piece) may be quickly and cost-effectively created using 3D printers. For instance, a digital 3D model defining a mold component may be sent to a 3D printer for printing. Layer by layer, the 3D printer may "print" the mold component based on its digital model. Any sufficiently strong material may be used, including but not limited to: nylon, ABS plastic, metal, resin, etc. In particular embodiments, the mold component may be solid with 3D-printing material. In other embodiments, the mold component may be designed to have a hollow cavity in the middle, with built-in external openings to the cavity. Once the shell of the mold component has been 3D-printed, cement or other suitable types of material may be injected into the cavity through the openings. Advantages of this process include, e.g., strengthening the mold component beyond what can be offered by the 3D-printing material alone, decreasing 3D-printing time (since less mass is printed), and reducing costs associated with 3D printing. Once the cement hardens, the mold component would be ready for use.

In particular embodiments, the mold components may be used to press against joint materials to create joints for the rigid airship. In particular embodiments, carbon-fiber twills may be used, as they have the desirable properties of being strong, lightweight, rigid, and initially pliable. The carbon-fiber twills may be treated with a hardening agent, such as epoxy resin. Thereafter, layers of twills may be placed between mold components. In particular embodiments, to aid subsequent detachment of the pressed carbon-fiber twills from the mold components, a layer of plastic sheet may be placed between the twills and each mold component. The mold components may then be pressed together so that corresponding portions designed to fit together are aligned with each other. A suitable amount of force may be applied to the molds to maintain their pressed configuration and to shape the carbon-fiber twills until they harden. The force may be applied by, e.g., using clamps, weights, or any other suitable means. Once the carbon-fiber twills harden, the mold components may be separated from each other to allow the carbon-fiber twills to be removed. In particular embodiments, the hardened carbon-fiber twills, which are then joint components, may be trimmed to remove undesirable or unneeded portions.

The joint components may then be used to construct the frame of a rigid airship. In particular embodiments, components of a joint may be affixed to each other to form the desired joint. For example, the male and female halves of the mainframe's apex joint may be assembled as shown in FIG. 7A. In particular embodiments, the joint components may be affixed by using bolts, adhesives or any other suitable bonding agent. Any such fastening means may be applied to surfaces where the joint components abut each other. FIG. 7A, for example, shows that aside from portions where the slots are formed, other portions of the male and female halves are substantially in contact. Liquid adhesives, for example, may be applied to such surfaces to bind the components together to form the joint. In particular embodiments, the joints may be permanently formed in such manner first, and thereafter connectors may be inserted into the slots. In other embodiments, connectors may be positioned before a joint is permanently assembled. For instance, connectors may be positioned with just the male half of a joint, and thereafter the female half may be assembled into place. In effect, the male and female halves may be used to clasp the connectors while they are positioned in the designated slots.

What is claimed is:

1. A jig for constructing a mainframe of an airship structure, comprising:
    a plurality of tracks configured in a radial pattern, each track comprising rails that are configured to be parallel to each other;
    a plurality of front carts for securing inner portions of the mainframe corresponding to an inner circumference of the mainframe, each front cart configured to be positionally adjustable along one of the plurality of tracks; and
    a plurality of back carts for securing outer portions of the mainframe corresponding to an outer circumference of the mainframe, each back cart configured to be positionally adjustable along one of the plurality of tracks.

2. The jig of claim 1, wherein the mainframe comprises interconnected pyramid structures.

3. The jig of claim 2, wherein the inner portions of the mainframe corresponding to the inner circumference of the mainframe comprise apex joints of the interconnected pyramid structures and apex-to-apex connectors.

4. The jig of claim 2, wherein the outer portions of the mainframe corresponding to the outer circumference of the mainframe comprise bases of the interconnected pyramid structures.

5. The jig of claim 1, wherein the plurality of front carts and the plurality of back carts are configured with wheels for sliding on the plurality of tracks.

6. The jig of claim 1, wherein each of the plurality of tracks comprises markers at predetermined locations along the track, wherein the respective markers of the plurality of tracks that are equal distance from a center of the radial pattern are configured to be used (1) to position the plurality of front carts to secure the inner portions of the mainframe or (2) to position the plurality of back carts to secure the outer portions of the mainframe.

7. The jig of claim 6, wherein each of the markers of each of the plurality of tracks is configured to be used to construct a mainframe of a particular size.

8. The jig of claim 1, wherein each of the plurality of front carts comprises a plate for securing the inner portions of the mainframe corresponding to the inner circumference.

9. The jig of claim 8, wherein the plate of each of the plurality of front carts is configured to secure an apex-to-apex connector that connects two pyramid structures of the mainframe.

10. The jig of claim 1, wherein each of the front carts comprises a connector that couples the front cart to an adjacent front cart, and wherein the connector secures an apex joint of a pyramid structure of the mainframe.

11. The jig of claim 1, wherein each of the plurality of back carts comprises one or more plates for securing outer portions of the mainframe corresponding to the outer circumference.

12. The jig of claim 11, wherein the one or more plates of each of the plurality of back carts are configured to secure two adjacent base joints of a pyramid structure of the mainframe.

13. The jig of claim 11, wherein a slope of the one or more plates of each of the plurality of back carts is adjustable.

14. The jig of claim 13, wherein each of the plurality of back carts comprises a sloped rail and an adjustment strap used for adjusting the slope of the one or more plates of the back cart, wherein a first end of the sloped rail is coupled to the one or more plates and a second end of the sloped rail is coupled to the adjustment strap at one of a plurality of predetermined locations on the adjustment strap.

15. The jig of claim 14, wherein the plurality of predetermined locations on the adjustment strap correspond to a plurality of predetermined tapering configurations of the mainframe, respectively.

16. The jig of claim 1, wherein each of the plurality of tracks is configured to be used by one of the plurality of front carts and one of the plurality of back carts.

* * * * *